(12) United States Patent
Hesse

(10) Patent No.: US 6,289,021 B1
(45) Date of Patent: Sep. 11, 2001

(54) SCALEABLE LOW-LATENCY SWITCH FOR USAGE IN AN INTERCONNECT STRUCTURE

(75) Inventor: John E. Hesse, Moss Beach, CA (US)

(73) Assignee: Interactic Holdings, LLC, Princeton, NJ (US)

(*) Notice: Subject to any disclaimer, the term of this patent is extended or adjusted under 35 U.S.C. 154(b) by 0 days.

(21) Appl. No.: 09/009,703

(22) Filed: Jan. 20, 1998

Related U.S. Application Data

(60) Provisional application No. 60/036,392, filed on Jan. 24, 1997.

(51) Int. Cl.[7] .................................................. H04L 12/56
(52) U.S. Cl. ......................... 370/409; 370/406; 370/407; 370/408; 370/400
(58) Field of Search ............................. 709/238; 370/238, 370/400, 389, 405, 357, 360, 367, 368, 409, 406, 407, 408, 411, 412, 449, 473, 498, 546, 229; 340/825; 395/80, 200, 325; 455/445

(56) References Cited

U.S. PATENT DOCUMENTS

| 4,814,980 | 3/1989 | Peterson et al. ...................... 364/200 |
| 4,933,836 | 6/1990 | Tulpule et al. ....................... 364/200 |

(List continued on next page.)

FOREIGN PATENT DOCUMENTS

| A94 12939 | 6/1994 | (WO) . |
| A95 16240 | 6/1995 | (WO) . |
| WO 95 30192 | 11/1995 | (WO) . |

OTHER PUBLICATIONS

Aruna V. Ramanan, "Ultrafast Space–Time Networkds for Multiprocessors", a thesis, 1993, pp. 1–170.

(List continued on next page.)

Primary Examiner—Dang Ton
Assistant Examiner—Anthnoy Ton
(74) Attorney, Agent, or Firm—Skjerven Morrill MacPherson LLP; Ken J. Koestner

(57) ABSTRACT

A scalable low-latency switch extends the functionality of a multiple level minimum logic interconnect structure for usage in computers of all types, networks and communication systems. The multiple level minimum logic interconnect structure employs a data flow technique based on timing and positioning of messages moving through the structure. The scalable low-latency switch is distributed throughout multiple nodes in the structure so that a supervisory controller providing a global control function and complex logic structures are avoided while the interconnect structure operates as a "deflection" or "hot potato" system in which processing and storage overhead at each node is reduced. The interconnect structure using the scalable low-latency switch employs a method of achieving wormhole routing through an integrated circuit chip by a novel procedure for inserting messages into the chip. Rather than simultaneously inserting a message into each unblocked node on the outer cylinder at every angle, messages are inserted simultaneously into two columns A and B only if an entire message fits between A and B. Messages are inserted into column 0 at time 0. Messages are inserted into column 1 at time $t_0+t_C$, where time $t_C$ is the time for a first bit of a message to move from column 0 to column 1 on the top level. Messages are inserted into column 2 at time $t_0+2t_C$, and so forth. The strategy prevents the first bit of one message from colliding with an interior bit of another message already in the switch. Contention between entire messages is addressed by resolving the contention between the first bit only so that messages wormhole through many cells.

23 Claims, 40 Drawing Sheets

U.S. PATENT DOCUMENTS

| | | | |
|---|---|---|---|
| 5,140,583 | 8/1992 | May et al. | 370/60 |
| 5,181,017 | 1/1993 | Frey, Jr. et al. | 340/825 |
| 5,212,773 | 5/1993 | Hillis | 395/200 |
| 5,253,248 | 10/1993 | Dravida et al. | 370/328 |
| 5,339,396 | 8/1994 | Muramatsu et al. | 395/325 |
| 5,377,333 | 12/1994 | Nakagoshi et al. | 395/325 |
| 5,471,623 | 11/1995 | Napolitano, Jr. | 395/200 |
| 5,533,198 | 7/1996 | Thorson | 395/80 |
| 5,546,596 | 8/1996 | Geist | 395/200 |
| 5,553,078 | 9/1996 | Horie | 370/94.3 |
| 5,577,029 | 11/1996 | Lu et al. | 455/445 |
| 5,583,990 | 12/1996 | Birrittella et al. | 395/200.01 |
| 5,606,551 * | 2/1997 | Kartalopoulos | 370/406 |
| 5,617,413 | 4/1997 | Monacos | 370/400 |
| 5,701,416 | 12/1997 | Thorson et al. | 395/200 |
| 5,797,035 | 8/1998 | Birrittella et al. | 395/855 |
| 5,826,033 | 10/1998 | Hayashi et al. | 395/200.68 |
| 5,859,981 | 1/1999 | Levin et al. | 395/200.68 |
| 5,892,923 | 4/1999 | Yasuda et al. | 395/200.69 |
| 5,996,020 * | 11/1999 | Reed | 709/238 |
| 6,055,618 | 4/2000 | Thorson | 712/11 |
| 6,115,373 | 9/2000 | Lea | 370/355 |

OTHER PUBLICATIONS

Proceedings of the Third IEEE Symposium on Parallel and Distributed Processing (Cat. No. 91TH0396–2), Dallas, TX, USA, Dec. 2–5, 1991, ISBN 0–8186–2310–1, Los Alamitos, CA, USA, IEEE Compt. Soc. Press, USA, pp. 564–571.

Malek M., et al.: "The Cylindrical Banyan Multicomputer: A Reconfigurable Systolic Architecture", May 1, 1989, pp. 319–327, Parallel Computing, XP000065558.

Isaac Yi–Yuan Lee et al.: "A Versatile Ring–Connected Hypercube", IEEE Micro., Jun. 1, 1994, pp. 60–67, XP000448657.

Narashima Reddy: "I/O Embedding in Hypercubes", Proceedings of the 1988 International Conference on Parallel Processing, Pennsylvania State University, Aug. 19, 1988, pp. 331–338, XP002016775.

Catier: "Une architecture "hypercube".", Electronique Industrielle, Sep. 1986, pp. 59–64, XP002016776.

Welty: "Hypercube architectures", AFIPS Conference Proceedings 1986 National Computer Conference, Jun. 19, 1986, pp. 496–501, XP002016777.

Young, S.D., et al.: "Adaptive Routing in Generalized Hypercube Architectures", IEEE Symposium, Dec. 2–5, 1991, pp. 564–571, XP002024983.

Gaughan, P.T., et al.: "Adaptive Routing Protocols for Hypercube Interconnection Networks", *Computer*, vol. 26, No. 5, May 1, 1993, pp. 12–16, 17–23, XP000365279.

Maziarz et al., "Hypernets for Metroarea Networks: A Deadlock Free Routing Technique", Proc. of the International Conf. on Communications, Geneva, May 23–26, 1993, vol. 3, May 23–26, 1993, Institute of Electrical and Electronics Engineers, pp. 1847–1853.

Al–Tawil et al., "A Survey and Comparison of Wormhole Routing Techniques in Mesh Networks", IEEE Networks: The Magazine of Computer Communications, vol. 11, No. 2, Mar. 1997, pp. 38–45.

* cited by examiner

OVERVIEW of METHOD

MESSAGES ENTER THE INTERCONNECT AT THE TOP LEVEL, IN GENERAL MOVE DOWNWARD AND TO THE RIGHT, AND EXIT AT THE BOTTOM OF THE INTERCONNECT

THE TARGET ROW (DESTINATION) IS DETERMINED BY THE MESSAGE HEADER

A MESSAGE MOVES THROUGH INTERCONNECTED CONTROL CELLS, AND IS ROUTED DOWNWARD TO ITS TARGET ROW AT THE BOTTOM LEVEL

A MESSAGE GENERALLY SPANS MULTIPLE CONTROL CELLS, THAT IS, IT "WORMHOLES" ITS WAY THROUGH THE INTERCONNECT, TO ACHIEVE MINIMAL LATENCY

SWITCH ARRAYS ARE LOCATED AT THE INTERSECTION OF EACH LEVEL AND COLUMN OF THE INTERCONNECT

THERE IS A CONTROL CELL ON EACH ROW IN A SWITCH ARRAY

A CONTROL CELL HAS AT LEAST ONE EXIT PATH DOWNWARD, AT LEAST ONE EXIT PATH TO THE RIGHT, AT LEAST ONE INPUT FROM THE LEFT AND AT LEAST ONE INPUT FROM ABOVE

CONTROL CELLS MAY LIE ON A SINGLE ROW OR SPAN SEVERAL ROWS

ALL MESSAGE PROCESSING IS DONE WITHIN A CONTROL CELL AS A MESSAGE ENTERS IT

A CONTROL CELL EXAMINES THE MESSAGE HEADER AND DECIDES WHETHER TO SENT THE MESSAGE DOWNWARD TOWARDS ITS TARGET, OR TO THE RIGHT

CONTINUED ON NEXT FIGURE

Fig 1D

OVERVIEW of METHOD, contd.

IF AN UNBLOCKED PATH DOWNWARD IS CONNECTED TO A CONTROL CELL (OR OUTPUT PORT) THAT IS FURTHER CONNECTED ON A PATH TO THE MESSAGE'S TARGET, THEN THE MESSAGE IS SENT DOWN THAT PATH

MESSAGES ONLY ENTER CONTROL CELLS THAT ARE LOCATED ON PATHS TO TARGET OUTPUT PORTS

WHEN A MESSAGE IS SENT DOWNWARD AN APPROPRIATE ADDRESS BIT IS STRIPPED AWAY, THEREBY SIMPLIFYING AND SPEEDING UP PROCESSING AT SUBSEQUENT CONTROL CELLS

SENDING A MESSAGE DOWNWARD GENERALLY CONSUMES NO MORE THAN 1 CLOCK PERIOD

A MESSAGE THAT IS SENT TO THE RIGHT DOES NOT LOSE ANY DOWNWARD PROGRESS THAT IT HAS ACHIEVED SO FAR IN ITS JOURNEY TOWARD REACHING ITS TARGET

A MESSAGE ALWAYS HAS AN AVAILABLE EXIT PATH (GENERALLY TO THE RIGHT) OUT OF A CONTROL CELL, AND THEREFORE A MESSAGE IS NEVER HELD (BUFFERED) AT A CONTROL CELL

A MESSAGE THAT IS SENT TO THE RIGHT IS DELAYED ONLY 1 OR 2 CLOCK PERIODS IN ITS PROGRESS TO ITS TARGET

A MESSAGE THAT REACHES THE RIGHT-HAND SIDE OF THE INTERCONNECT IS GENERALLY ROUTED TO BACK THE LEFT AND REMAINS ON THE SAME LEVEL, AND IN SOME CASES ENCOUNTERS A FIFO BUFFER

WHEN A MESSAGE IS SENT TO THE RIGHT, A BUSY SIGNAL IS SENT TO A CELL (OR CELLS) ABOVE TO INDICATE THAT A SHARED PATH MIGHT NOT BE AVAILABLE TO THE CELL ABOVE, THAT IS, THE LOWER CELL HAS PRIORITY IN THE USE OF THE SHARED PATH

Fig 1D contd

MESSAGE LAYOUT
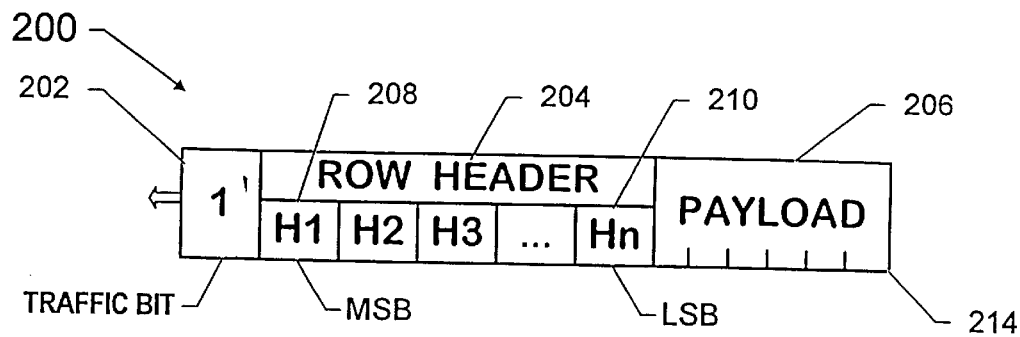
Fig 2A
Fig 2B
MULTICAST MESSAGE LAYOUT
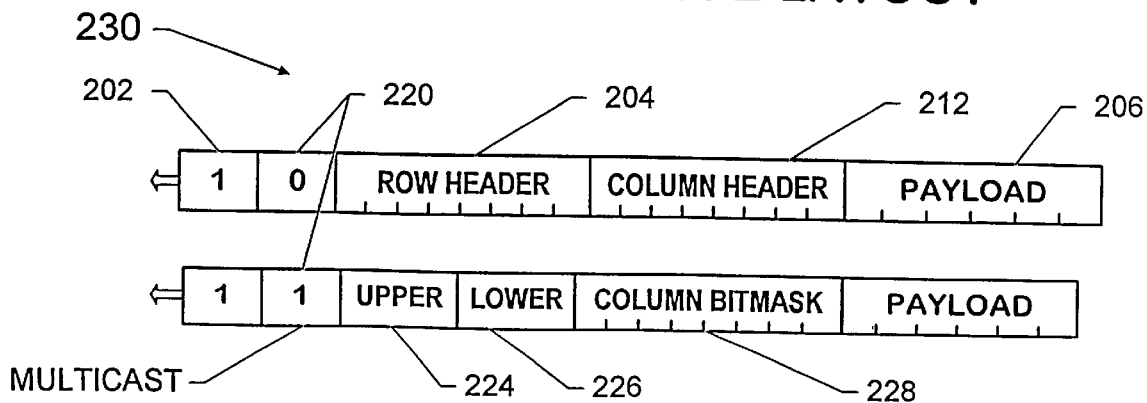
Fig 2C

TRI-STATE I/O

TRI-STATE I/O TIMING

PLACEMENT SEQUENCE METHOD

MESSAGE FLOW AND BLOCKING

HEADER LENGTH CONTRACTION

SYNCHRONOUS DELAY MEANS

CONTROL CELL STATES

CONTROL CELL DETAIL

LEVEL 0 CONTROL CELL

FLAT-LATENCY CELL STATES

FLAT-LATENCY CONTROL TABLE

| W1 priority | W2 | Upper Busy | Lower Busy | State | Latch Up 1 | Latch Down 1 | W1 to | Latch Up 2 | Latch Down 2 | W2 to |
|---|---|---|---|---|---|---|---|---|---|---|
| Upper | Upper | 0 | na | 5 | 1 | 0 | S1 upr. | 0 | 0 | East 2 |
| Upper | Upper | 1 | na | 7 | 0 | 0 | East 1 | 0 | 0 | East 2 |
| Upper | Lower | 0 | 0 | 3 | 1 | 0 | S1 upr. | 0 | 1 | S2 lowr. |
| Upper | Lower | 0 | 1 | 4 | 0 | 0 | East 1 | 0 | 1 | S2 lowr. |
| Upper | Lower | 1 | 0 | 4 | 0 | 0 | East 1 | 0 | 1 | S2 lowr. |
| Upper | Lower | 1 | 1 | 7 | 0 | 0 | East 1 | 0 | 0 | East 2 |
| Lower | Upper | 0 | 0 | 1 | 0 | 1 | S2 lowr. | 1 | 0 | S1 upr. |
| Lower | Upper | 0 | 1 | 6 | 0 | 1 | S2 lowr. | 0 | 0 | East 2 |
| Lower | Upper | 1 | 0 | 2 | 0 | 0 | East 1 | 1 | 0 | S1 upr. |
| Lower | Upper | 1 | 1 | 7 | 0 | 0 | East 1 | 0 | 0 | East 2 |
| Lower | Lower | na | 0 | 6 | 0 | 1 | S2 lowr. | 0 | 0 | East 2 |
| Lower | Lower | na | 1 | 7 | 0 | 0 | East 1 | 0 | 0 | East 2 |
| Upper | none | 0 | na | 3 | 1 | 0 | S1 upr. | 0 | 1 | S2 lowr. |
| Upper | none | 1 | na | 4 | 0 | 0 | East 1 | 0 | 1 | S2 lowr. |
| Lower | none | na | 0 | 1 | 0 | 1 | S2 lowr. | 1 | 0 | S1 upr. |
| Lower | none | na | 1 | 2 | 0 | 0 | East 1 | 1 | 0 | S1 upr. |
| none | Upper | 0 | na | 1 | 0 | 1 | S2 lowr. | 1 | 0 | S1 upr. |
| none | Upper | 1 | na | 6 | 0 | 1 | S2 lowr. | 0 | 0 | East 2 |
| none | Lower | na | 0 | 3 | 1 | 0 | S1 upr. | 0 | 1 | S2 lowr. |
| none | Lower | na | 1 | 5 | 1 | 0 | S1 upr. | 0 | 0 | East 2 |
| none | none | na | na | 3 | 1 | 0 | S1 upr. | 0 | 1 | S2 lowr. |

Fig 18B

FLAT-LATENCY CELL DETAIL

CONTROL CELL SYMBOL

INPUT PORT CONNECTIONS

Column 0    Column 1    Column 2    Column 3

EAST TO WEST CONNECTIONS

LOW-LATENCY OUTPUT

ROW & COLUMN ADDRESSING

MULTICAST CONTROL CELL

MULTICAST CONTROL STATES

"nD" MESSAGE LAYOUT

2D SYSTEM

3D SYSTEM

4D SYSTEM

2D INTERCONNECTION

SPLIT HEADER MESSAGE

OPTICAL MESSAGE LAYOUT & TIMING

ELECTRO-OPTICAL CONTROL CELL

ELECTRO-OPTICAL INPUT CELL

AMPLIFIER/REGENERATOR

SCALEABLE LOW-LATENCY SWITCH FOR USAGE IN AN INTERCONNECT STRUCTURE

This application claims benefit of provisional application No. 60/036,392 filed Jan. 24, 1997.

BACKGROUND OF THE INVENTION

1. Field of the Invention

The present invention relates to interconnection structures for computing and communication systems. More specifically, the present invention relates to a scaleable low-latency switch for usage in a multiple level interconnection structure.

2. Description of the Related Art

A persistent significant unsolved problem in the field of computer science has been the lack of a scalable, low-latency interconnect that sustains high throughput (high cross-sectional bandwidth) under fully loaded conditions. Existing interconnect designs, such as the banyon, omega and fat-tree networks, multi-level grids, torus and hypercube networks all fail, in various degrees, to scale without limit, support low latency and high throughput when loaded with traffic. The geometries of these networks were developed by Nineteenth Century mathematicians, and even earlier geometricians, and were never intended to support a message-routing method.

What is needed is an interconnect structure and a suitable switch for use in forming interconnections in the structure that are scalable virtually without limit, and that support low latency and high throughput.

An interconnect structure and switch with these advantageous characteristics is useful in many electronic design environment application categories including supercomputer networks and network switch fabric environments such as local area network (LAN)/Internet switch fabrics and telephone switch fabrics.

Objectives of the various electronic design environments are very different. For example, a primary objective in the design of a supercomputer is very low latency. In contrast, the main objective in the design of a LAN/Internet switch fabric is scalability, rather than latency. An objective of telephony central office switching is very high scalability and low cost, while latency and bandwidth are of smaller concern.

Switches for supercomputer designs are fabricated using expensive silicon fabrication technologies. Design parameters are particularly defined and invariant throughout a supercomputer system. Specifically word size, addressing schemes, size, and capacity are generally invariant throughout a supercomputer system. A single compiler philosophy and design, and operating system definition and requirement set is typically used for a supercomputer system. Similarly, a supercomputer system includes a single definition of operating speed and voltages. A supercomputer utilizes compatible components, memory, processors, power supplies and the like.

A supercomputer design generally has a smaller maximum size than a LAN/Internet network, although the size of a network is highly variable. A supercomputer design typically has a size in the range from hundreds to a few thousand ports while a network has a size in the range from hundreds to many thousands of ports or higher. A supercomputer system uses a switch design with a high degree of parallelism through usage of multiple identical stacked integrated circuits. Typically nodes in a supercomputer network are implemented on a single integrated circuit chip with only a few nodes fabricated on one circuit board. The interconnection of nodes is made by multiple, expensive high-speed cables. The supercomputer design parallelism extends to addressing and control issues, as well as packaging to achieve a reduction in latency and an increase in bandwidth per port.

In contrast to supercomputer switch implementations, switches for a network design, such as a LAN/Internet network design, typically utilize multiple integrated circuits possibly having different design parameters. Generally, design parameters for small networks are substantially different from design parameters for large networks. For example, large networks sometimes use a "twisted cube" or two-dimensional design. Very large networks having on the order of hundreds of thousands of ports commonly use three-dimensional or four-dimensional topologies that are formed by interconnecting or cascading multiple switch circuits into a meta-topology for super-large switches. Different implementations of switch circuits are needed to efficiently construct LAN/Internet networks having differing meta-topologies, especially to supply suitable input and output signal timing. Network bit rates are commonly slower than the bit rates of a supercomputer and are widely variable. For example, Ethernet uses a 10 Mbit/s rate. A token ring has a 12 Mbit/s rate. A fast Ethernet attains a 100 Mbit/s rate and ATM attains a 25 Mbit/s to 622 Mbit/s rate.

Conventional switch technologies have many deficiencies in the support of interconnect structure technologies. First, no existing switching fabric or technology can support more than about 12 to 24 ports at a reasonable cost. For example, an eight-port token ring switch costs approximately $10,000. An eight to sixteen-port 10 Mbit/s Ethernet switch ranges in cost from $4,000 to $10,000.

A second deficiency of interconnect switch technologies is that a single switch design does not support multiple different communication protocols. Pin-limited designs are easily supported only for communication protocols having a small packet length, such as ATM. Different packet sizes directly affect integrated circuit chip design so that wide variability in packet sizes leads to large differences in design switch specifications. For example, a switch buffers the entire length of the maximum packet size at least once for every port on an integrated circuit switch. Thus, the defined ATM packet size is 53 bytes so that the small payload of an ATM design yields an efficient usage of the gates in an integrated circuit. The Ethernet packet size is variable and ranges up to about 2 Kbytes, requiring a large number of gates for buffering a message. Similarly, token ring packets range up to 4 Kbytes and fiber channel sizes are virtually unlimited, using a large circuit area for message buffering.

What is needed is a generic switch circuit for local area network usage. What is further needed is a generic switch circuit for constructing a network that implements IEEE network specifications

SUMMARY OF THE INVENTION

A highly advantageous interconnect structure is useful for computers of all types, networks and communication systems utilizing a data flow technique that is based on timing and positioning of messages communicating through the interconnect structure. Switching control is distributed throughout multiple nodes in the structure so that a supervisory controller providing a global control function and complex logic structures are avoided. The interconnect structure operates as a "deflection" or "hot potato" system in which processing and storage overhead at each node is minimized. Elimination of a global controller and buffering at the nodes greatly reduces the amount of control and logic structures in the interconnect structure, simplifying overall control components and network interconnect components and improving speed performance of message communication.

A scalable low-latency switch, extends the usefulness and advantages of the interconnect structure and includes a novel set of structures that accompany a novel message-routing method to avoid limitations of previously existing networks. The throughput of a simple embodiment of the interconnect structure using the scalable low-latency switch is better than 20 percent as the interconnect size goes to infinity. Time-of-flight (latency) is typically no greater than twice the time elapsed for the header to enter the network, even when the interconnect structure is fully loaded. Another embodiment of the interconnect structure, called a "Flat Latency Interconnecf", using the scalable low-latency switch has two or more downward paths per node and improves throughput to better than forty percent as the size goes to infinity.

In accordance with an aspect of the present invention, a scaleable low-latency switch design satisfies highly aggressive objectives in multiple interconnect design categories. The scaleable low-latency switch satisfies many different integrated circuit layouts for multiple design categories in a very broad market.

The scalable low-latency switch is made up of a large number of extremely simple control cells (nodes). The control cells are arranged into arrays. The number of control cells in an array is a design parameter typically in the range of 64 to 1024 and is usually a power of 2. The arrays are arranged into levels and columns. The number of columns typically ranges from 4 to 20, or more. When each array contains $2^J$ control cells, the number of levels is typically J+1. The scalable low-latency switch is designed according to multiple design parameters that determine the size, performance and type of the switch. Switches with hundreds of thousands of control cells are laid out on a single chip so that the useful size of the switch is limited by the number of pins rather than by the size of the network.

The multiple design parameters of the scalable low-latency switch determine a circuit layout for constructing the switch. In addition to the number of control cells in an array and the total number of arrays, other design choices are made. In a basic design the control cells have two data input ports and two data output ports. More complex designs, such as a "paired-cell" design, combine elements of the basic cell to form larger control cell units. The larger cell units form more complex nodes. An advantage of compound cells such as the paired-cell design is a lower overall latency as well as a reduced variability of latency. Compound cells may be called "flat latency" switches due to the reduced latency variance in comparison to the basic design. The paired-cell design includes more gates than two single cells but, due to the flat latency, is desirable in supercomputer use and as the switching fabric for fast networks such as Gigabit Ethernet and ATM switches.

Design parameters further include timing types including a basic timing scheme and a pipelined logic scheme. The pipeline logic "ripples up" through the network and is therefore called a ripple-up design. Ripple-up pipeline logic transmits messages through the network in fewer clock periods. In contrast the basic timing design operates an integrated circuit chip at the fastest possible I/O rates.

Messages typically enter arrays of the interconnect structure at a top level (level L) and exit through a bottom level (level 0). Messages "wormhole" through control cells on the chip with data bits traveling from the left to right and from top to bottom. In a simple timing scheme, header bits move between cells on a given level in two ticks (two clock periods) and between nodes on different levels in one tick. Payload bits, like header bits, use two ticks to move cell-to-cell on the same level, and effectively 0 ticks moving downward from level to level. In the ripple-up timing scheme the header and payload bits use only one tick to move between nodes on a given level. Payload bits use effectively 0 ticks passing down from level to level. In the paired-cell design, messages move between cells at a given level only when deflected. Therefore messages that are not deflected have payload bits that move directly from input pin to output pin. The pin-to-pin connection is achieved using a timing scheme that enables message wormholing.

Some embodiments of the switch include a multicasting option in which one-to-all or one-to-many broadcasting of a message is performed. Using the multicasting option any input port can optionally send a message to many or all output ports. The message is replicated within the switch with one copy generated per output port. Multicast functionality is pertinent to ATM and LAN/WAN switches as well as supercomputers. Multicasting is implemented in a straightforward manner using additional control lines which increase integrated circuit logic by approximately 20% to 30%. A multicast switch combined with ripple-up logic raises the complexity of timing issues, especially since designs include flat-latency operation.

In an actual implementation, a silicon switch having the topology of the interconnect structure is pin-limited. Alternatively stated, the minimum number of logic gates that are needed to construct the switch is substantially smaller than the number available. As the size of an integrated circuit chip increases, the area increases as a square, while the circumference increases linearly. Accordingly, a larger integrated circuit chip has many more gates than are warranted by the number of I/O pins. In accordance with some embodiments of the present invention, excess logic gates are employed to achieve low latency. In accordance with other embodiments of the present invention, LAN messages of 2 Kbytes or more include many dynamic FIFO buffers that consume excess logic gates.

A Multiple Level Minimum Logic (MLML) Network is taught in U.S. patent application Ser. No. 08/505,513, entitled "MULTIPLE LEVEL MINIMUM LOGIC NETWORK", by Coke S. Reed and filed on Jul. 21, 1995, which is hereby incorporated by reference in its entirety. An optical embodiment of the Multiple Level Minimum Logic network has a structure in which the nodes of an outermost cylinder (a top level) have input ports to receive messages. At a tick of a global clock, messages are inserted into an unlocked node of the outermost cylinder. The optical interconnect lines (fibers) between the nodes transmit messages such that an entire message fits between adjacent notes.

Although the Multiple Level Minimum Logic network transfers messages without the usage of electronic storage such as memories or buffers, in an electronic design implementation of the Multiple Level Minimum Logic network the interconnect lines between the nodes may be implemented as First-In, First-Out (FIFO) Buffers. For example, one possible embodiment of an electronic version of the Multiple Level Minimum Logic network may be primarily constructed from FIFOs and have a minimum latency through the chip of at least the number of transitions between nodes times the message length time the clock rate of the circuit. An electronic design that eliminates the FIFO buffers would result in a minimum latency of the number of node transitions times the circuit clock rate, a substantially reduced latency. Moreover, eliminating the FIFO buffers allows the chip to be composed primarily of cells or nodes rather than FIFO elements, advantageously allowing much larger networks to fit on a chip as well as greatly reducing latency by utilizing wormhole routing.

An interconnect structure using the scalable low-latency switch employs a method of achieving wormhole routing through the integrated circuit chip through a novel procedure for inserting messages into the chip. Rather than simultaneously inserting a message into each unblocked node on the outer cylinder at every angle, messages are inserted simultaneously into two columns A and B only if an entire message fits between A and B. Messages are inserted into column 0 at time 0. Messages are inserted into column 1 at time $t_0+t_C$, where time $t_C$ is the time for a first bit of a message to move from column 0 to column 1 on the top level. Messages are inserted into column 2 at time $t_0+2t_C$, and so forth. The strategy advantageously prevents the first bit of one message from colliding with an interior bit of another message already in the switch. Therefore, contention between entire messages is addressed by resolving the contention between the first bit only with the desirable outcome that messages wormhole through many cells. In many cases, the first bits of the payload exit the chip before the tail end of the payload has entered.

In accordance with one aspect of the present invention, a lower latency design is achieved using excess logic gates by constructing a switch with two to four or more times as many columns as are warranted by the number of input and output pins. Columns in excess of the number of input pins have no input connection, reducing congestion in the switch by effectively reducing the probability that a message is deflected by another message during passage through the switch. Latency increases upon each occurrence of a deflection. Supplying additional columns that are not connected to input lines substantially reduces the message-flow density within the switch and advantageously decreases latency. In various embodiments of the present invention, a variety of input port and column configurations are defined to adjust and tune the density of message flow, and take advantage of the comparative abundance of internal logic relative to I/O connections.

In accordance with another aspect of the present invention, various output port and column configurations are defined to support different interconnect objectives. The two primary categories of interconnect structures are supercomputer and network (LAN/Internet) design structures. A supercomputer output port configuration disregards the column address of an output signal and drains a message immediately out of the switch. A message has multiple exit ports to one target, a set of external buffers. The size of a switch is equal to the number of rows, even though many columns are included in the design.

In contrast, a network (LAN) output signal may use a particular column address relating to a particular message destination of a plurality of destinations. The size of the output structure is the number of rows times the number of external columns, an output configuration that is substantially opposite to the output configuration of a supercomputer.

In summary, one output design, applicable to supercomputers, supplies a highest bandwidth and lowest possible latency. A second design, applicable to networks, supplies the largest number of ports possible.

In accordance with various embodiments of the present invention, a scaleable, low-latency switch supports a wide range of interconnect objectives for many interconnect applications. The scaleable low-latency switch supports flat-latency control cells and single-row control cells. The switch supports single-tick timing and ripple-up logic timing. The scaleable low-latency switch supports multicasting in some embodiments and does not support multicasting in other embodiments. Various embodiments of the scaleable low-latency switch support different input port configurations to variably set message-flow density and support different output port configurations for applications ranging from low-latency supercomputers to multiple port LANs. The switch supports a variety of messages from small supercomputer message to enormous LAN messages.

In accordance with another aspect of the present invention, the scalable low latency switch is implemented as an optical embodiment with several advantages over the MLML Network patent in addition to wormhole routing. Moreover, in some embodiments a message header is processed in an electronic network that sets the gates in a "slave" optical network carrying only the payloads. The electro/optical hybrid switch advantageously exploits the superior features of each technology.

Many advantages are attained by the scaleable low-latency switch. The switch advantageously has a very high bandwidth and a very low latency, and an interconnect with many hundreds of ports is easily implemented on a single chip.

In some embodiments, the scalable low-latency switch is implemented on a single chip. Typically, conventional networks are implemented as a collection of independent nodes that are interconnected on circuit boards and with multiple cables. The conventional implementations are expensive and require many chips, circuit boards and high-speed cables. Conventional implementations have a latency that is optimally a few microseconds to a few hundred microseconds even for very low message densities. In contrast, the latency of a fully-loaded 512-port scalable low-latency switch is easily within 20–100 nanoseconds using current ASIC technology.

The advantages of the interconnect structure and scalable low-latency switch are depicted in the following table which compares the characteristics of current conventional network and interconnect designs to structures using the scalable low-latency switch:

| Conventional Network Implementations | Scalable Low-Latency Switch |
|---|---|
| Multiple, separate nodes that are interconnected on circuit boards using cables, resulting in a large and expensive system | All control cells (nodes) are on one low-priced integrated circuit chip using current ASIC processes |
| Nodes are complex including logic for examining all address bits, routing flags, and to support multiple input terminals (typically receiving four or more input signals) | A node is a simple cell with less than a few dozen gates. One integrated circuit chip supports many hundred thousand cells, providing very many concurrent message paths from any input to any output |
| Nodes generally include a buffer that holds an entire message | Only one or two bits of a message are held in a dynamic shift register of a cell. A message is always in motion |

-continued

| Conventional Network Implementations | Scalable Low-Latency Switch |
|---|---|
| Multiple messages entering a node may compete for the same exit path | A "busy signal" sent from a first cell to a second cell prevents the second cell from causing a possible collision |
| When two or more messages compete for the same path, a "collision" occurs that is subsequently handled | Messages never collide since an exit path is always available to every cell. A competing cell receives a busy signal and is denied use of the path |
| A node must examine the message address and generally other routing flags to determine how to handle a message | A cell examines only two bits of the message plus a busy signal to determine routing, a process that is easily performed in a single clock period |
| In some conventional networks, a collision causes a message to be re-routed through the network, wasting all progress gained toward reaching a target | Collisions never occur, instead a message may be deflected to an adjacent cell which is the same distance away from the target. The deflection process consumes only a few clock periods |
| In some conventional networks, a collision causes an entire message to be buffered, or stored, within a node, thereby slowing progress, degrading latency, and complicating the node's logic | No more than one or two bits are temporarily held in a dynamic shift register cell. Messages never stop moving |
| Message multicasting is generally not supported | An embodiment of the scalable low-latency switch supports one-to-all, and one-to-many message routing (multicasting) in addition to one-to-one routing of other messages |
| Multiple messages do not wormhole through the network | Messages span multiple control cells, and always wormhole through the network such that the head of the payload may exit the chip even before the tail has entered the chip |
| As the size of a fully loaded network increases to a few hundred or thousand ports, the effective throughput goes to zero and the latency increases to unacceptable lengths | As a fully loaded scalable low-latency switch increases in size to infinity, the throughput of a preferred embodiment remains greater than 40%, and the latency distribution remains narrow |
| Current network designs cannot simultaneously support thousands of ports, high throughput, and low latency | The scalable low-latency switch simultaneously supports many thousands of ports, high throughput, and low latency |

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings. The use of the same reference symbols in different drawings indicates similar or identical items.

FIG. 1D is an overview diagram of a general method for moving data in the form of messages through the interconnect structure.

FIGS. 2A, 2B and 2C are schematic diagrams illustrating the layout of messages that are transported through the switch shown in FIG. 1A. FIG. 2A relates to a message that has a row header. FIG. 2B relates to a message having both a row and column header. FIG. 2C relates to a message for multicasting.

FIG. 18B is a table describing how the many combinations of input values to a flat-latency control cell determine what state it is in. The state is used to control the flow of the 0, 1, 2, 3 or 4 messages entering the cell.

The use of the same reference symbols in different drawings indicates similar or identical items.

DESCRIPTION OF THE PREFERRED EMBODIMENT(S)

A scalable, low-latency switch for high-bandwidth communications and computer network applications has many alternative configurations for performing many types of functions and a wide range of capacities and performance characteristics. A first embodiment describes a switch that is derived from power-of-2 design rules, supports message wormholing, handles only a single message length, point-to-point message transmission, has a fixed number of rows per level, and is not optimized for a flat latency distribution. The description of the first embodiment of Switch 100 forms the base upon which desired additional functions and features are built. Additional functions and features generally include multicast (one-to-many) transmission capability, variable-length message switching, low-latency transmission, multi-chip implementation, and control of an optical switching fabric. Various embodiments of the interconnect structure are discussed in detail in Reed, U.S. patent application Ser. No. 08/505,513.

Figure 1A:
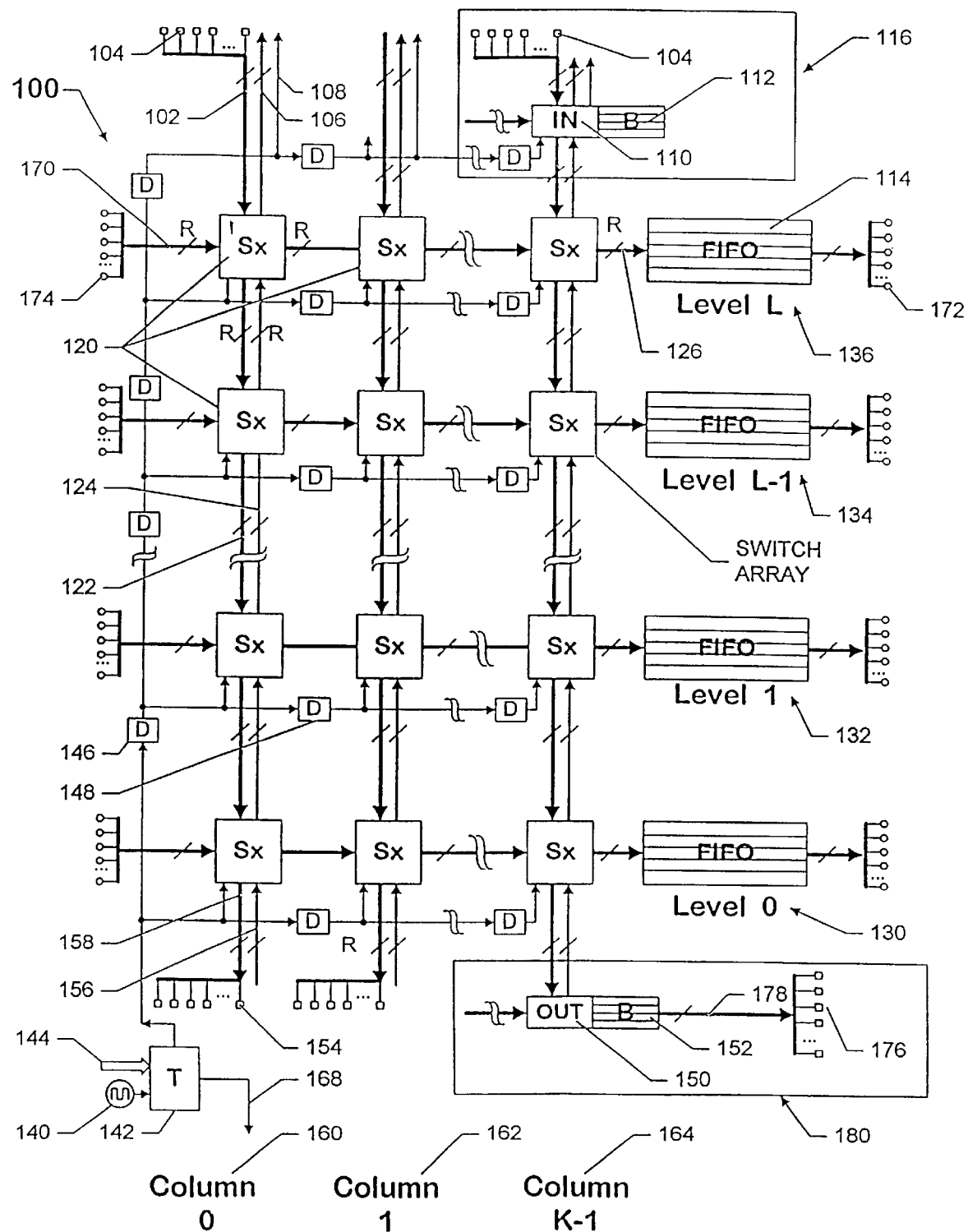
FIG. 1A is a block diagram illustrating fundamental components of a scaleable, low-latency switch and a structure for interconnecting the fundamental components in a schematic overview form that is applicable to several embodiments of the present invention.

Referring to FIG. 1A, an embodiment of the Scaleable Low-Latency Switch 100 includes multiple rows of serial data transmission devices arranged in multiple columns 160, 162 and 164, and at multiple levels 130, 132, 134 and 136. The levels are interconnected at each column by a structure of data busses 122 and control busses 124. L+1 levels are enumerated as level 0 130, level 1, 132, through level L 136. The levels include a plural number rows R 170. The rows perform serial data transmission 126 interconnecting a sequence of switch arrays 120 and an optional first-in, first-out (FIFO) serial delay element 114 situated along each row of each level.

Serial data in the form of a message enter into Switch 100 through data input busses 102 at all or at many columns. The data input bus 102 includes a plural number of serial data input ports 104. Serial data exit from the Switch 100 by data output lines 158 at each column. The data bus includes a plural number of serial data output ports 154. Referring also to FIG. 2A, a message 200 entering at any input port 104 advantageously exits at the output port 154 specified in the message header. In one embodiment, consisting of a semiconductor chip implementation of Switch 100, input port 104 includes an input pin connection, and an output port 154 includes an output pin connection on the chip. In another embodiment designed for high-speed operation a plural number of pins service a single input port or output port connection. Multiple chips operate in parallel to produce a large, high-speed, very low-latency switch. In yet another embodiment designed for a very large number of I/O ports a plural number of specially interconnected chips constitute a single implementation of Switch 100.

In one embodiment of switch 100, K columns enumerated 0, 1, . . . ,K−1, each containing R 170 serial data transmission lines are connected to yield up to R times K input ports 104, and up to R times K output ports 154. The number R of the data lines is preferably equal to or less than $2^L$ where L+1 is the number of levels of Switch 100. In one embodiment of switch 100, R 170 is equal to $2^2L$, and K is preferably an even number to achieve advantageous minimal message-blocking, discussed later. In one embodiment of switch 100 the number of rows 170 at a lower level j is greater than the number of rows at a level j+1 above it; in this embodiment R 170 refers to the number of rows at the bottom level. Table 1 has examples of sizes of Switch 100 for a wide range of preferred values of K and L. In some embodiments of Switch 100 the number of addressable ports is the same as the number of rows, the columns advantageously provide a substantial increase in bandwidth to the port.

TABLE 1

| Levels (L + 1) | Columns (K) | Rows ($2^L$) | Ports (Rows*K) |
|---|---|---|---|
| 4 | 4 | 8 | 32 |
| 4 | 6 | 8 | 48 |
| 5 | 8 | 16 | 128 |
| 6 | 8 | 32 | 256 |
| 6 | 10 | 32 | 320 |
| 7 | 12 | 64 | 768 |
| 8 | 16 | 128 | 2,048 |
| 9 | 16 | 256 | 4,096 |
| 11 | 28 | 1,024 | 28,672 |
| 15 | 24 | 16,384 | 393,216 |
| 19 | 32 | 262,144 | 8,388,608 |
| 21 | 36 | 1,048,576 | 37,748,736 |

Referring to FIG. 1A, a plurality of column timing-control lines 108, each associated with a column 160, 162 and 164, signal that the respective column is ready to receive data from an external device. A plural number of port-available lines 106 at each column, in conjunction with column timing-control line 108, signals that a corresponding serial input port 104 is available to receive data. In one embodiment shown in structure 116, a plural number of buffers 112 accept a serial message and store it for subsequent injection into a switch array 120 at top level L 136. Optional input structure 116 in conjunction with input buffers 112 controls the timing of the entry of a message 200 into Switch 100, and controls the subsequent buffering and injection of the serial message into a switch array 120 at the top level 136 of Switch 100. In another embodiment of Switch 100, structure 116 is omitted and data moves immediately from input 104 to switch array 120.

A plural number of output control lines 156 at each column accept a device-ready signal from an external device. The signal indicates that the external device is ready to accept a message 200 from a corresponding serial output port 154. In one embodiment shown in output structure 180, a plural number of output buffers 152 store a message after it has been routed through Switch 100. In another embodiment of Switch 100, structure 180 is omitted. In this embodiment a switch array 120 at the bottom level is directly connected to output ports 154. Additionally, output control lines 156 are similarly connected to the switch array 120 at the bottom level.

A message in the form of serial data enters the uppermost level 136 from input 104 into switch array 120. In one implementation, the message subsequently moves right to the next switch array. The next switch array determines if the message should be sent downward to the next lower level 134, or if it should be sent right and remain at the same level 136. A message that remains at the same level may have an opportunity to move downward to the next lower level after it has moved right to the switch array 120 at the next column. A message that drops downward to the next lower level 134 enters the switch array at that level where it immediately moves right the next switch array 120 at the same level 134. Messages entering a switch array 120 from the upward level always exit that switch array to the right. Messages entering a switch array 120 from the left exit the array to the right or downward.

If a message from the upward level enters the at right-most column 164, or if a message from the left reaches the right-most column, the message enters optional serial FIFO delay device 114. After exiting the FIFO, the message is conveyed to row exit point 172. In one embodiment, exit point 172 connects to input port 104, in another embodiment, the point connects internally to row entry point 174 on the same row at the same level, or is connected externally to point 174 at the same level on another chip. A message remaining at a particular level may have an opportunity to drop downward to the next lower level each time it moves right and enters the switch array 120 at the next column. In one embodiment, FIFO 144 is fixed in length; in another embodiment, the FIFO is variable length to allow efficient variable-length message processing; and in yet another embodiment, the FIFO is omitted altogether. The structure and function of the FIFO is discussed in detail later.

The timing of a message 200 entering Switch 100 is regulated by the column-ready signal 108 in conjunction with port-busy signal 106, such that the first bit of the message enters the switch at a time determined by timing control structure 142. The structure is controlled externally by clock signal 140 and message-length control signal 144. All messages that enter an input port 104 at the same column enter at the same time. Messages entering a column to the right of that column enter at a slightly later time, such that the header bits of all messages on the same level are aligned even if the messages entered the level at different columns. In contrast, messages enter at all columns at the same time in the MLML Network discussed in Reed, U.S. patent application Ser. No. 08/505,513. In the illustrative embodiments of Switch 100, only one or two bits extend between the columns, rather than all bits of the entire message in a routing technique termed message "wormholing". The inter-column timing is regulated by delay element 148, timing is discussed later. In one embodiment of Switch 100, the timing of a message entering a switch array 120 at a given level is different from the timing of a message entering another switch array at the same column at a different level. In this embodiment the inter-level timing is regulated by delay element 146. In another embodiment, the global clock timing is the same for many or all levels and delay element 146 is omitted.

Connections at One Level

Figure 1B:
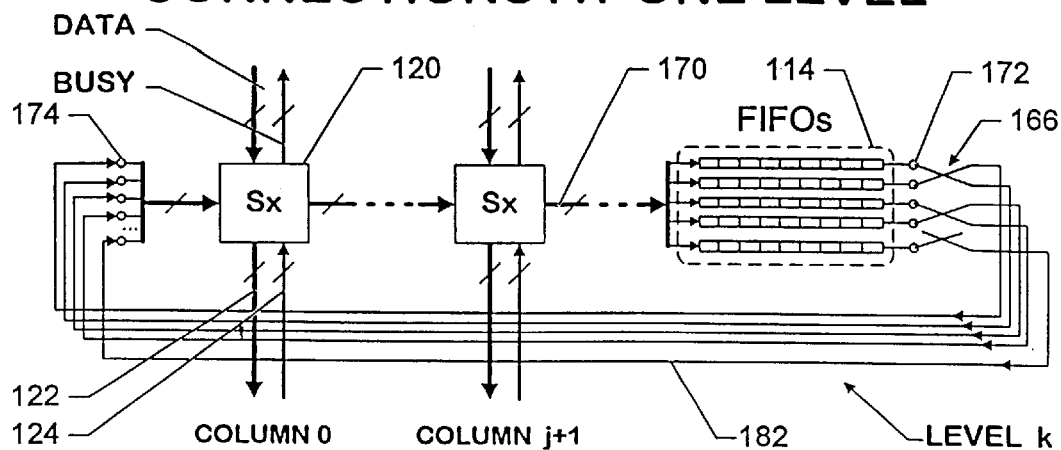
FIG. 1B is a diagram that shows the right-to-left connections at one level of the block diagram.
Figure 21A:
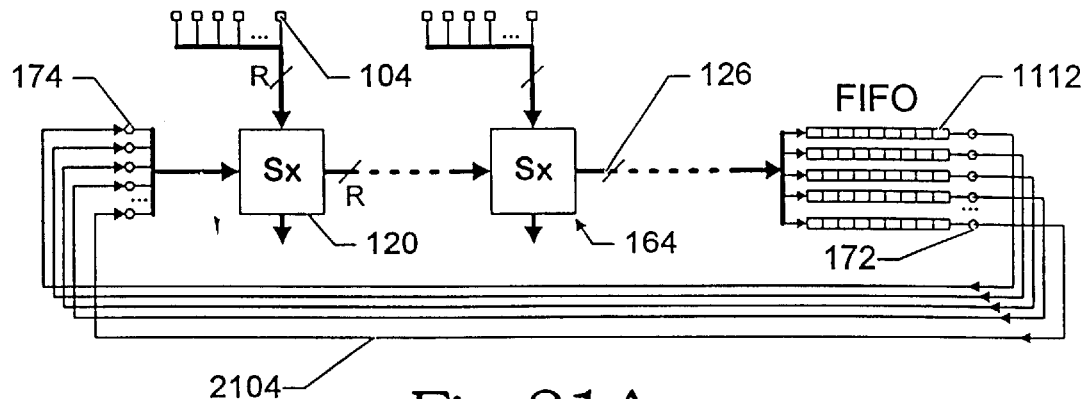
FIGS. 21A, 21B and 21C show various right-to-left interconnections at a level or at levels, for a variety of advantageous design requirements.
Figure 21B:
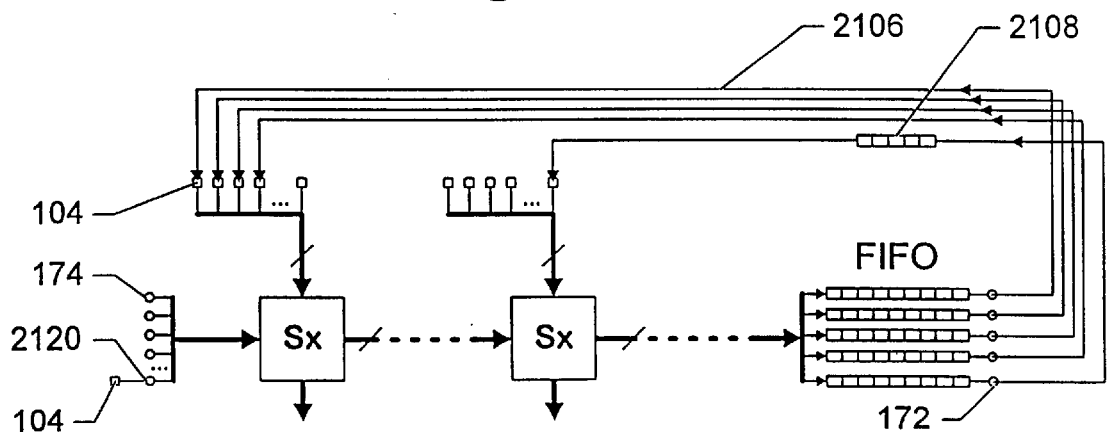
Figure 21C:
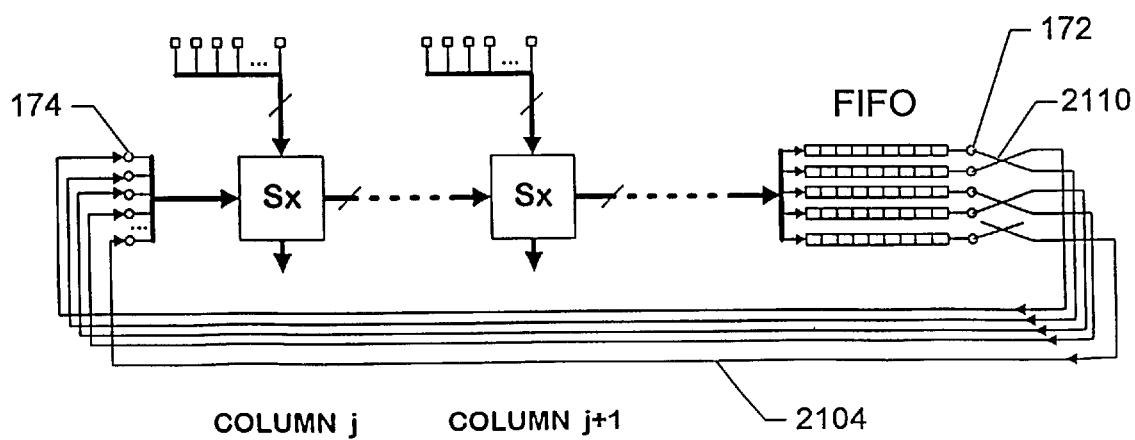

Referring to FIG. 1B in conjunction with FIG. 1A, the connections of rows 182 from right to left at one level are shown. Right-hand exit point 172 is connected back to the left to a row input point 174 at the same level. In some embodiments, a permutation 166 may be utilized in which a message exiting at the right-hand side is routed to a different row at the left hand side of the same level. In other embodiments a connection at the right hand side is connected to the same row. FIGS. 21A, 21B and 21C also show alternate ways of connecting the left and right-hand points.

Generalized Embodiment

Figure 1C:
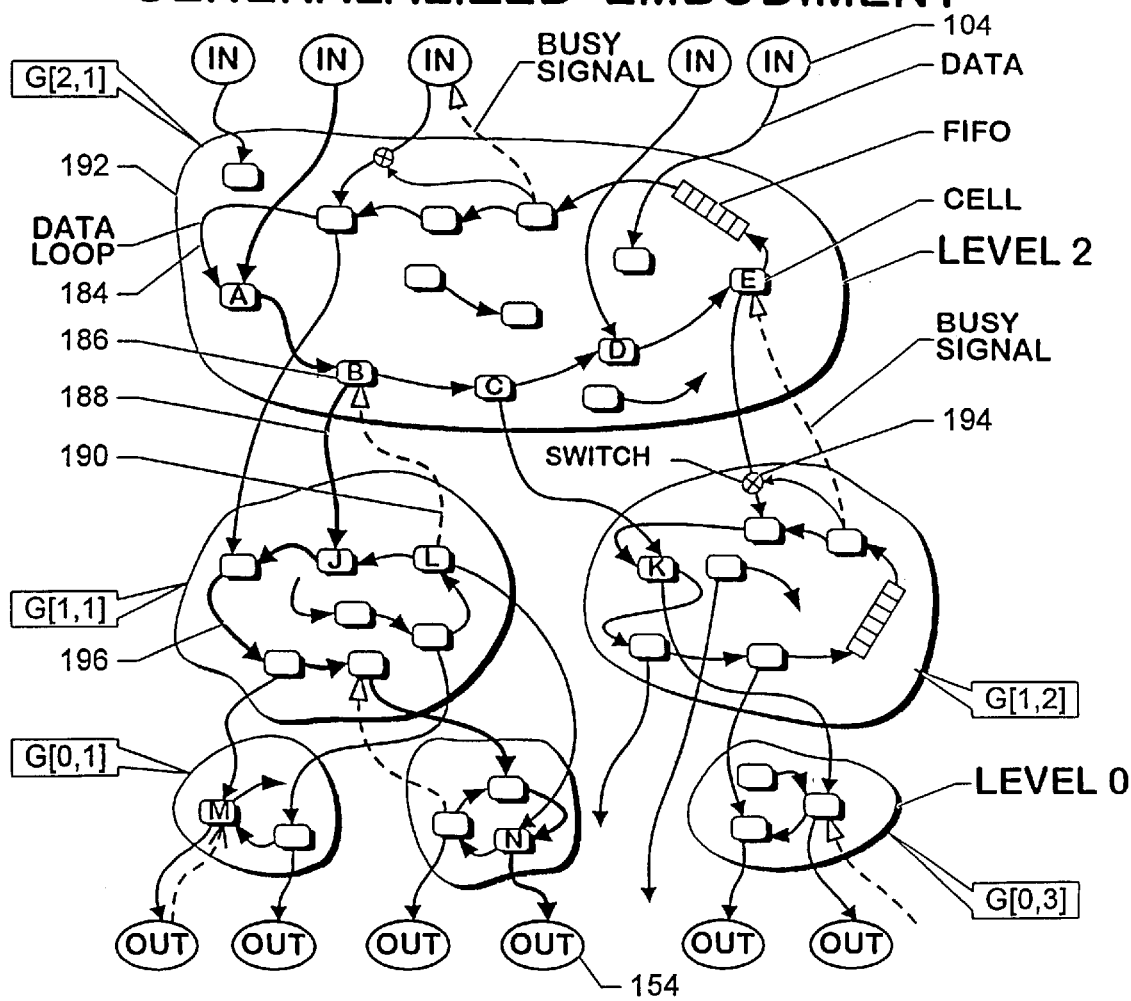
FIG. 1C is an abstract schematic diagram of a generalized embodiment of the interconnect that shows how control cells are members of groups, how groups are interconnected, how data flows from cell to cell and how control signals are connected.

FIG. 1C is a general diagram of Switch 100. In this Figure many components such as control cells and interconnections between control cells are omitted for the sake of clarity. (In this figure the terms "left" and "right" refer to an input path and an output path, respectively, connected to cells at the same level.) Control cells 186 are members of one or more groups of cells at the same level. A group 192 contains one or more data loops 184. In FIG. 1C the top level includes a single group G[2,1] 192, where the first parameter (2) indicates the level and the second parameter (1) indicates a specific group at that level. Cell B 186, within group G[1,1], is connected to other cells that, taken together, form a continuous data loop 184. Data in the form of a message circulating through loop 184 moves through cells A, B, C, D, E, and beyond. In some embodiments where the message length is long, a FIFO is included in data loop 184. A message circulating in a data loop has opportunities to move downward to cells in any connected groups at a lower level, such as from G[2,1] to G[1,1] or to G[1,2]. In some embodiments, two groups are connected below each group, constituting sets of multiple "binary tree" type connection paths. A message entering cell B 186 has an opportunity to drop downward 188 to level 1 into group G[1,1]. A message at the next cell, cell C in this example, has an opportunity to drop to another group, G[1,2], which connects the message to a different set of targets 154. In some embodiments a message does not have to move through more than two cells in one group before having an opportunity to drop to either group at the lower level.

A message entering cell 186 B may preferentially move downward on interconnect 188 to cell J to at the lower level because cell J is located on a path that connects cell B with the message target N 154. Cell L (at the lower level) is also connected to cell J. If a message moves from cell L to cell J, then cell L at the lower level has priority. Priority is signaled by cell L sending busy signal 190 to the cell B above, informing cell B not to send a message down. In some embodiments, switch 194 on the downward path 188 is also activated by busy signal 190, preventing any message from the signaled cell colliding with a message on the shared path at the lower level. Switch 194 advantageously prevents a collision when an external device, such as an input at 104, fails to honor busy signal 190.

All cells have an exit path 196 to another cell (or to a FIFO) in the group of cells, and all cells have a busy-signal connection 190 to other cell(s) that share a common path. If for any reason a cell does not send a message downward, the cell sends the message on interconnect 196 to another cell in the same group 192 at the same level. A significant advantage of busy signal 190 is that exit path 196 is always available to a message entering from another cell in the cell group. A message remaining at a level does not lose the downward progress achieved moving toward the message target. The message immediately encounters other cells in the same group that are connected to a lower group which are on a path to the message target. A path of a message entering at cell A and exiting at cell N is shown in a heavy line in FIG. 1C.

Examination of FIG. 1A shows that many paths exist from any input to any output 154.

Overview of Method

FIG. 1D is an overview diagram showing a method of routing messages through Switch 100. Referring also to FIGS. 1A, 1C and 2A, in general, messages enter interconnect 100 at the top level and move downward and to the right where the messages are routed to the message target row at the bottom level. The target row address is encoded in the message header. In preferred embodiments, the most significant bit of the target address appears first and the least significant bit last. The payload follows the header (discussed for FIGS. 2A and 2B).

Messages move through Switch 100 by passing from one control cell to another. The structure of Switch 100 is intimately related to how messages are controlled, and is discussed in detail below. A control cell is located on every row at the intersection of every column and level, thus at every control array. All processing is performed within the simple control cells. No additional message-routing component is employed. A control cell contains only one or two bits of storage in the form of shift registers in the illustrative embodiment. Advantageously, no more than two bits of the message are contained within a control cell, reducing logic requirements and speeding a message's transit through the cell. As soon as the control cell determines where to send a message, the cell sets internal gates and routes the message either downward toward the target, or to the right to a cell in the same group. Messages generally span multiple control cells as bits of the message travel cell-by-cell through the interconnect in the process termed wormholing.

A control cell always has an available next path to the right 196, insuring that a message entering a control cell from the left always has an available exit. Desirably, a message is never buffered or held at a control cell, advantageously reducing the time of transit (latency) through a control cell. The cell desirably examines only a few header bits and a busy signal 190 from one or more nearby control cells to determine where to route the message. The determination is easily performed in a single clock period. If the control cell has a connection downward 188 to a group on a path that connects to the message's target and the connection is available, the message is sent downward moving the message closer to the target. Otherwise, the message is sent on the always-available path to the right 196 to another control cell, where the process is repeated.

When a message is sent downward the most-significant address bit is stripped, advantageously shortening the length of the header and reducing the number of bits the next cell has to read to determine the direction of the message. The next cell advantageously has immediate access to the appropriate header bit because no other address bits arrive sequentially ahead of the appropriate header bit. Stripping the most significant bit is advantageous because the stripped header bit has already been used to determine the current portion of the message's path through the interconnect and is no longer needed.

When a message is sent to a cell in the same group, the message does not lose the progress achieved in traversal of the interconnect structure toward the message target. The next cell to the right attempts to send the message toward the target. A message that is sent to the right is desirably delayed only one or two clock periods. A message that reaches the right-hand side of the interconnect is routed back to a cell at the left on the same level, as discussed in the description of FIG. 1C.

A control cell monitors only a few bits of the message header and a signal from another control cell to determine how to route the message. The determination is performed within a single clock period. Messages that move downward are directly connected to the cell below, bypassing the internal shift registers of the sending cell. The payload is delayed by no more than one clock period. In embodiments (not shown) in which a control cell has multiple paths downward, an unblocked message always has a connection toward the message target. In the multiple-path embodiment, the time elapsed for the first bit of a message to exit Switch 100 is one clock period for every header bit plus one or two times the number of deflections that have occurred in transit of the message through the interconnect. Messages wormhole through Switch 100 such that the first bits of the payload desirably exit before the tail of the payload has entered the switch. A message typically reaches one of a thousand rows with fewer than a dozen deflections. The first bit of the payload advantageously exits a 1000-port switch in less than 15 or 20 clock periods.

Message Layout

Referring to FIG. 2A, a serial message entering Switch 100 includes a traffic bit 202 which always has the value ONE, a row header 204 identifying the target row at the bottom level of the switch, and a payload consisting of serial data bits 206. The row header 204 is a binary encoding of the bottom-level target row in a manner such that the most significant bit (MSB) 208 of the target row address appears first and the least significant bit (LSB) 210 appears last. Payload 206 contains the data packet that is desired to be transported within Switch 100 from any input port 104 to any output port 154 or group of output ports. In some embodiments of Switch 100, payload 206 can be of variable length, which is controlled by dynamic timing structure 142.

Referring to FIG. 2B, in another embodiment of Switch 100, the bottom-level target row is determined by row header 204 as described above, and the target column is determined by column header 212. The column header contains a binary encoding of the column number. In this embodiment, the first header 204 determines the target row in the manner described for FIG. 2A, and the second header 212 specifies the target column. In this embodiment the message can circulate at the bottom level until it reaches the target column. In an alternate embodiment the message moves downward immediately to the first available buffer 152, discussed later. The total length 214 of message 200 includes the traffic bit 202, the header or headers 204 and 212, and the payload 206.

Referring to FIG. 2C, in another embodiment of Switch 100 that supports point-to-multipoint broadcasting, a multicast bit 220 indicates whether message 230 is to be transmitted to one output port 154, or to many output ports, or to all output ports. When multicast bit 220 is set to ZERO, the message is targeted to exactly one output port, and the successive bits in the message are treated as row header 204, optional column header 212, and payload 206, that is, the same definition as described for FIGS. 2A and 2B. When the multicast bit 220 is set to ONE, the next two bit positions are used as "upper half" 224 and "lower half" 226 markers, that is, they are utilized as a pair of single-bit registers (within the message header) denoting the status of the message as it moves through the switch. The remaining bits constitute a column bitmask 228. The details of multicast processing are discussed later. In another embodiment of Switch 100, multicast messages enter the switch at specific rows at any level using row entry point 174. This message is targeted to specific subsets of bottom-level rows.

FIGS. 2A, 2B, and 2C describe the message layout as it enters Switch 100 at input port 104 or row entry point 174. The message may be changed in length and in other characteristics as it progresses through the switch. It is the responsibility of an external device connected to an input port 104 to properly assemble a message as described in FIGS. 2A, 2B and 2C.

Switch Array Layout

Figure 3:
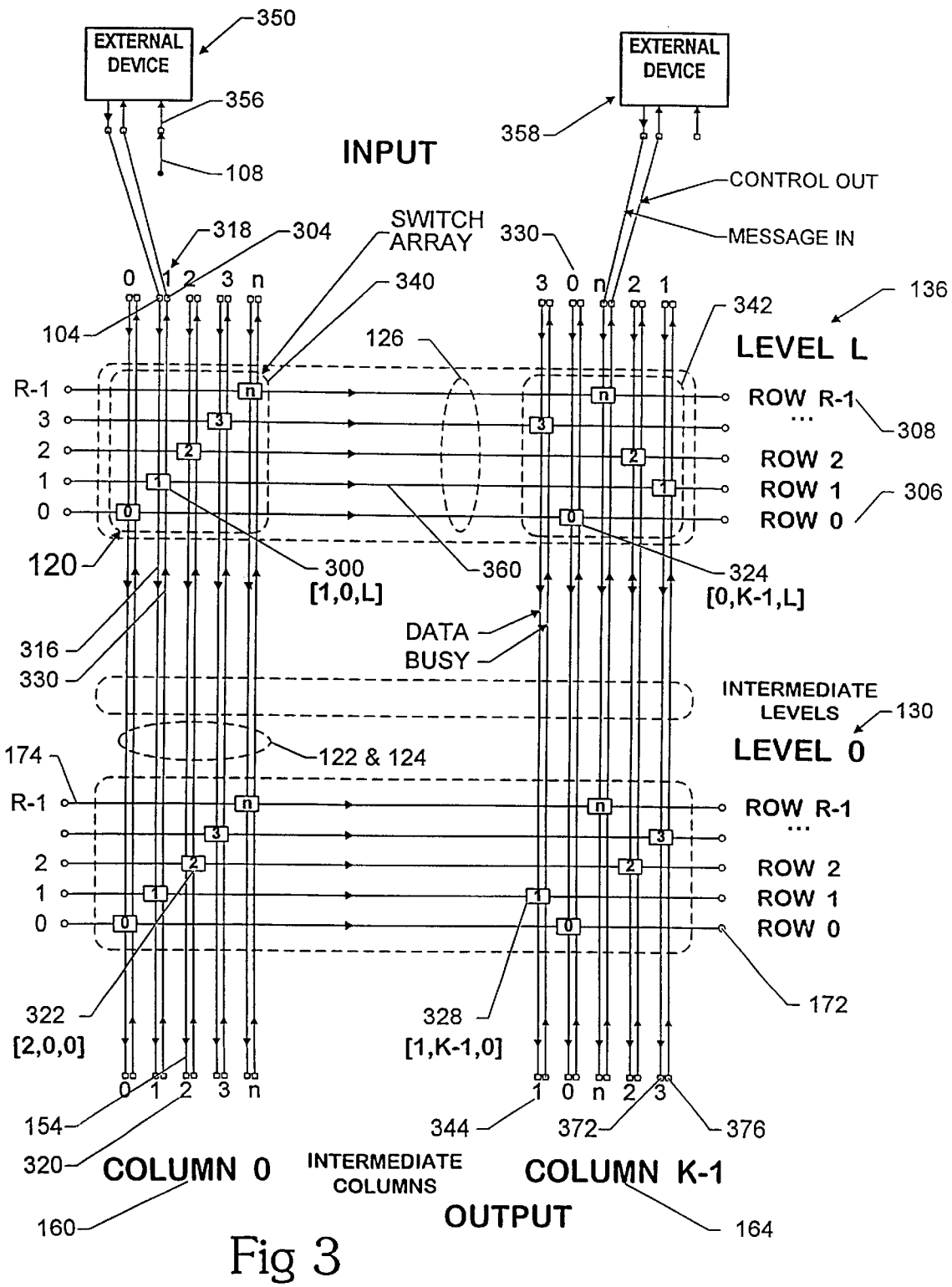
FIG. 3 is a schematic interconnection diagram showing interconnections of switch arrays including detailed interconnections of a switch array such as data and busy signal connections.

Referring to FIG. 3 in conjunction with FIG. 1, the switch arrays 120 each contain R control cells 300. A switch array 120 is located at the intersection of each column and level of Switch 100. In one embodiment of Switch 100, every switch array 120 contains exactly one control cell on any vertical data line 316 and exactly one control cell on any horizontal row 360. In some switch arrays the control cells are arranged in "identity configuration", that is, along the lower-left to upper-right diagonal, where the vertical position in the switch array is the same as the horizontal coordinate. The identity configuration is shown as switch array 340. In other switch array layouts, the control cells are arranged in a different configuration, such as shown in switch array 342. The particular arrangement of control cells in a given switch array is critical to the proper operation of Switch 100 and is discussed in detail later. In another embodiment of Switch 100 there is one control cell for every two rows 360 (not shown).

In one embodiment of Switch 100, each level 130 through 136 contains R serial data rows 126 numbered bottom-up from 0 306 through R-1 308. Each column 160 through 164 contains R serial data lines 122 from the upward level and R control (busy signal) lines 124 from the lower level. The numbering 318 of an input port 104 is determined by the location of the control cell 300 in the switch array below it. Switch array 120 at column 0, level L, contains a control cell 300 located on row 1. The location of the cell [1,0,L] is given by the row, column, and level numbers, respectively, of the control cell. Therefore, input port 318 is numbered 1, to match the row number of the control cell that it is connected to.

Similarly, output port 320 is numbered 2 because the port is connected on row 2 to control cell 322 at location [2,0,0]. Input port 330 is numbered 0 because the port is connected to control cell 324 at location [0,K–1,L]. Output port 344 is numbered 1 because the port is connected to control cell 328 at location [1,K–1,0].

Path 316 is serial communication line for transmitting a message down to a control cell within a switch array at the next lower level. The path is a member of data bus 120. Path 360 is a serial communication line for transmitting a message right to the next column at the same level, and is a member of data bus 126. Path 330 is a busy signal from the lower level and is a member of bus 124.

In some embodiments, switch 100 is configured as the internal network for interconnecting the multiprocessors of a supercomputer. In the configuration, device 350 is one of the processors. In another embodiment of Switch 100, device 350 represents a connection from one input port of a switching network, such as within ATM switch, in which case the embodiment functions as the switching fabric for the ATM switch.

In FIG. 3 the connection of external device 350 to switch 100 is illustrated. The location of external device 350 is on row 2 at column 0 160. External device 358 is connected at a different column 164, and receives a different column-ready signal. Similarly (not shown), external device 350 connects to output port 372, the port's busy signal 374, and to column output-ready signal 168. The output address of external device 350 is row 2, column 0, which is the same as the input address. The input ports 104 of Switch 100 are located at level L 136, and the output ports 154 are located at level 0 130, or the lowest level of the switch in an embodiment of Switch 100 that omits level 0. When a message 200 has completed transit through the Switch 100, no inherent indication of the entry row and column of the message is available. If the application or use of Switch 100 specifies that the "source address" be available to the target recipient, then the source address or identification is included within the payload 206 of the message.

FIG. 3 shows the control cells spread out in a sparse form to illustrate connection patterns. The layout and numbering scheme is also used to simplify subsequent descriptions. In an implementation on an integrated circuit chip the control cells are arranged on the silicon in such a way as to pack the logic gates more tightly than is shown in the figures.

I/O and Control Timing

Figure 4:
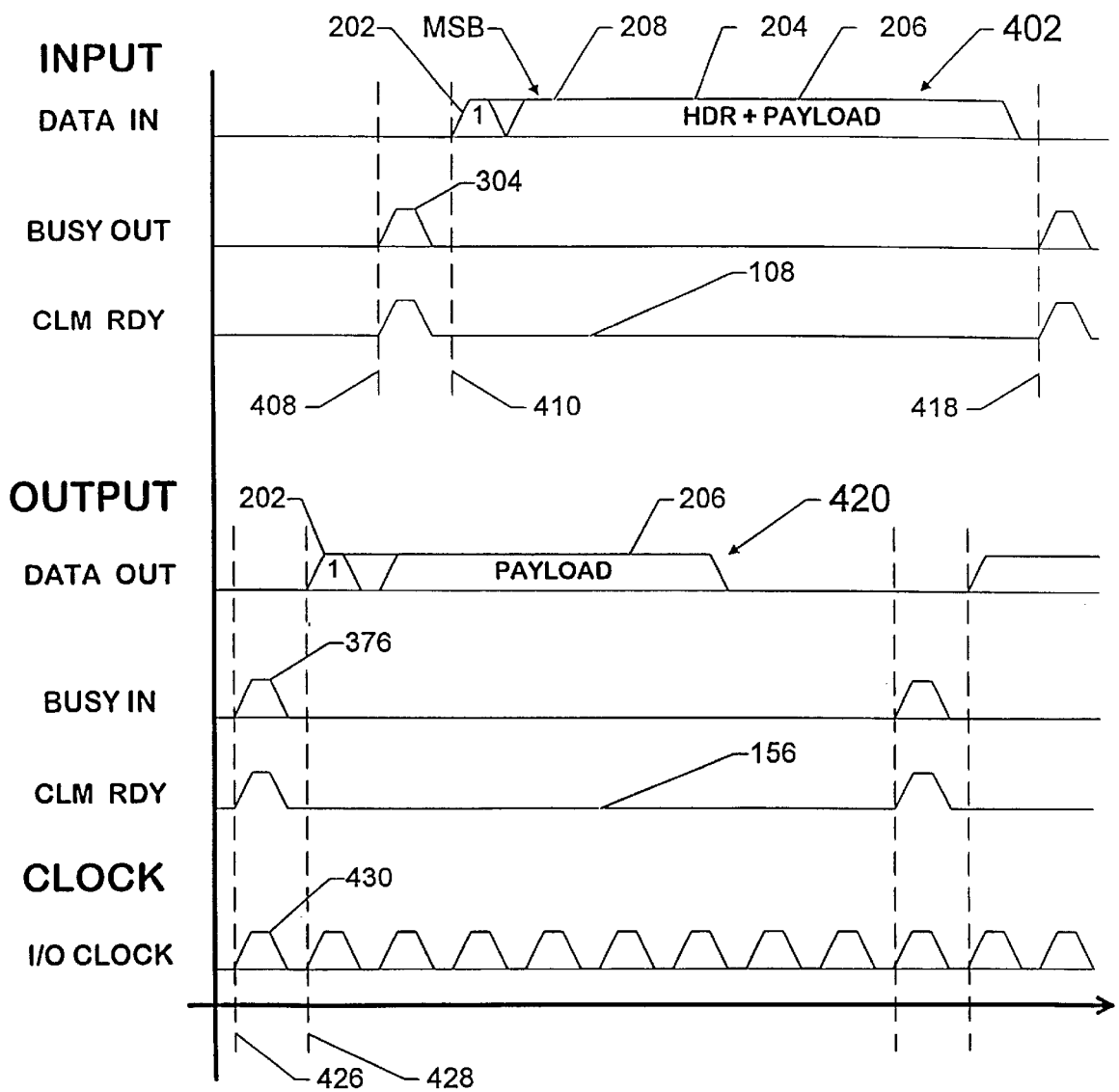
FIG. 4 is a schematic timing diagram showing Input Signal timing and Output Signal timing to depict the timing and control of messages entering and leaving a switch in a simplified embodiment of a communication technique.

The input interface to switch 100 is accomplished by column timing and control signals that govern the entry to the column port. FIG. 4 shows the timing of a message entering 402 and leaving 420 Switch 100, and the control and column-ready signals that control it. Referring also to FIGS. 1A, 2A and 3, a message 200 enters one embodiment of Switch 100 at input port 104 and the message exits the switch at output port 154. The timing of the entry of the message is controlled by column-ready signal 108. The first bit 202 of the message enters port 104 preferably one period after column-ready signal 108 goes active. If port-busy signal 304, associated with the input port 104, goes high, then message 200 is prohibited from entering that input port. The column-ready signal 108 controls all input ports located at a specific column 102, whereas port-busy signal 304 pertains to only a single input port 104. External device 350 must examine both the column-ready signal 108 and port-busy signal 304 to determine if input port 104 can accept a message.

Timing of the column-ready 408 and port-busy 304 signals is preferably one clock period 430 ahead of the timing 410 of the first bit 202 to enter the switch. In embodiments of Switch 100 that incorporate input buffering structure 116, the relative timing 410 of the first message bit 202 may be greater than one clock period after timing signal 408. This embodiment advantageously eases the timing requirements.

The first bit 202 of message 420 leaving the switch arrives at output port 154 at time 428, which is one clock period after column ready 156. At the earlier time 426, which is signaled externally by column-output ready signal 156, the switch can accept an output device-busy signal 376 from an external device which indicates the external device cannot accept a message. For example, the external device may be a buffer that is full. When the a message attempting to exit is blocked externally it remains in the switch and attempts to exit at a later time.

In embodiments of Switch 100 that incorporate output control structure 180, the timing of column-output ready signal 156 and the arrival of the first bit of message 420 is delayed from that indicated in FIG. 4. In these embodiments, the time between the periods 426 and 428 is increased with the advantage of easing the timing requirements of externally connected devices. In another embodiment of Switch 100 external busy signal 376 is omitted and the message always exits the switch when it reaches its target port.

Tri-State I/O and Timing

Figure 5A:
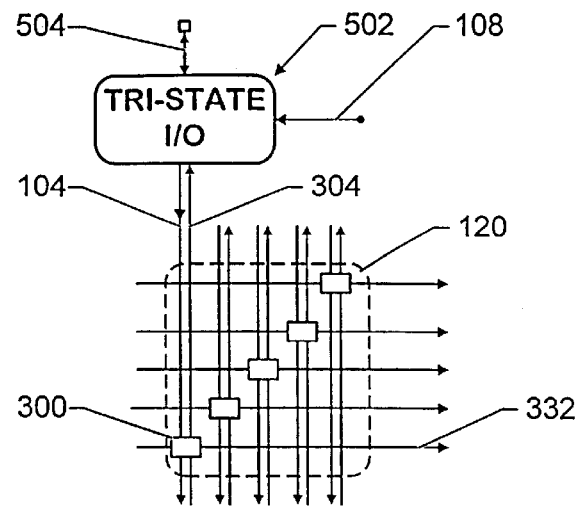
FIG. 5A is an abstract schematic interconnection diagram showing a tri-state input connection to the switch.
Figure 5B:
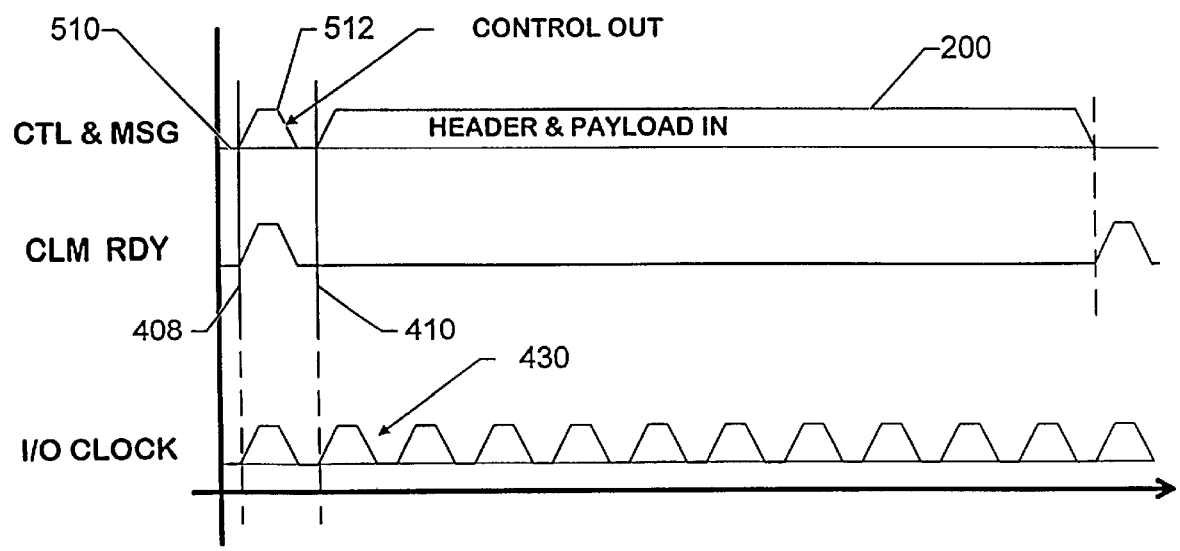
FIG. 5B is a timing diagram showing control timing signals applied to the switch shown in FIG. 5A using tri-state timing which permits the use of only a single pin for control (output) and data (input) because of the control and data signals are generated at different times.

Referring to FIG. 3, in one embodiment of Switch 100 each input connection has associated with it a message input connection 104 from external device 350, and a port-busy signal 304 to the external device. In this embodiment, two external connections, or pins, are required for each input port connection. Similarly, in the same embodiment, two external connections 372 and 374 are required to support one output connection. Referring to FIGS. 4 and 5B, the emission of port ready signal 304 at time 408 occurs one clock period 430 ahead of the entrance of the first bit 202 of message 200 at time 410. Because of non-overlapped timing condition, a single tri-state connection 504 accommodates both signals. The external connection 504 is controlled by tri-state input structure 502, which outputs port-busy signal at time 408, and subsequently accepts message 200 for input. That is, at time 408 tri-state input structure 502 receives column ready signal 404 from timing-signal line 108. At time 404 external connection 504 is connected to port-busy signal line 304 for one clock period 512. At time 410, the external connection 504 is connected to input port 104 until timing signal 408 is again received 514. Tri-state input connection replaces input port 104 and port-busy connection 304, advantageously replacing two external connections with a single pin.

Similarly, a tri-state output structure (not shown) provides a single external connection for output port 372 and external port busy signal 374. The tri-state output advantageously reduces the number of output pins by a factor of 2. In the preferred embodiment of Switch 100, all external input and output connections use tri-state I/O. Tri-state control 504 is not referred to in any subsequent discussions; instead ports 104 and 174 are references as I/O ports with the understanding that tri-state I/O is optionally available.

Placement Sequence Method

The layout of control cells 300 within switch array 120 accomplishes permutations of the message flow (to be discussed later) which is highly advantageous in achieving successful operation and performance of Switch 100. Referring to FIG. 3, the layout of control cells 300 in a switch array at a given level and column is determined by a placement sequence. The placement sequence is generated following the rule that consecutive cells along a given row 360 are preferably positioned alternately over upper and lower-positioned rows at the next level downward (not shown). That is, the layout follows the sequence: upper, lower, upper, lower, etc. Further, the switch array layout is always performed in a manner such that no control cell 300 is located on the same row 360, or vertical path 316, as any other cell in the same switch array 120; and there is always a control cell 300 on every row 360 in every switch array 120.

Figure 6A:
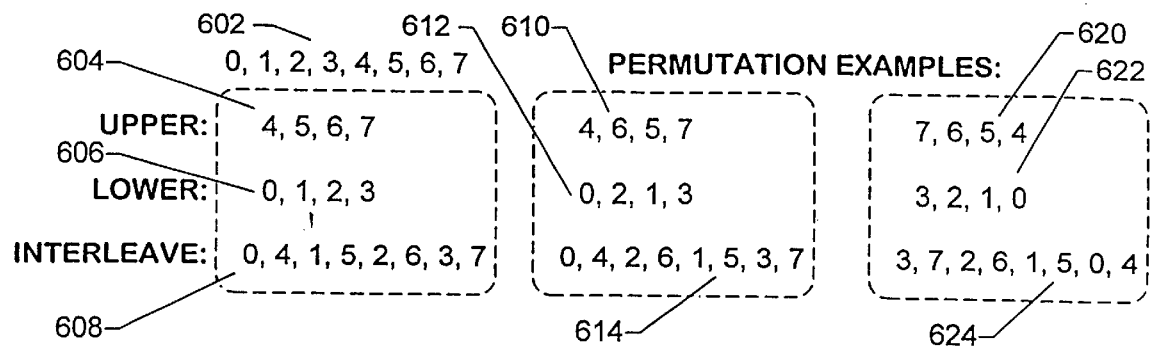
FIGS. 6A and 6C are, respectively, an 8-row table and a 16-row table
Figure 6B:
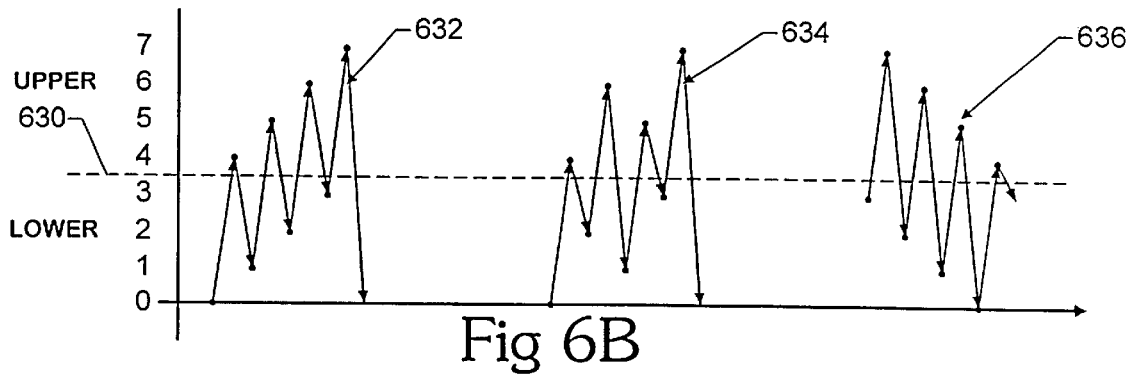
FIG. 6B is a schematic graph depicting a method for generating a placement sequence for locating control cells within switch.

FIG. 6A illustrates a placement generation method for 8 rows. Using zero-origin numbering, the 8 positions (0, 1, 2, 3, 4, 5, 6, 7) 602 are divided into an upper-half sequence (4, 5, 6, 7) 604 and a lower-half sequence (0, 1, 2, 3) 606. The final placement sequence 608 is formed by alternating and merging the upper and lower sequences. Referring to FIG. 6B the placement sequence 608 is shown graphically in plot 632. Line 630 graphically divides the plot into upper and lower sections and shows that the sequence alternates in upper-lower-upper-lower, etc., fashion.

Any permutations of the upper and lower sequences, respectively, can be used to generate a placement sequence. It is advantageous to use a rule to generate a permutation. Where R is the number of rows at a level and N=R/4, select every Nth value, repeating as necessary. For example, for 8 rows 602, 8/4=2 so therefore select every 2nd value from (4, 5, 6, 7) 604 and (0, 1, 2, 3) 606 to get (4, 6, 5, 7) 610 and (0, 2, 1, 3) 612, respectively. These two permutations are merged in alternating sequence to form the placement sequence (0, 4, 2, 6, 1, 5, 3, 7) 614. The sequence is shown graphically in plot 634. Another rule is to use descending sequences (7, 6, 5, 4) 620 and (3, 2, 1, 0) 622. These are merged to form placement sequence 624, shown in plot 636. The alternate-and-merge operation insures that the final sequence crosses the upper-and lower dividing line 630 at each position. In general, any permutation of the upper numbers (4, 5, 6, 7) 604 can be merged with any permutation of the lower sequence (0, 1, 2, 3) 606 to generate an 8 row placement sequence. Any sequences can be selected and used to lay out a switch; preferable embodiments of Switch 100 use placement sequences generated with the "Nth value" rule just given. A placement sequence is taken to be of unlimited length by repeating the sequence as needed. For example, sequence 614 can be taken as (0, 4, 2, 6, 1, 5, 3, 7, 0, 4, 2, 6, 1, 5, 3, 7, 0,).

Figure 6C:
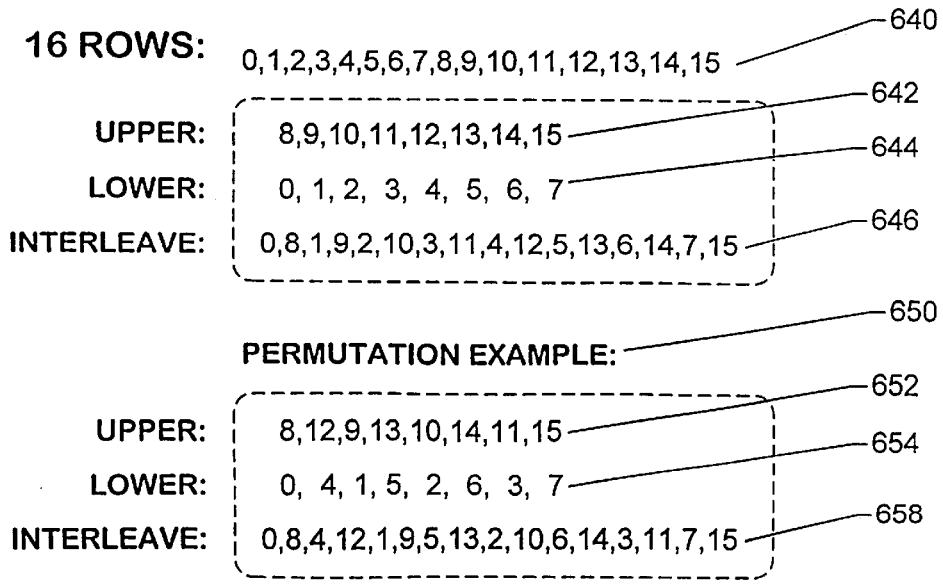

FIG. 6C shows an example for 16 rows 640, given by merging the upper 642 and lower 644 ascending sequences to generate the final sequence 646. In another example 650 using the "Nth value" rule, every 4th value from 642 and 644 are used to generate the upper 652 and lower 654 sequences, respectively. These are merged to generate placement sequence 658.

This method may be extended to any even-numbered set of-rows. Divide the sequence of row numbers into two equal halves: upper and lower, as exemplified in FIG. 6A. Form a permutation of each of the halves and alternately merge the permutations into a single placement sequence. A 4 row sequence can be generated by merging the upper (2, 3) and lower (0, 1) sequences to produce (0, 2, 1, 3). The only two-row sequence is (0, 1).

In the case of odd-numbered rows, divide the sequence of row numbers into upper and lower sequences, with the middle value arbitrarily assigned to one of them. Then permute and merge the two sequences, starting with the permutation that has more values. For example, given 7 rows (0, 1, 2, 3, 4, 5, 6), divide into upper (3, 4, 5, 6) and lower (0, 1, 2) portions. In this example, the upper sequence has more values, so the merged sequence becomes (3, 0, 4, 1, 5, 2, 6). Preferred embodiments of Switch 100 do not contain row sets made up of an odd number of rows.

Message Flow

Figure 7A:
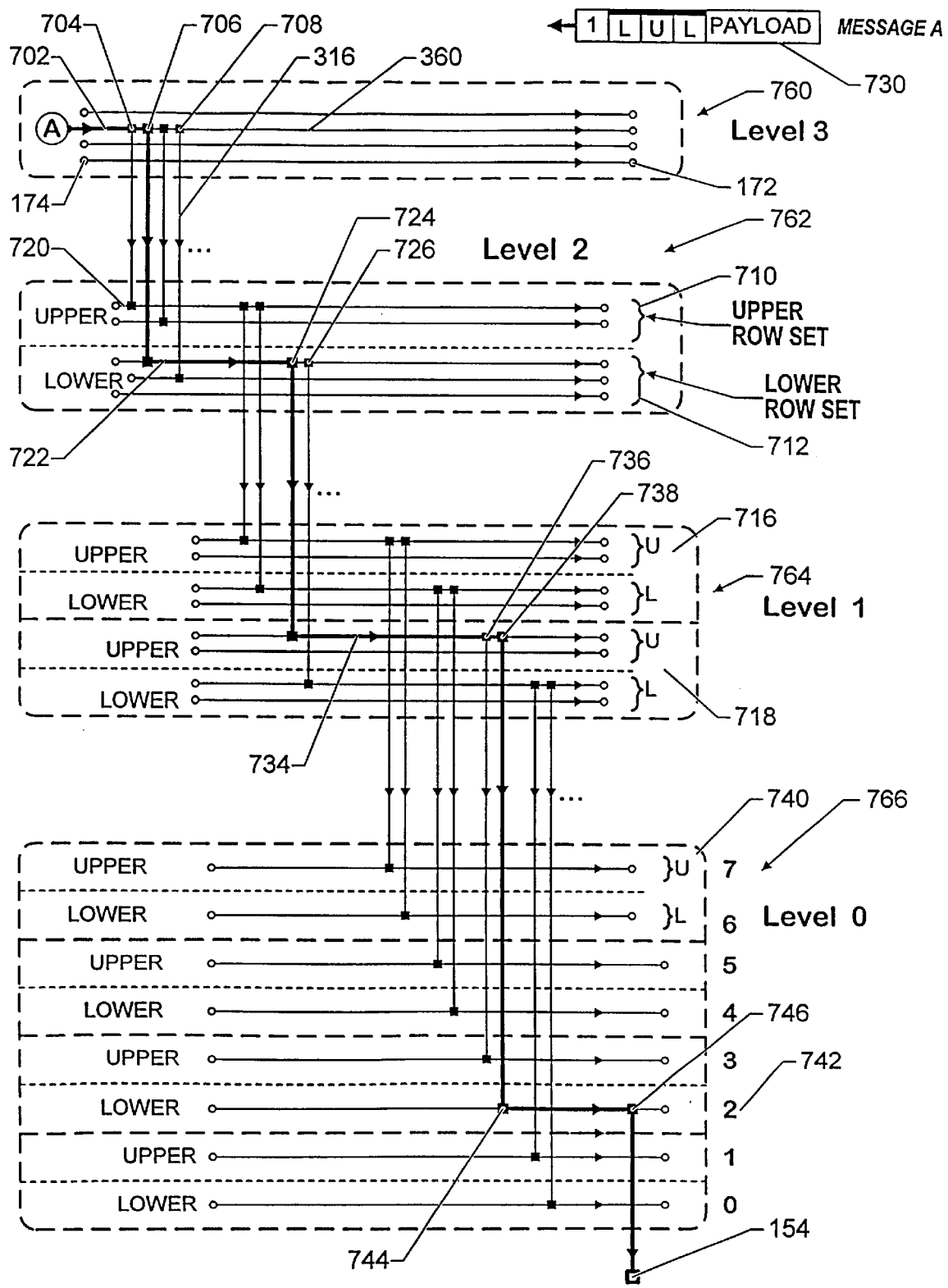
FIG. 7A is a schematic interconnection diagram illustrating how messages are routed through the switch shown in FIG. 1A using a binary-tree type routing technique in which a message has multiple paths to its target row.

A message 200 entering the switch reaches the target row defined in header 204 by following a route that is similar to the route directed by a set of a binary trees. FIG. 7A illustrates message A entering at the top level 760 and reaching the target row at the bottom level 766. The address of message A is row 2, that is, the message header 204 in (H1, H2, H3) is (0,1,0), indicating (lower, upper, lower). To simplify the description of message flow, a data path 316 is shown only between selected levels, columns are not necessarily shown in vertical alignment, and only a few representative rows are shown.

Figure 7B:
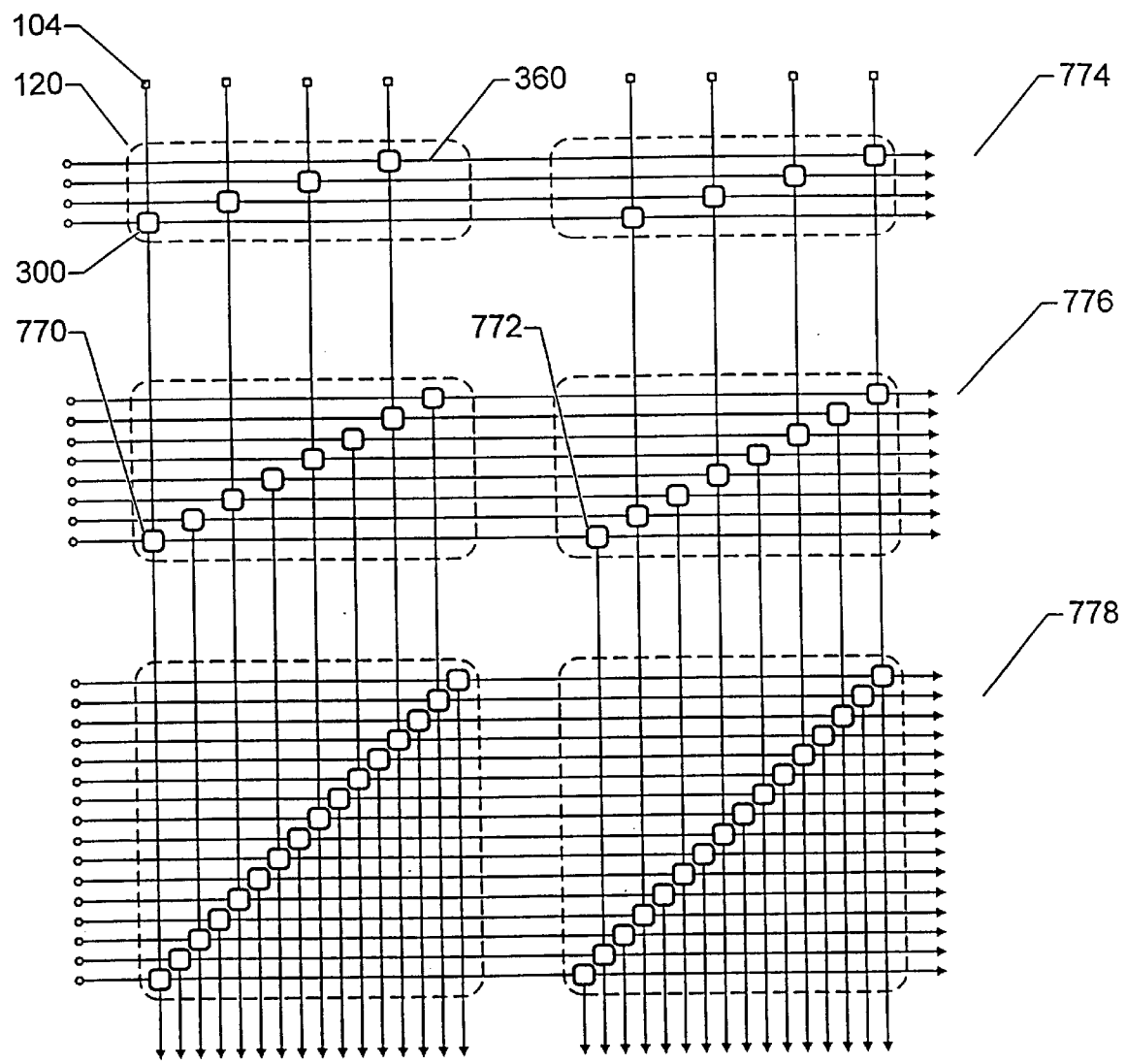
FIG. 7B is a schematic illustrating an embodiment that has an increasing number of rows at lower levels to advantageously reduce message congestion as messages approach their target.

Message A 730 moving right on row 702 encounters control cell 704 which is connected below to an upper row 720 located at level 2 762. Level 2 is logically divided into two pairs of row sets: (1) rows located in the upper row set 710, and (2) rows in the lower row set 712. The designation "upper" and "lower" does not refer to the position of a row in the respective level but instead refers to the position of the row downward to which the row is connected. In FIGS. 7A and 7B, the rows 710 in the top portion of level 2 connect to rows in the top 716 of level 1, and similarly the bottom rows 712 of level 2 connect to the bottom half 718 of level 1. A row set is topologically the same a group 192 discussed in FIG. 1C. Message A most-significant bit is ZERO, indicating a target row in the lower row set, whereas cell 704 is connected to a row 720 in the upper row set 710.

Message A remains on row 702 and moves right to cell 706 at the next column. Cell 706 is connected downward to row 722 in the lower row set 712. Cell 706 routes message A downward to row 722. Therefore, a message moving right through only one or two control cells advantageously has an opportunity to drop downward to its target. If (for reasons discussed later) control cell 706 cannot send message A downward, the message continues right on row 702 and encounters cell 708 which is also connected to a lower row set 712, and again has an opportunity to drop downward to the lower row set.

Level 1 764 is logically divided into two pairs of upper and lower row sets 716 and 718. Row 720 at level 2 is connected to the pair of rows sets at the top 716 of level 1 and, and row 722 is connected to the pair at the bottom 718. The next address bit, ONE, in header 204 specifies an upper row set. At level 2 message A moves right on row 722 to cell 724 which is connected to an upper row set at level 1. Cell 724 routes the message downward to row 734 at level 1 764. Level 0 766 is logically divided into 4 pairs of row sets. Level 0 is the final destination level and each row set of rows includes exactly one upper row and one lower row. The last address bit in header 204 specifies a lower row set. Message A moves right on row 734 and passes through upper-connected cell 736 to lower-connected cell 738. Cell 738 sends the message downward to the final target row, row 2 744.

In one embodiment of Switch 100 message A moves right on bottom-level row 742 until the message encounters a cell located at the column specified in the message column header 212. At that column the message is sent downward to output port 154 or output structure 150. In another embodiment that does not use column addressing, the message is sent downward immediately at the next cell 746. The header address "010" is binary notation for "2" and therefore message A exits at row 2 742.

A message moving right on any row has multiple opportunities to move downward to the targeted row set at the next lower level. A message moving right on a row to row exit point 172 is routed left (not shown) to row entry point 174 of a left-most control cell in the same row set. A message on any row at the top level advantageously has multiple routes to any target row at the bottom-most level. At each level only one bit of message header 204 is examined by a control cell to determine the direction of the message: downward or right. At the bottom level a message without a column header immediately the switch; a message with a column header 212 moves right until the message reaches the specified column, or the message immediately exits the bottom row to a control structure 150 that processes the column header.

Increasing Row Count

Referring to FIG. 7B in conjunction with FIGS. 1 and 7A, in one embodiment of Switch 100 the number of rows at a level may be different from one level to the next, increasing in number from the top level to the bottom. In any embodiment, the number of rows R 170 pertaining to the size of the Switch 100 is the number at the bottom level. In preferable embodiment of Switch 100, the number of rows, R, is the same at each level, and R is a power of 2. FIG. 7B shows 3 levels of an embodiment of Switch 100 where the top level has 4 rows 774, the next lower level has 8 rows 776, and the bottom level has 16 rows 778. The number of rows are not necessarily different at each level. For example, the number of rows in one embodiment might have row counts of 8, 8, 16, 16, 32 and 64, from the top level downward. Another exemplary embodiment has row counts of 32, 32, 32, 64, 64, 128 and 128.

Figure 20A:
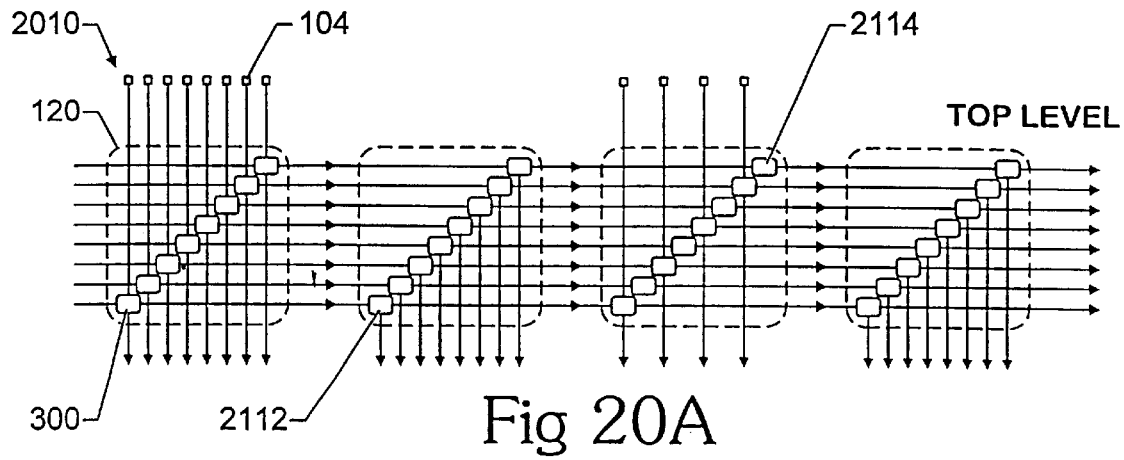
FIGS. 20A, 20B and 20C are diagrams of alternate embodiments of the top level of single-path and a flat latency switch that advantageously reduce the number of inputs to the switch relative to the maximum possible number of inputs, thereby lowering message density and reducing congestion within the switch.
Figure 20B:
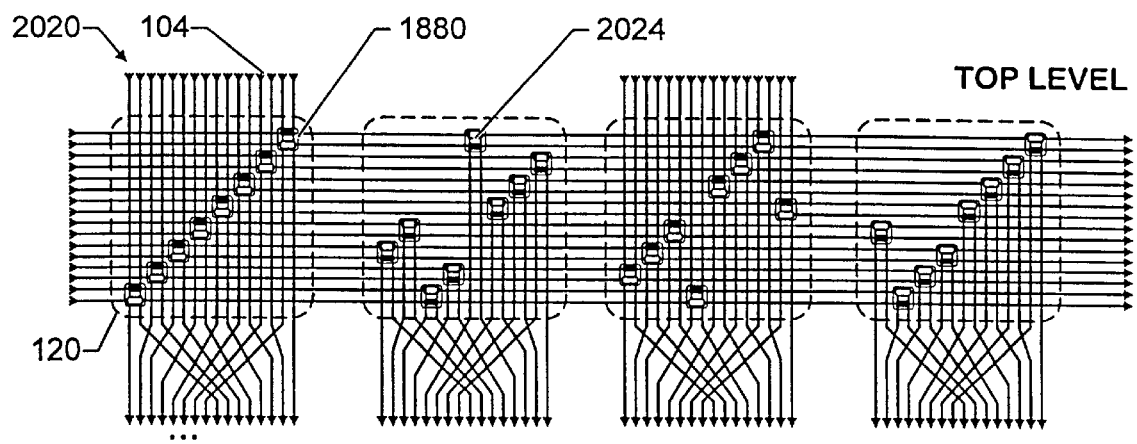
Figure 20C:
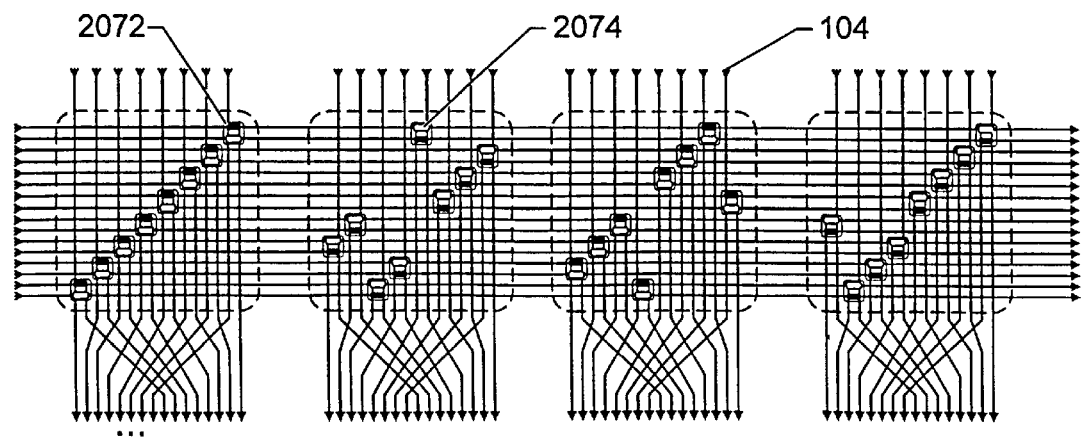

Given a row located at a level 776 where the row count is greater than the level above 774, that row has control cells that are alternately connected 770 and not connected 772 to a cell to the upward level. Referring also to FIG. 3, a switch array 120 always has a control cell on each row 360. Referring also to FIGS. 20A, 20B and 20C, an embodiment of switch 100 may not have all possible input connections at the top level connected to an external device. In such an embodiment the top level is less congested with message flow. To advantageously utilize the available logic gates on the chip, the top levels are implemented with fewer rows than lower levels.

Message Flow and Message Blocking

When two messages at different levels compete for the same data path the message at the lower level is given priority. The method described here advantageously gives the lower-level message priority because the latter has probably been in the switch a longer time. A structure and technique for implementing this priority scheme is illustrated in FIGS. 8A and 8B.

Figure 8A:
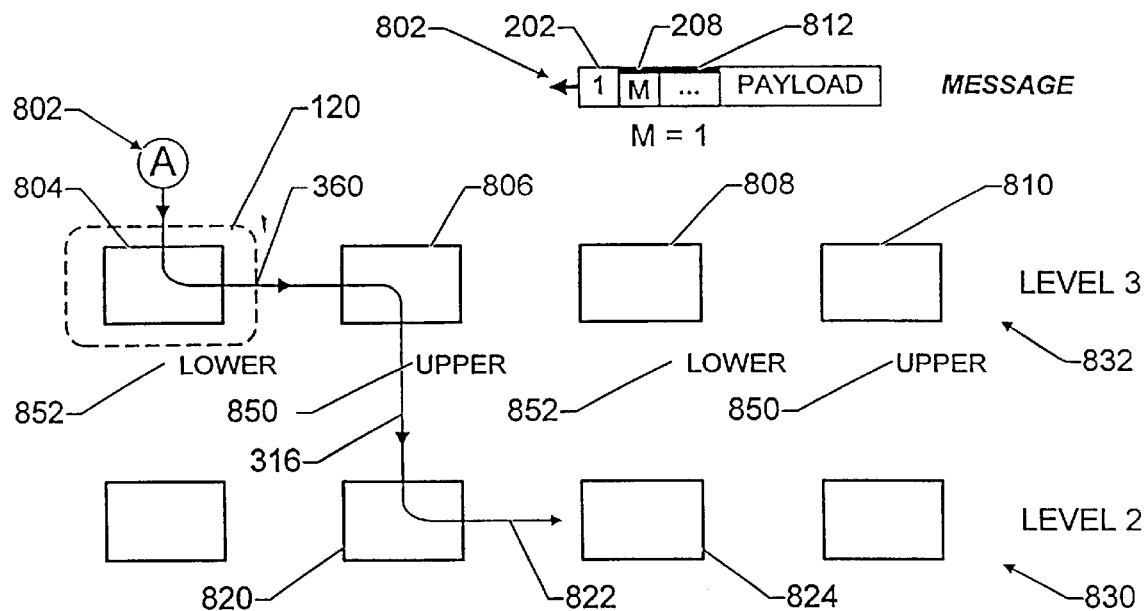
FIG. 8A is a schematic block diagram illustrating a technique for moving a message from one level to a next lower level on a path to a predetermined target.
Figure 8B:
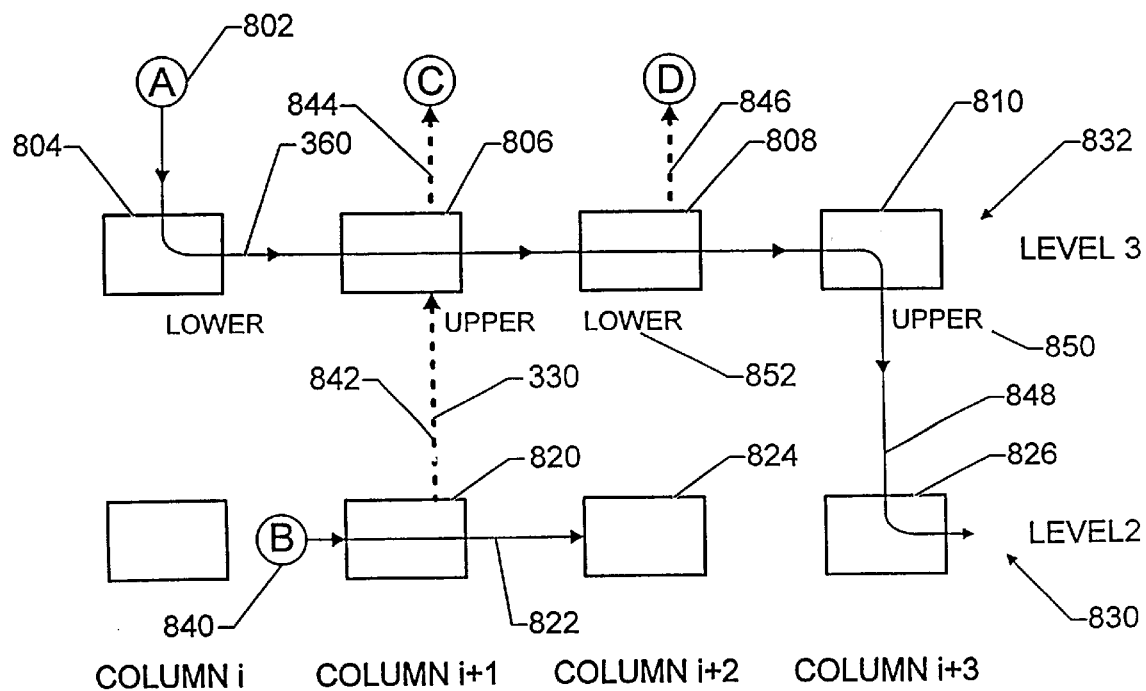
FIG. 8B is a schematic block diagram showing that a message on a lower level can block a message at a next higher level from moving immediately to the lower level and that the blocked message has another opportunity to move to the lower level using the technique illustrated in FIG. 8A.

FIGS. 8A and 8B show a simplified interconnection of control cells, all cells in FIGS. 8A and 8B are located different in switch arrays: they are at two levels 830 and 832, and four columns. Referring also to FIGS. 1A, 2, 3, and 7A, control cell 804 is located in a switch array 120 at level 3 832. The control cell is connected to the right by row 360 to control cell 806 at the next column and at the same level.

Message A 802 with header 812 enters control cell 804 from the upward level. The message A traffic bit 202 is ONE indicating that a message is present at cell 804. When a message enters a control cell from the upward level, the message remains on the row 360 and immediately moves right to the control cell at the next column. Message A proceeds right on row 360 to cell 806.

The message A header most-significant bit is ONE which indicates that the message is targeted to an upper row 850 at the next lower level. Control cell 806 examines the traffic bit 202 and most-significant bit 208 and determines that the next level's target row of message A is an upper row set. Control cell 806 is connected downward to control cell 820 which happens to be in the upper row set 850. Message A is therefore routed downward on serial path 316 to control cell 820. Following the rule for a message entering from the upward level, message A is immediately routed right on row 822 to the next cell 824 at level 2.

In FIG. 8A, the flow of message A 802 is described. Message A enters level 3 from the upward level, moves right to the next column and is immediately routed downward to a cell in the desired upper row set 850. Message A is directed from cell 806 to cell 820 because the message A most-significant bit 208 indicates a drop to an upper row set and the message is not blocked by another message from below. The description illustrates the case where a message A is allowed to move without delay to the next lower level.

A message moving right at one level passes over downward connections to control cells. The connections alternate between upper 850 and lower 852 row sets at the next lower level. In another example (not shown), a different message E enters control cell 806 from the left. Message E most-significant bit is ZERO, indicating that the message is targeted to a lower row set 852. Control cell 806 is connected to an upper row set 850, therefore the control cell 806 routes message E right to the next column to cell 808.

Referring to FIG. 8B, in another example the same message A 802 enters control cell 804 from the upward level and is routed right to control cell 806 as previously described. At the same time that message A enters control cell 806, a message B 840 at level 2 enters control cell 820 from the left. Message B has priority in the use of shared path 822 over a message from the upward level. Message B continues right on row 822 to cell 824, thereby blocking message A from moving downward through cell 820 and right on row 822. Because row 822 is immediately occupied with message B, control cell 820 cannot accept a message from the upward level, that is, from control cell 806. To prevent a collision between messages A and B, cell 820 sends busy signal 842 upward to cell 806 on signal path 330. Control cell 806 is thereby blocked by busy signal 842 from sending message A downward. Therefore cell 806 routes message A right to cell 808 at the next column. Cell 806 sends a busy signal 844 upward protecting message A from a possible collision with a message C that might occur on the level above.

Control cell 808 examines header 812 of message A and determines that message A is targeted to an upper row set 850 at level 2. Because cell 808 is connected to a lower row set, cell 808 is compelled to route message A again to the right to cell 810. To prevent a possible collision from above, cell 808 also sends busy signal 846 to the upward level. A message D that might be above cell 808 is advantageously prevented from dropping to cell 808. Finally a, control cell 810 at the next column is connected to an upper row set 850. Message A at cell 810 is not blocked from below, so cell 810 sends message A downward to control cell 826 at level 2.

In FIG. 8B, the flow of message A is described where a message is blocked from immediately moving downward by another message B concurrently moving right directly below. Message A visits two more columns to the right before message A moves downward to an upper row set at level 2. Whenever a message moves right through a control cell the cell always sends a busy signal upward to the cell above it, prohibiting the latter from dropping a message downward.

Message Flow Relationships

FIG. 8B illustrates the situation where message B blocks message A from moving downward. Similarly, message B might be blocked by a message or messages below and become forced to remain at level 2 for an extended period. Message B is advantageously prevented from being in a position to block message A a second time by the structure of the interconnect. Control cell 806 at level 3 is connected by data path 316 to cell 820 at level 2, and control cell 810 on the same row as cell 806 is connected by data path 848 to cell 826, also at level 2. Cell 826 is not placed on the same row as cell 820 to desirably prevent message B from blocking message A a second time, and advantageously eliminate the possibility of the repetitious blocking. The placement sequences generated by the methods described for FIGS. 6A and 6C avoid multiple blocking by a single message.

Figure 9:
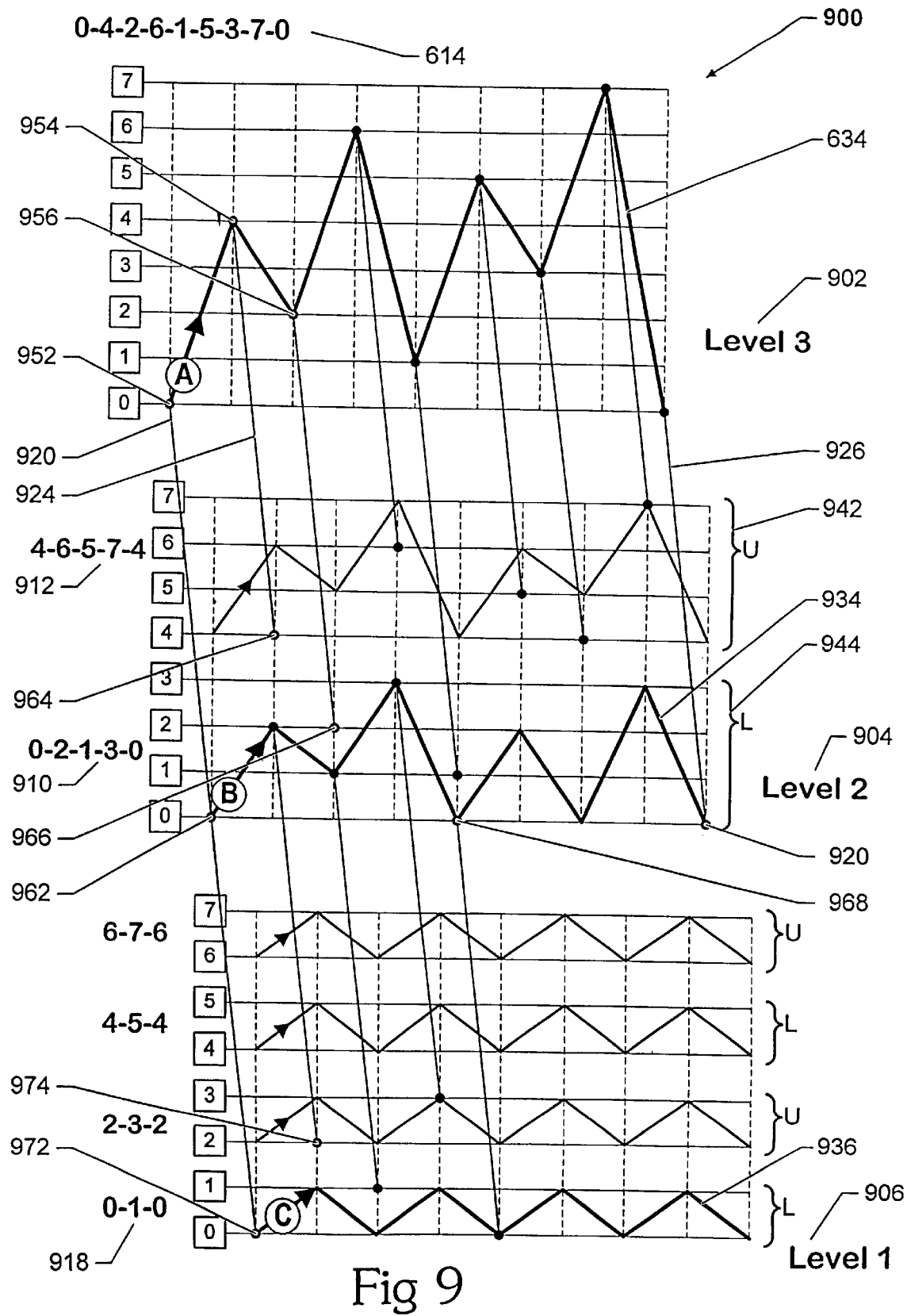
FIG. 9 is a routing interconnection diagram illustrating the connective relationship of a message path at one row versus the rows at the level below and emphasizing the advantage of the placement sequences resulting from interconnections described by the 8-row table shown in FIG. 6B in attaining a very low probability of one message being blocked by the same message in a subsequent excursion through the interconnection structure.

FIG. 9 graphically illustrates the cell connection relationships at levels 3 902, 2 904, and 1 906, respectively. Placement sequence (0,4,2,6, 1,5,3,7,0, . . . ) 614 at level 3, lower sequence (0,2, 1,3,0, . . . ) 910 and upper sequence (4,6,5,7,4, . . . ) 912 at level 2, and sequence (0, 1,0, . . . ) 918 at level 1 are shown in plotted form. Message path A 634 shows the interconnection relationship between levels 3 and 2 Note that a message that starts on any row, for example row 0, remains on that row. Message path A starts on row 0 at the first column 952 which is connected downward 920 to a cell also at row 0 962. At the next column 954 row 0 is connected downward 924 to a cell at row 4 964, then at 956 to a cell at row 2 966, and so on according to sequence 614. Message path B 934 at level 2 shows the sequences of connections between level 2 904 and level 1 906. Message path B 934 starts on row 0 at the first column 962 and is connected downward to a cell also on row 0 972. At the next column row 0 is connected downward to a cell at row 2 974, then to a cell at row 1 966, and so on according to sequence 910.

Message connection paths A 634 and B 934 graphically demonstrate two important properties of the placement sequences. First, path A and path B alternately connect downward to lower row set 944 and upper row set 942 which satisfies the message routing described in the disclosure of FIG. 7A. Second, path A is not connected again to path B until eight columns have been traversed. Expressed differently, path A connects downward to path B only at locations 962 and 920, a span of eight columns. Similarly, a message on path A 634 at the second column 954 connected to a path D (not shown) starting at 964 does not connect again to path D until eight columns have been traversed. Furthermore, a message moving on any row at level 3 does not connect with the same level-2 path below 934 it until the message has moved through 8 columns. That is, the seldom-connection relationship shown between the paths for A 634 and B 934 holds for any path starting at any row and column at level 3. Importantly, the message starting at path A 952 is blocked by 3 other messages at level 2, and concurrently the message starting at path B 962 is blocked by 4 or 5 other messages at level 1 before blocking situation at 920 can occur again. Thus, an occurrence of multiple blockings by any message at a lower level is highly improbable statistically. The relationship between path B 934 at level 2 and path C 936 at level 1 is that a message on path B does not encounter path C until four columns are traversed, 962 to 968.

FIG. 9 compares the respective connection relationships of a message path A with message path B. A message on path B at 962 is initially in position to block message on path A at 952. However, importantly, in the next eight subsequent moves of each message, message B is not in position to block message A again. FIG. 9 also illustrates a message on path C 936 at level 1 that blocks message on path B at 962. A message on path C is not in position to again block the message on path B until both messages transverse four columns. The relationship holds for messages entering on any row and at any column of the respective levels. Furthermore, each message at any level except level 0 advantageously always alternate an upper row set and a lower row set, at each and every column transition.

Other embodiments of Switch 100 use other sequences such as those described in the discussion of FIGS. 6A, 6B an 6C. Any sequence may be used that allows a message 200 to connect to upper and lower row sets at least once per period. The sequences do not necessarily have to be the same for all rows, nor do the sequences have to repeat with a period related to the level number or to any other design rule. Probabilistically, such sequences may not have desirable statistical properties of equitable message flow, minimal blocking and low latency as those generated using the "Nth value" rule discussed for FIG. 6A.

Header Length Contraction

Figure 10:
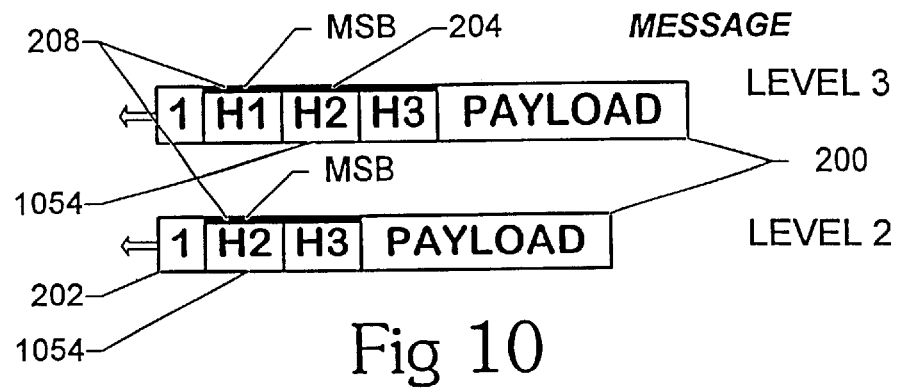
FIG. 10 is a schematic diagram illustrating a message header passing through the switch and the contraction in length of the message header as the message passes through the switch with the result that the entire header is removed by the time the message reached the bottom of the switch, advantageously causing lower latency and simpler logical processing.

As the message is propagated between levels, the header length is contracted with the removal of the most-significant header bit at each level. Referring to FIG. 10, at level 3 the target row address of the message is defined in message header 204 containing 3 bits: H1, H2 and H3. H1 208 is the most significant bit of the address and H2 1054 is the next most significant bit. When message 200 moves downward to the next lower level, the most significant bit H1 208 is removed from the message although traffic bit 202 is always retained. At level 2, H2 1054 thereby becomes the most significant bit. A desirable side effect of header length change is that the length of the message is reduced by one bit per level. When message 200 reaches level 0, all bits of header 204 have advantageously been removed, thereby reducing the total time of transit (latency) of a payload bit through the switch.

Because the current-level MSB 208 always follows the traffic bit 202, the design of all control cells at all levels (above level 0) is the same, which desirably simplifies the chip layout effort. Another advantage of stripping the current MSB when a message is sent down is that a control cell needs only to buffer the first two bits of an oncoming message. Alternately, if the MSB were not removed, then lower-level cells would have to wait until the entire header had entered before the appropriate address bit could be examined by the cell. In this disadvantageous scheme, an eight-bit header would require that nine bits be buffered in each cell each time a message entered it, consuming nine clock periods per cell versus only one or two clock periods for the control cells of preferred embodiments of Switch 100.

Synchronous Delay Device

Figure 11A:
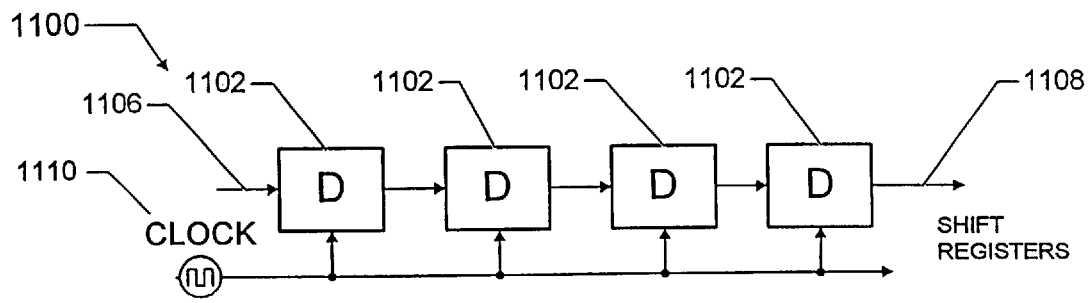
FIG. 11A is a series of delay elements constituting a first-in first-out (FIFO) buffer.
Figure 11B:
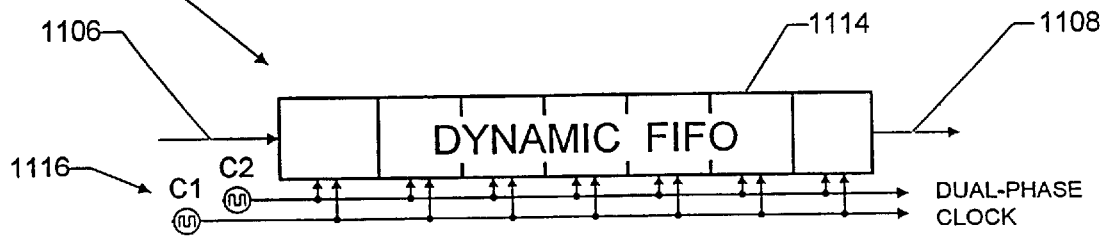
FIG. 11B is a dynamic FIFO structure composed of delay elements.

Referring to FIG. 11A in conjunction with FIGS. 1B and 3, a message moving right across a row 360 encounters an optional FIFO structure 114 and would be circulated back to reenter at the first column. To prevent the first bit of a first message from colliding with an interior bit of a second message, a single message is made to fit on one row at any level. For this reason, in addition to the shift registers in cells along a row, additional delay devices may be used. The FIFO array includes a plural number of independent synchronous delay device 1100 arranged in parallel and each connected to a row 360. The synchronous delay device 1100 includes delay elements 1102 connected in serial arrangement. A clocked delay element 1102 functions like a one-bit shift register, or a D flip-flop, such that a bit entering the delay element at one clock period is presented at the output of the delay element at the next clock period. The total transit time of a message bit through the serial delay device 1100 is the count of delay elements 1102 contained in the structure 1100 multiplied by the clock period. A message 200 enters FIFO structure 1100 from the left at serial input 1106 and exits at output 1108. Clock 1110 is used to synchronize delay elements 1102. A reset signal (not shown) initializes all delay elements and other logical is elements. FIG. 11B shows a dynamic shift register 1112 that uses a dual phase clock 1116 to shift data bits through the FIFO structure. The advantage of a dynamic shift register is the reduction in the number of transistors when compared to a flip flop or similar delay element.

Figure 11C:
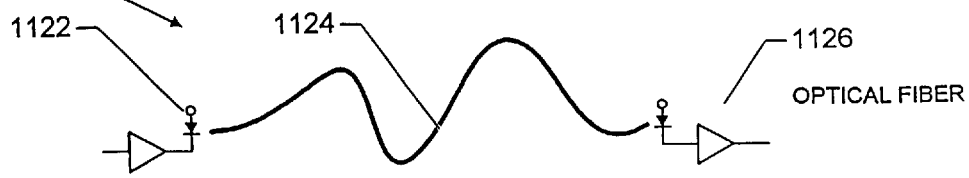
FIG. 11C is an optical FIFO structure.

FIG. 11C shows an optical embodiment 1114 of a synchronous delay device. Adjustable fiber delay is achieved by using piezo-electric structures to physically stretch the fiber and change the fiber length. An optical fiber 1116 driven by a pulsed light source 1118 conveys message 200 through the fiber length and is terminated by an optical detector 1120 that converts the optical signal to a form that can be further processed by Switch 100.

Level and Column Timing

Figure 12A:
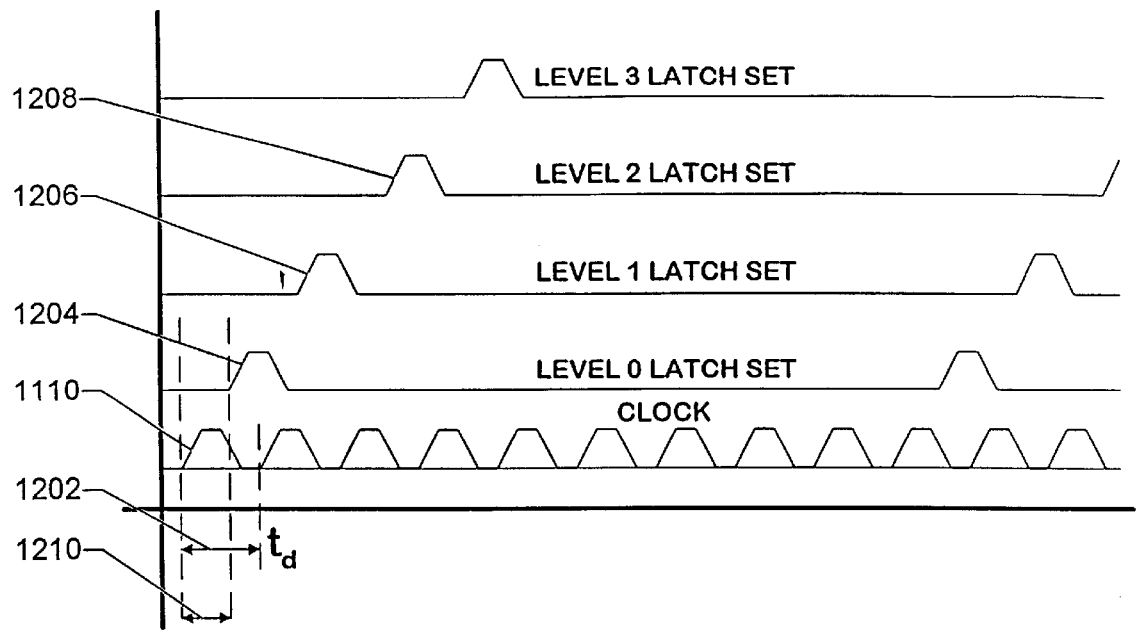
FIG. 12A is a chart that shows the relative timings of control logic at different levels at the same column of the interconnect.

Referring to FIGS. 8B and 12A, message A 802 entering control cell 806 located at level 3 832 may attempt to drop to control cell 820 at level 2 where the message A moves right on serial path 822. However, a concurrent message B 840 moving right at level 2 has priority over message A in the use of path 822. To enforce the priority, control cell 820 sends busy signal 842 upward to control cell 806 in a timely manner to prevent the latter from sending a message downward. Thus, message flow timing is specified so that the busy signal 842 reach control cell 806 in sufficient time that the latter cell can act on the signal. Therefore, in one embodiment of Switch 100 the traffic bit 202 of message B arrives at cell 820 before the traffic bit 202 of message A arrives at cell 806. All of the control cells in a given switch array 120 operate synchronously in that the traffic bit of a message arrives at the same time for all cells in the switch array. All cells in the same switch array 120 receive the same timing signal.

Referring to FIG. 12A in conjunction with FIG. 11A, clock 1110 controls the delay elements in control cells 300. Latch-set signal 1204 is delayed 1210 relative to clock 1110 so that the cell's latch (discussed later) is set late in the clock period.

In one embodiment a control cell at a lower level receives a message 200 prior to a control cell in the same column at the level above. The relative timing of messages at the same column at different levels is shown in FIG. 12A. Level 0 latch-set signal 1204 occurs one clock period ahead of level 1 latch-set signal 1206. Level 1 signal is one period ahead of the signal for level 2 1208, and so on for higher levels. The latch-set signal is used in the timing and control of message flow. Timing signals 1110, 1204, 1206 and 1208, for all levels and columns, are generated by timing unit 142 in conjunction with delay elements 146 and 148.

Figure 12B:
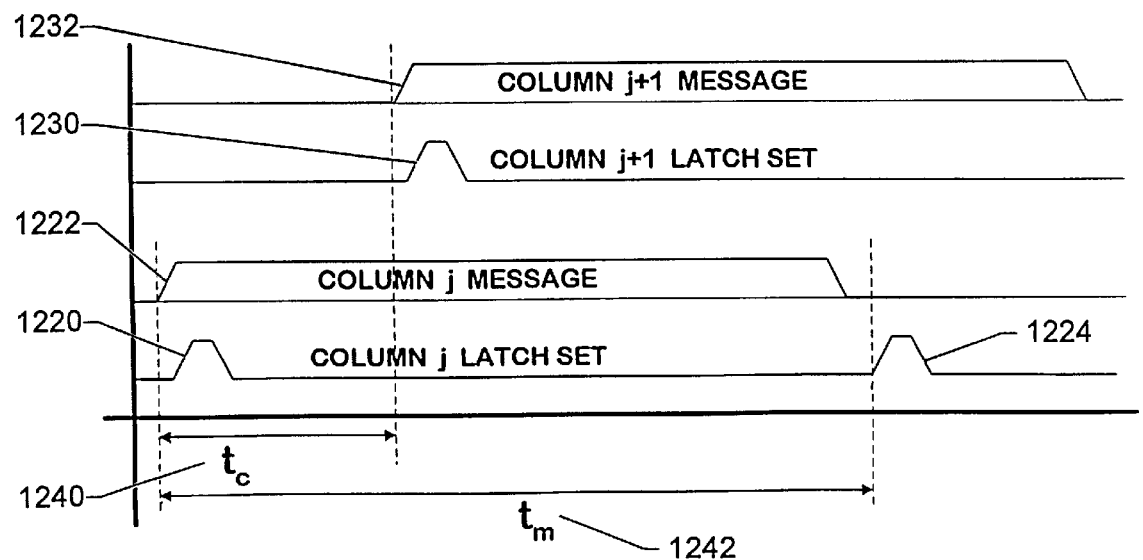
FIG. 12B is a chart that shows the relative timings of control logic at different columns at the same level of the interconnect.

FIG. 12B describes the relative timing of adjacent columns at the same level. A message 200 enters a control cell at column j in the same clock period 1110 that the column's latch-set signal 1220 goes high. The message moving right on a row 360 passes through a fixed number of delay elements before the message reaches the next column, j+1 1232. In some embodiments, the delay elements are inter-column FIFO buffers. In other embodiments, the delay elements are part of a control cell. The time period of a single delay element is one clock period 1202, or two periods. The column-to-column time $t_C$ 1240, is the time a message takes to reach the next control cell at the next column. The time $t_C$ is the sum of the delays of all the delay elements between two columns. Therefore, the latch-set signal for the next column 1230 is the latch-set signal for the first column 1220 delayed by the time $t_C$ 1242.

A message 200 has a predetermined maxim length $L_{msg}$ 214 and each bit takes one clock period to move past a given point. The time for a message to pass through a control cell at column j is indicated by interval 1222, and at the next column by interval 1232. The inter-message time $t_m$ 1242 is not less than the time for the message to pass through a control cell, that is, $t_m >= L_{msg} \cdot t_D$. Immediately after a message has passed through a control cell a subsequent message is allowed to enter the cell. Therefore, the inter-message time $t_m$ determines when the next latch-set signal 1224 is sent. At any given level, messages on different rows move to the right in parallel fashion so that the traffic bit 202 and the following bits of all messages move right in "vertical alignment". In the vertical alignment each traffic bit enters a control cell at the same time as all other cells in the same switch array. Similarly, messages dropping downward from control cells in the same switch array move down together in horizontal alignment. When time $t_C$ is less than inter-message time $t_m$ then the message spans more than a single control cell. The message thus wormholes through the switch. In typical embodiments of Switch 100 time $t_C$ is one or two clock periods with the desirable consequence that the first bits of the payload exit the interconnect structure before the tail of the payload has entered.

Timing of the latch-set signal for a specific control cell depends upon the cell's column and level location in the switch array. FIG. 12A describes the inter-level relationship of message timing for multiple levels at a single column. FIG. 12B describes the relative timing of the latch-set signal for adjacent columns at a single level. In the discussion of FIGS. 12A and 12B, the terms "level latch set" and "column's latch set" refer to the same signal, depending on the context of the description Referring to FIG. 1A, the timing of the switch array at level 0, column 0, provides the master signal. Levels above the switch array at level 0, column 0 are delayed by one clock period 146, completely determining the timing of the first column at all levels. At each level, signals to successive columns to the right are each delayed by delay element 148 for a period of time t 1240, thereby determining the timing of the remaining switch arrays at the same level to the right.

Control Cell States

Figure 13A:
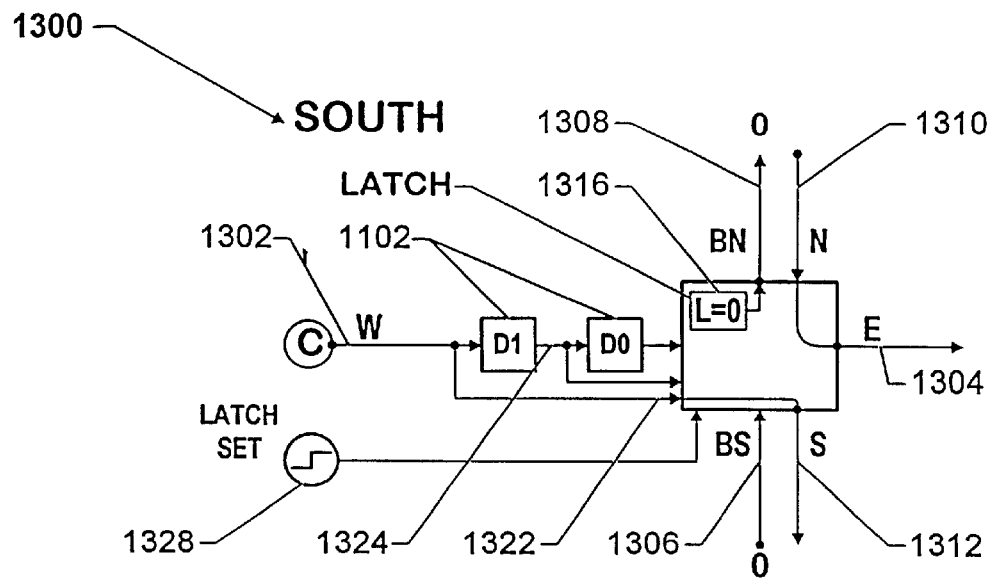
FIG. 13A is an abstract depiction of a control cell state for a message that moves downward. The state of the cell is stored in a latch. Delay elements used in logical processing are shown and the interconnections to the upward level, downward, right and left are shown.
Figure 13B:
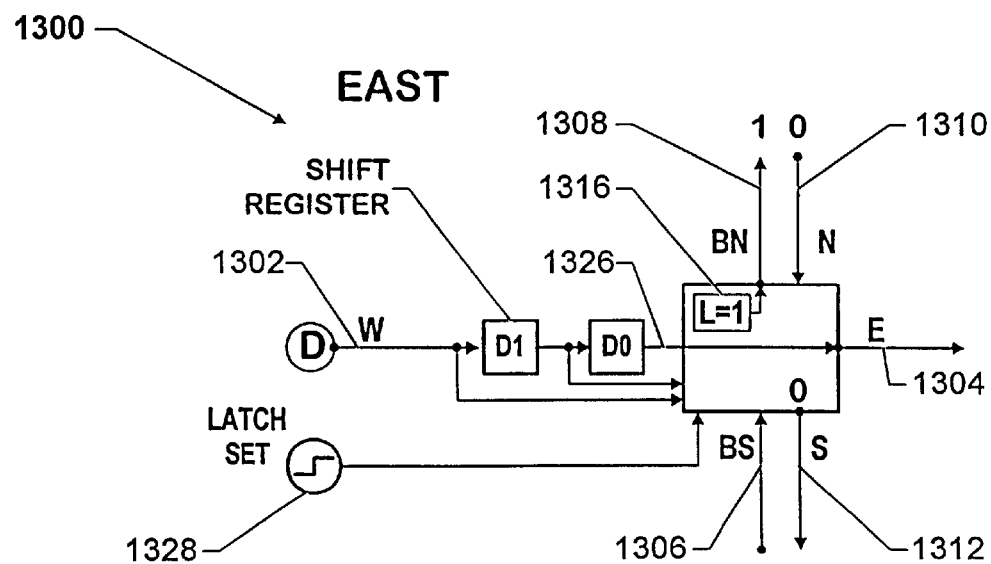
FIG. 13B is an abstract depiction of a control cell state for a message that moves right. The state of the cell is stored in a latch.

FIGS. 13A and 13B show a block diagram of control cell elements and the message routing mechanism through the control cells. A message 200 entering a control cell 1300 at line W 1302 from the left is either (1) routed downward through line S 1312 to the next lower level, shown in FIG. 13A, or (2) the message is routed right through line E 1304 to the next column, shown in FIG. 13B. A control cell 1300 has a message entry point from the upward level at line N 1310, a message entry point from the left at line W 1302, a message exit point to the right in line E 1304, a message exit point downward at line S 1312, a busy-signal output to the upward level at line BN 1308, and a busy-signal input from the downward to line BS 1306. In the figures the terms "north," "south," "east," and "west" refer to the directions "upward," "lower," "right," and "left," respectively.

Referring to FIGS. 3, 13A and 13B, serial path 360 connects lines E and W of control cells on the same row at adjacent columns. Serial path 316 connects lines N and S, and serial path 330 connects lines BN and BS of control cells at the same column. A latch-set signal 1204 is connected to the control cell at 1328. Delay elements D0 and D1 1102 are provided as devices to "look ahead" at specific message header bits and as devices for adjusting message flow timing.

In FIG. 13A, message C enters control cell 1300 from the left at line W 1302. Two message bits, MSB 208 at line W and traffic bit 202 in D1, and busy signal line BS 1306 are examined by the control cell and the cell determines that the message is to be routed downward through line S 1312. Input line W 1302 is connected to line S, advancing the message two bits ahead in relative timing 1322. Since message C moves downward, line E is not connected to input line W from the left. Instead, line E is connected to input line N 1310 from the upward level. The state of the cell in FIG. 13A is represented by ZERO which is stored in latch 1316, a one-bit register. The busy signal sends a ZERO upward to line BN 1308, which is connected to the latch output. This indicates to the cell above that the cell is free to send a message down to line N on interconnect 1310. Latch 1316 is also used to control the flow of subsequent message data bits through the cell. As previously discussed, when a message from the left is routed downward, another message from the upward level at line N 1310 is allowed to enter the cell where the message is routed right at line E 1304.

In FIG. 13B, message D enters control cell 1300 from the left at line W 1302. The header's most-significant bit 208 and busy signal on line BS from the downward level 1132 are examined by the control cell. Either the message MSB 208 indicates that the message cannot drop, or busy signal on line BS 1306 is signal value ONE indicating that the message is blocked from below. In the example of FIG. 13B one or both of these conditions is true. Message D is routed right through delay elements D1 and D0 to output line E 1304. Latch 1316 is set to ONE. Busy signal on line BN 1308 is connected to latch 1316 which is at signal value ONE. The busy signal 1308 is sent to the cell above to indicate to that cell that it is blocked from dropping a message downward. Output line S 1312 is set to ZERO, which is equivalent to not sending a message down.

Control Cell Details and Flow Diagram

Figure 14:
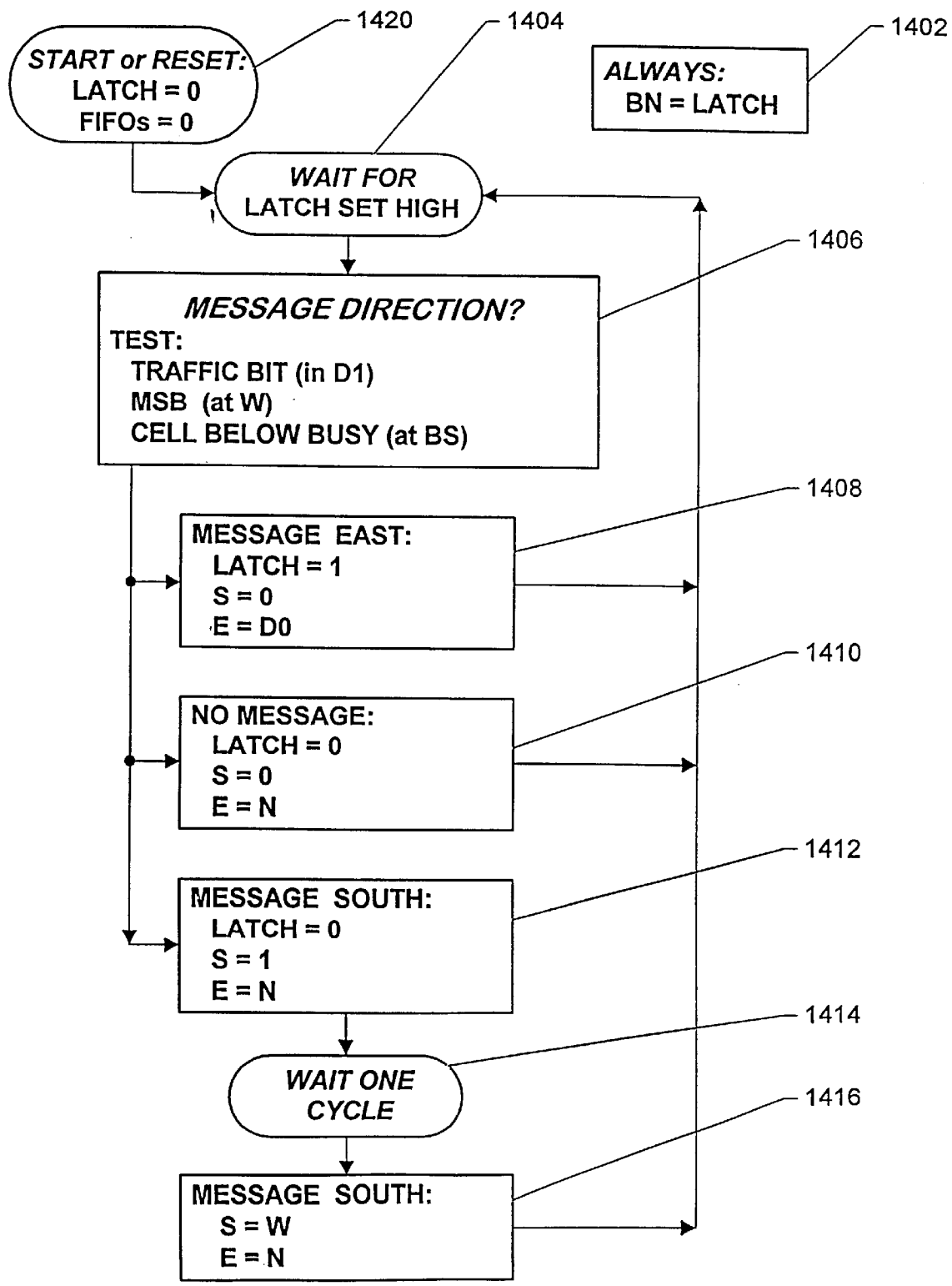
FIG. 14 is a flow diagram of the general elements of logic required to control message flow through a control cell. The outcome is to set the state of a control cell such that it sends a message downward or to the right, if such message is present.
Figure 15A:
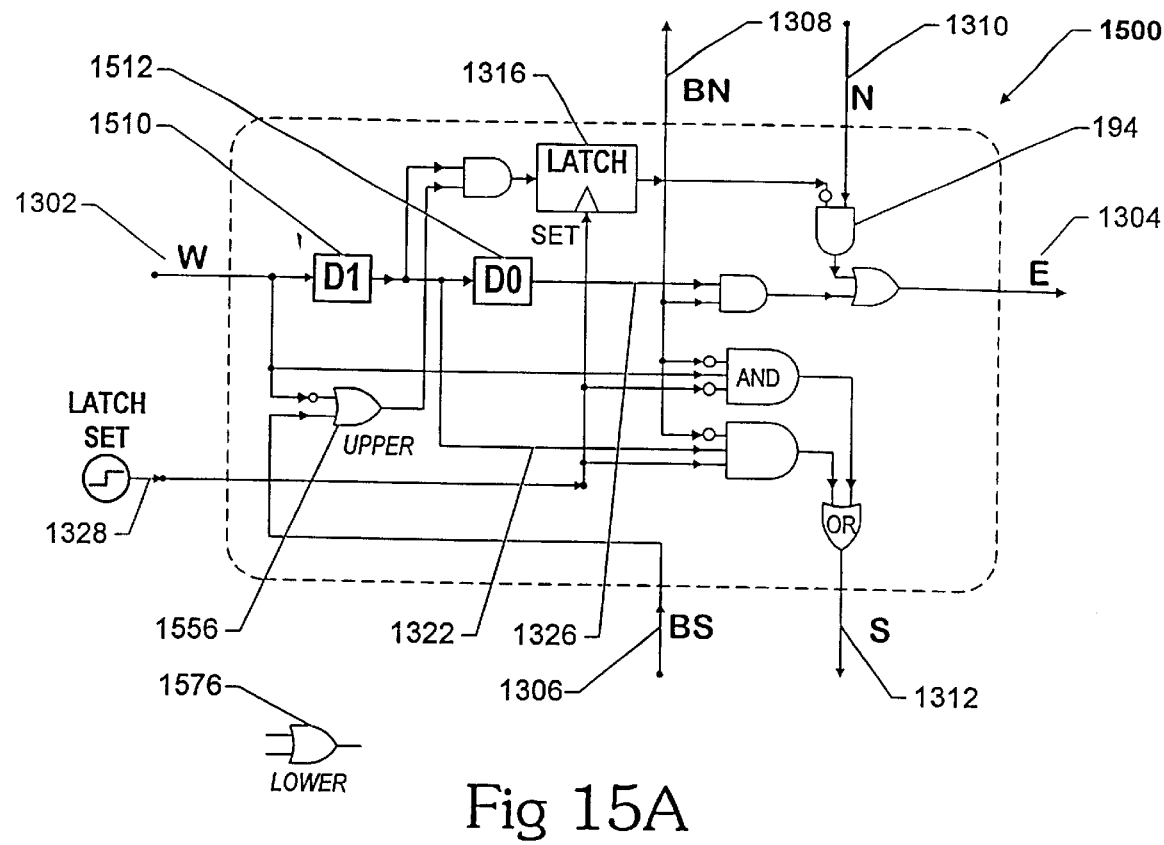
FIG. 15A is a detailed depiction of logic gates of one embodiment of a control cell at levels above level 0. This is a completion of the depiction in FIGS. 13A and 13B, and performs the processing described in the flow diagram of FIG. 14.

FIG. 14 is a flow diagram that illustrates a method of controlling message flow through a control cell 1300. FIG. 15A is a detailed diagram of a preferred implementation of a control cell that is described by the flow diagram of FIG. 14.

Referring to FIGS. 13A and 13B, two states for control cell 1300 are shown in the respective block diagrams. FIG. 13A shows the state where a message from the left moves downward to the next lower level. FIG. 13B shows the state where a message from the left moves fight at the same level. FIG. 13A also represents the state when no message from the left is present.

Referring to FIG. 14, in conjunction with FIGS. 12A, 13A and 13B, when latch-set signal 1328 goes high 1404 the essential data needed to make the determination of message direction 1406 are available in the control cell's delay elements and at input line W 1302 and blocking signal line BS 1306. In particular, when the latch-set signal goes high, message traffic bit 202 is held in delay element D1 1324, and header most-significant bit 208 is present at input line W 1302. Three possible outcomes 1408, 1410 and 1412 result from the test for determination of message direction. First, a message from the left is present and blocked from the downward level, or the message header specifies that the message must move right 1408. Second, no message from the left exists 1410. Third, a message from the left exists and is not blocked from the downward level, and the header specifies that the message must go downward 1412.

The latter two cases, when no message from the left 1410 is present or when a message moves downward 1412, are treated as a single case with respect to the busy signal to the upward level. In either of these two cases latch 1316 is set to ZERO and the output of the latch is sent upward to the cell above. That is, control output BN 1308 is always connected 1402 to latch 1316. In the remaining case where a message is present and must move right 1408, the latch is set to ONE. The latch is advantageously used to store the control state of the cell and to subsequently control the cell's logic gates with respect one message cycle.

Figure 18A:
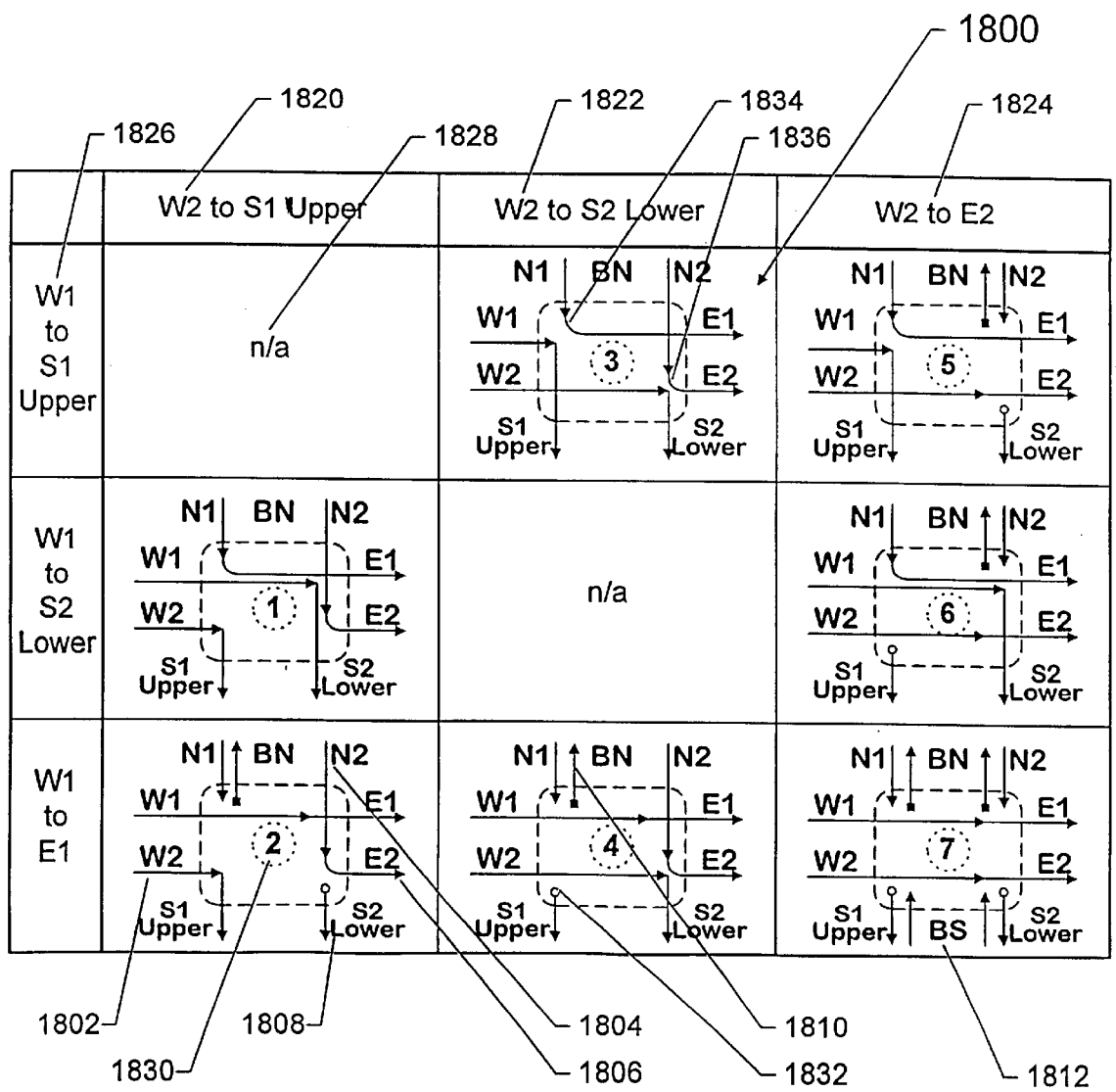
FIG. 18A is a diagram showing the 7 states of a flat-latency control cell, that is, the interconnections within the cell of the 2-row inputs and the two upward-downward inputs and outputs.
Figure 18C:
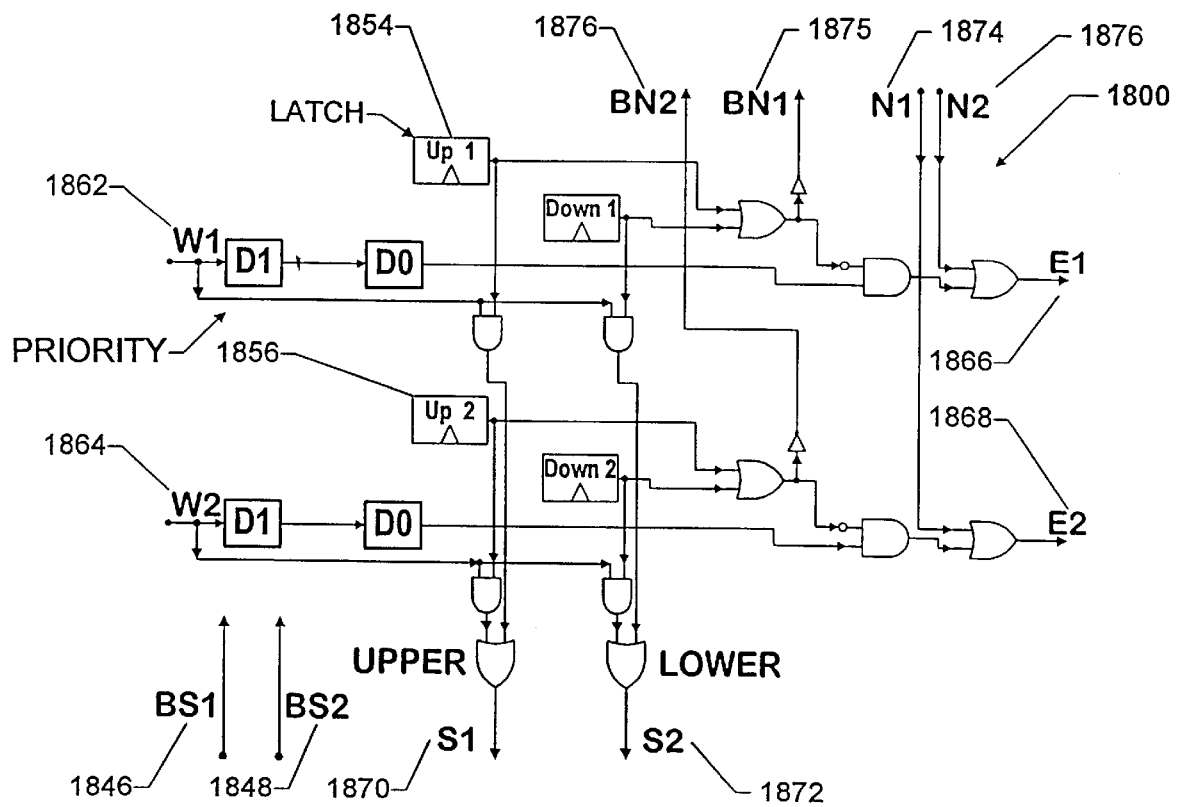
FIG. 18C is a detailed schematic diagram of a flat-latency control cell that uses the state determined by the table of FIG. 18B to set the logic gates and thereby route the message through the cell.

Referring to FIG. 14 in conjunction with FIG. 10, in the specific case where a message exists and moves downward 1412, the most-significant bit 208 is stripped from the header and the next bit 1054 in the header address then becomes the most-significant bit at the lower level. The signal value ONE is sent downward 1412 for a period of one clock period 1414 so that signal on line S 1312 is set to ONE, generating the traffic bit 202 of the downward message. At the next clock period 1414 the desired new most-significant bit 204, formerly bit 1054, is sent to at the cell at next lower level at input line N 1310. At the completion of period 1414 input line W is connected downward through line S 1416 for the duration of the passage of the remainder of the message through the control cell, that is, until the latch-set signal again goes high 1404. The next MSB 1054 immediately follows traffic bit 202, thereby stripping current MSB 208 and advantageously allowing message timing to jump ahead of messages on the current level to match the timing of messages at the lower level, thereby advancing by one clock period. Control cell 1500 is initialized by a start or reset signal 1420 which sets all delay elements and latches to ZERO. The Flow Diagram of FIG. 14 describes control for a cell that has a single path downward and to the right. A flat-latency cell, described in FIGS. 18A, 18B and 18C, is controlled by a generalization of the flow diagram where multiple input paths are examined together, and the priority of same-level inputs is additionally taken into account.

The relative timing of latch-set signals shown in FIGS. 12A and 12B shows that messages on a lower level 1204 are one clock period ahead of messages in the level above 1206. Accordingly, a downward message jumps ahead of the current timing of the message by one clock period. Furthermore, the reduction of header length results in an additional jump ahead of one clock period. The effect of steps 1412, 1414 and 1416, which is shown schematically in FIG. 13A, is that the desired header length contraction is performed and traffic bit 202 of the downward message becomes synchronized with the timing at the lower level. Input line W 1302 is directly connected to line S 1312 so that the two delay elements D1 and D0 are bypassed with the desirable effect of advancing message timing by two clock periods.

Referring to FIG. 15A in conjunction with FIGS. 11 and 13A, cell 1300 is shown in further detail as control cell embodiment 1500. Cell 1500 is a gate-level diagram showing two delay elements D1 1510 and D0 1512, latch 1316, input and output connections, and logical gates for controlling message flow. Many of the logic gates are controlled by latch 1316. When the latch is set to ONE a message from the left at line W 1302 flows left-to-right, exiting at line E 1304. Switch 194 prevents a message from an upward cell connected at line N 1310 from exiting at line E. When the latch is set to ZERO a message from the left flows downward out of line S 1312. The value of latch 1316 is always sent upward through line BN 1308 to indicate to the cell above whether the latter can send down a message. A message from the upward level at line N 1310 is allowed to flow to the right via line E 1304.

Referring to FIGS. 2 and 7, a message enters a control cell that is connected to an upper row set or to a lower row set at the next lower level. The traffic bit 202 indicates if a message is present or not. If the traffic bit is ZERO, then no message exists and the control routing is the same as for an actual downward message. The header most-significant bit 208 indicates the target destination. Specifically, the value ONE indicates a target in the upper row set, and the value ZERO indicates a target in the lower row set.

TABLE 2

Control Cell State

| Header most-significant bit (at W) | Traffic bit (in D1) | Control Cell Connected to Upper Row Set | Control Cell Connected to Lower Row Set |
|---|---|---|---|
| 0 | 0 | Downward (South) | Downward |
| 0 (to Lower) | 1 | Right (East) | Downward |
| 1 (to Upper) | 1 | Downward | Right |

Table 2 summarizes the usage of two message bits to determine which direction the message takes through the cell. When latch-set signal 1328 goes high, message traffic bit 202 is at delay element D1 1510 and the MSB 208 is at line W 1302. In the case of a message with most-significant bit set at ZERO (lower-cell destination) entering an upper-connected cell, the message is routed right and the cell to the upward level is signaled not to drop a message down. Alternately, if the same message enters a lower-connected cell and is not blocked from below the message is routed downward. Therefore the control logic of an upper- and of a lower-connected cell is complementary with respect to the value of the header most-significant bit. In the case of cell 1500 connected to an upper row set, gate 1556 is used. In the case where the cell is connected to a lower row set, gate 1576 is used. Note that because an upper-connected cell looks for ZERO to decide if the message should move right, the traffic bit 202 at delay element D1 must be used to distinguish between an actual rightbound message and a no-message condition.

Figure 15B:
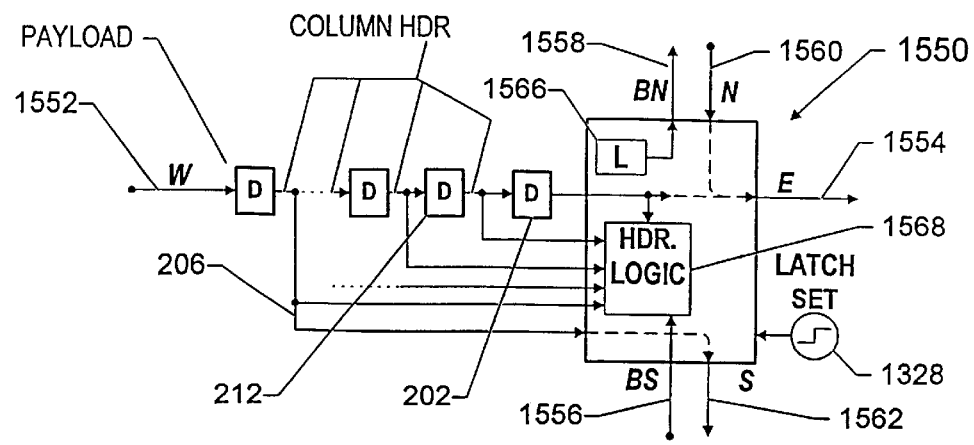
FIG. 15B is a detailed depiction of logic gates of one embodiment of a control cell at level 0 for a message that incorporates column addressing shown in FIG. 2B.

In some embodiments of Switch 100 timing is used to determine when a message exits at level 0. In other embodiments a column header 212 is used. FIG. 15B shows the special control cell at Level 0 that processes the column header. Referring to FIG. 15B in conjunction with FIGS. 2B and 12, a message 200 containing a column header 212 exits a level 0 control cell 1550 when the column number encoded in the column header matches the column number of the control cell. When the latch set signal 1328 becomes high the header logic 1568 looks at the control bit 202 and all bits in the column header at the same time. If the header address matches the column number where the cell is located and the message is not blocked from below 1556, the message is routed downward 1562. To eliminate the column header 212 from the output, line S to the downward level 1562 is connected to the first payload bit 206. Latch 1566 stores the state of cell 1550 and controls message flow in similar fashion to latch 1316 in cell 1500.

High-Speed Timing and Control

Figure 16A:
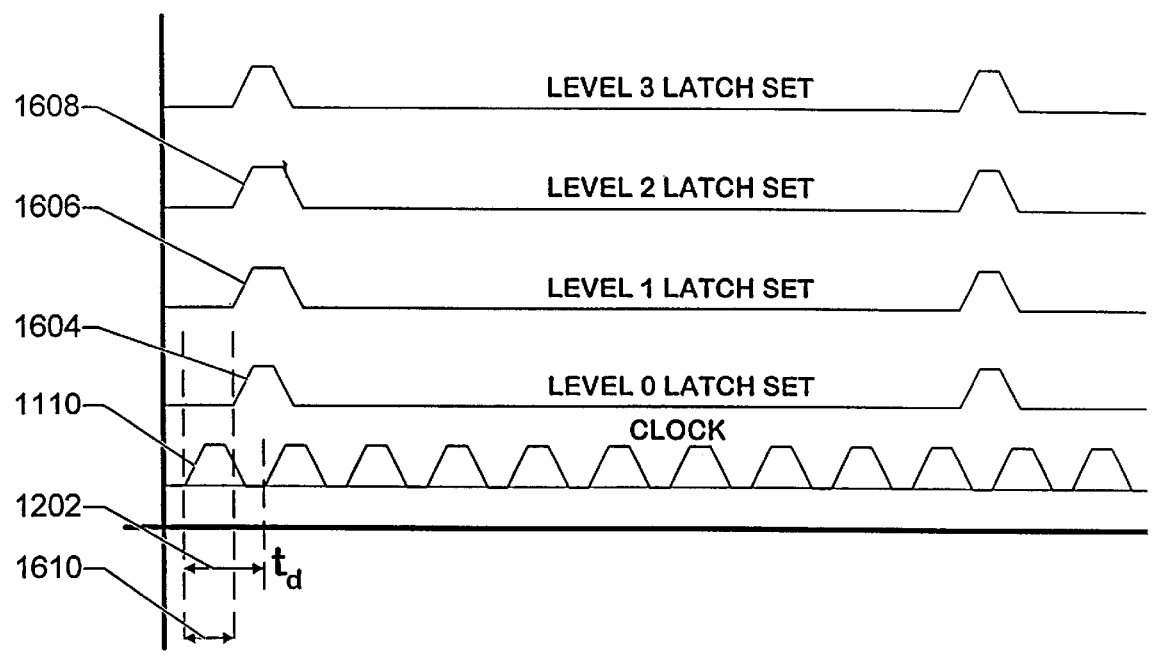
FIG. 16A is a timing chart for a high-speed timing (no inter-level delay) switch and its control cell. All processing for all levels takes place in the same clock period thereby reducing latency.

FIG. 12A is a timing diagram of an embodiment of Switch 100 in which message header bits move downward through the switch at the rate of one time period 1202 per level. FIG. 13B indicates that a message moving right on a row additionally passes through two delay elements 1102 so that two time periods are used to move right to the next cell. FIG. 16A is a timing diagram for another embodiment of Switch 100 designed for reduced latency. In this embodiment all levels at a given column receive the same latch-set signal 1604, 1606 and 1608, etc. In this embodiment, message header and message payload bits moving right on a row pass through only one delay element therefore using only one time period 1110 to move right. Header bits use one time period to move down to the next level. Payload bits moving down are directly connected to the cell at the lower level and the delay is less than one clock period. The delay is the propagation delay of the few gates within the cells.

Figure 16B:
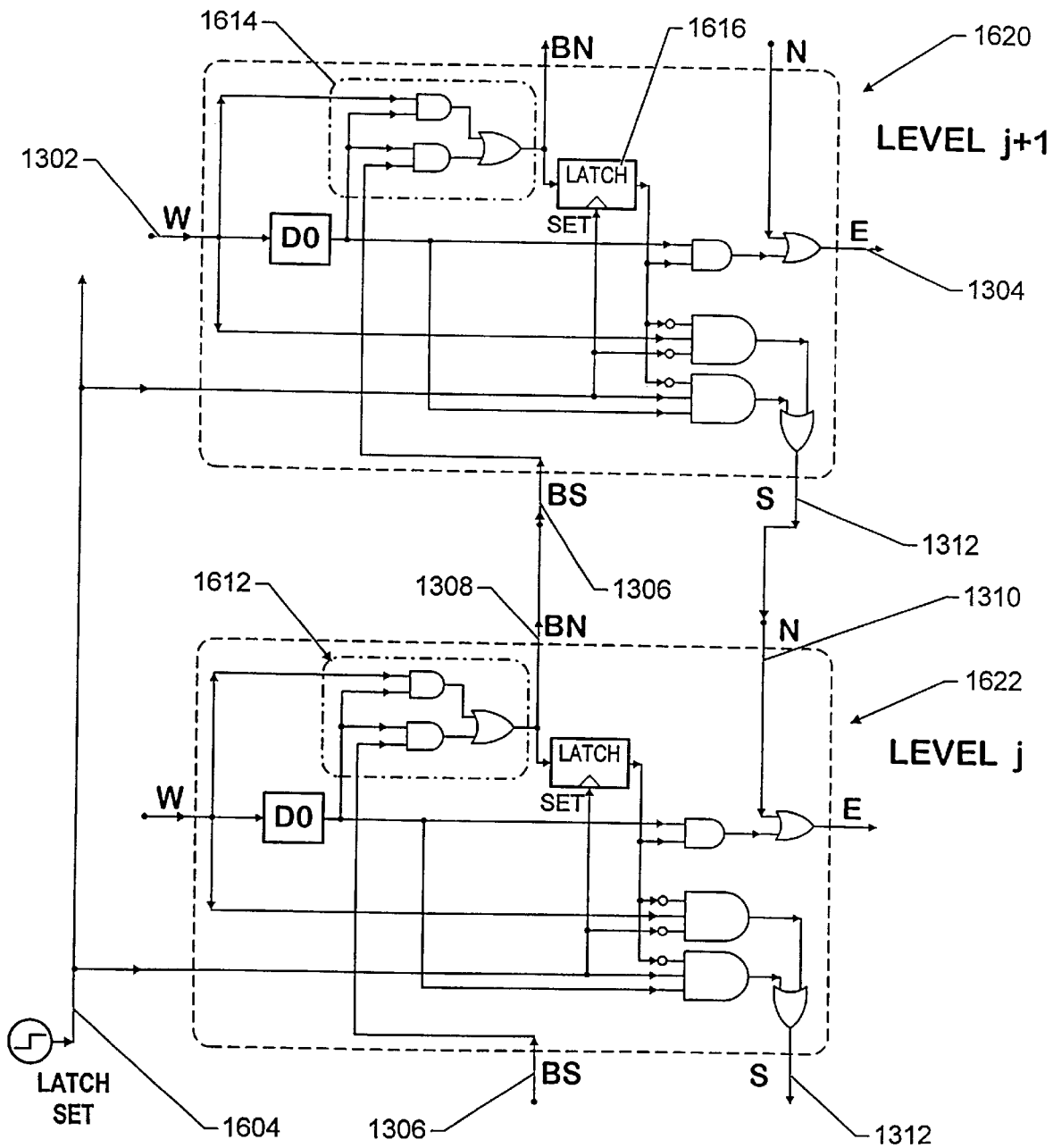
FIG. 16B is a detailed diagram of two high-speed control cell that are connected in the same column. The high-speed "ripple-up" logic is discussed.

Referring to FIG. 16B, two high-speed control cells 1620 and 1622 in the same column at adjacent levels are shown connected. At the start of the time period 1202 when latch set signal 1604 goes high, traffic bit 202 and MSB 208 of a message entering from the left 1302 are respectively at line W 1302 and delay element D0 1618. The three gates in circuit 1612 process these bits along with the value at busy signal BS 1306 and immediately sends the result upward 1308 to circuit 1614. Similarly, circuit 1614 sends its output upward to the level above. The circuit 1614 at the bottom-most level settles down, first sending the output upward 1308 and setting the circuits above in ripple-up fashion. The propagation delay of circuit 1614 times the number of levels is less than clock period 1202. All circuits are settled when latch set 1604 goes high and captures the state of control cells 1620.

32-Port Switch

Figure 17:
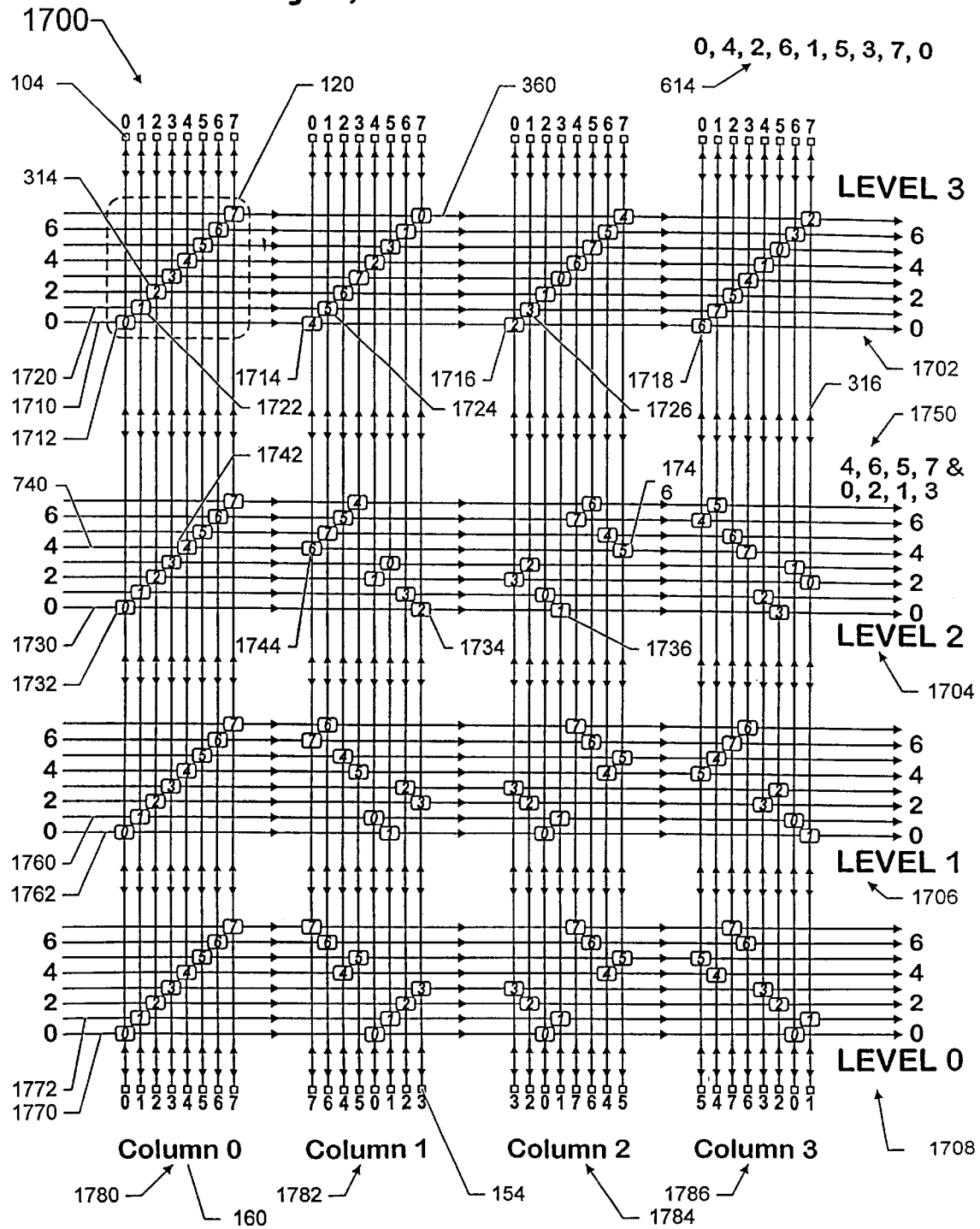
FIG. 17 is a diagram of an 8 row by 4 column, 32-port switch showing the layout and interconnections of all control cells in all switch arrays that constitute a complete embodiment of a switch.

Referring to FIG. 17 in conjunction with FIG. 1A, an example of an embodiment of a 32-port switch 1700 has four levels 1702, 1704, 1706 and 1708, and four columns 1780, 1782, 1784 and 1786. Each level includes eight rows 360. The number of ports in the embodiment is the number or rows per level (8) times the number of columns (4). Hence, the illustrative switch includes 8*4=32 input ports 104, and 32 output ports 154. To simplify the description of switch 1700, some components are omitted from FIG. 17, such as FIFO buffers 114, and optional input and output control structures 110 and 150.

Referring to FIG. 17 in conjunction with FIG. 3 a convenient method of arranging control cells includes first selecting a single column, and placing control cells in the identity configuration 340 at each level of the column. The left-most column, column 0 1780 is chosen in this example. Switch array 120 at level 3 1702, column 0 1780, has control cells arranged in the identity configuration. The numeric notation in the control cells at column 0 is defined to be the row number of the cell. Row 0 1710 at level 3 1702 has a control cell 1712 located in the first column 1780, and the numeric notation indicated in the cell is "0." Similarly, the same identity configuration and notation is placed at all other levels of column 0 1780.

After completing the arrangement of column 0 a level is selected for the next step in the layout of the switch. Any level is selected but, most conveniently, the top-most level is selected first, that is, level 3 1702 in this example. The control cells are arranged in identity configuration across level 3. The numeric notation in the control cells is derived from a placement sequence. Referring to FIGS. 6A and 9, an eight-row placement sequence 614 is chosen for switch 1700. Other eight-row sequences, such as sequences 608 or 624 are equivalently chosen. Using sequence 614, row 0 1710 at level 3 has a first control cell at position 0. Either control cell 1300 or ripple-up cell 1620 may be used in the switch arrays 120. In the illustrative embodiment, all cells in the switch above level 0 are the same type of switch. The numbering of cells on row 0 is taken from sequence 614 (0, 4, 2, 6, 1, 5, 3, 7, 0, . . . ) which determines the row connection downward 634. Therefore, the numbering of cells on row 0 (1712, 1714, 1716 and 1718) is 0, 4, 2 and 6, respectively. The first cell on row 1 1720 is at position 1, so that the cells on the row (1722, 1724, 1726 and 1728) are numbered 1, 5, 3, 7. The same left-to-right layout method is used to number the control cells on the remaining rows at level 3 1702.

The next step in the layout of switch 1700 is the placement of control cells at the level below the just completed level, that is, level 2 1704. The number in a control cell at level 3 1702 indicates where the level 2 control cell is placed. At level 3, row 0 1710, column 1 1782, control cell 1714 is numbered 4 which indicates that the cell on the relatively downward level 1744 is placed on row 4. Continuing left to right, cell 1716 is numbered "2" which indicates the level 2 cell on the relatively downward level is placed on row 2. The row location of all control cells below the top-most level is determined by the numeric value in the cell at the upward level.

The next step is the numbering of the cells placed at level 2 1704. The level 2 1704 includes two row sets 1750. The lower row set sequence is (0, 2, 1, 3, 0, . . . ) 910. The upper row set sequence is obtained by adding 4, resulting in a sequence (4, 6, 5, 7, 4, . . . ) 912. Using the described method for numbering level 3, the cells on row 0 1730 at level 2 are numbered 0, 2, 1 and 3. The remaining lower rows are numbered using the same sequence and method. The cells on row 4 1740 are numbered using 4, 6, 5 and 7, and similarly for the remaining upper row set at level 2.

The cells at level 1 1706 are likewise placed using the numbers in the cells above them. Level 1 cell numbering uses four 2-row sequences (0, 1, 0, . . . ), (2, 3, 2, . . ), (4, 5, 4, . . . ) and (6, 7, 6, . . . ) 918. Level 0 1708, the bottom-most level, is similarly laid out, that is, the control cells are placed on the appropriate row by using the numbers in the cells above. At level 0 1708 the numbering or a control cell is always the row number, which also determines the numbering of the output ports 154.

In summary, the count of ports of an embodiment of Switch 100 is determined by selecting the number of columns 164 and the number of rows per level. The number of rows R is preferably $2^L$, where L+1 is the number of levels. The cells are most conveniently first laid out in an identity configuration at the left-most column 1780, column 0, and across the topmost level 1702. The numbering of cells at column 0 is the same as the row number. The placement of the remainder of the cells in switch arrays 120 occurs in a left-to-right, top-to-bottom sequence. The numbering of cells on a row is determined by the placement sequence for that level. The placement of cells below the top level is determined by the number in the cell upward. The numbering at level 0 is the same as the row number, and is defined to be the output port number.

Flat-Latency Control Cell States

Referring to FIGS. 18A, 18B, and 18C, a control cell 1800 with two inputs from the left 1802, two inputs from the upward level 1804, two outputs to the right 1806 and two outputs downward 1808 is termed a flat-latency control cell. The input lines from the left 1802 are labeled lines W1 and W2, the input lines from the upward level 1804 are labeled lines N1 and N2, the output lines to the right 1806 are labeled lines E1 and E2, and the output lines downward 1808 are labeled lines S1 and S2. Control cell 1800 additionally has two busy signal output lines 1810 to the upward level, collectively labeled line BN in FIG. 18A, and receives two busy signal lines 1812 from the downward level, collectively labeled line BS in FIG. 18A. Busy signals one the lines BS 1812 are shown only in the example of state 7 in FIG. 18A.

Seven allowable connection states, numbered 1 through 7 1830, result from the operation of the flat-latency control cell 1800. Input line W2 may be connected to the output downward line S1 1820, to the output downward line S2 1822, or to the output line E2 1824 to the right on the same row. Similarly, input line W1 may be connected to the output downward line S1 1826, to the output downward line S2 1822, or the output line E1 to the right on the same row. Output downward line S1 1820 is connected to an upper row set at the level below, and output line S2 is connected to a lower row set at the level below. Connection of both input lines W1 and W2 to the same output downward is not allowed 1828. Input line N1 from the upward level is connected to output line E1 1834 to the right when line W1 is not connected to line E1. Input line N2 is connected to line E2 1836 when line W2 is not connected to E2 That is, line W1 has priority over line N1 in the use of output line E1, and similarly line W2 has priority over line N2 in the use of output line E2 When input line W1 is connected to output line E1, a busy signal 1810 is sent upward via the appropriate connection line BN to the upward level, and similarly when line W2 is connected to line E2. When an output line downward is not connected to either input line from the left, for example line S1, the value ZERO indicating no message present is sent downward 1832.

Flat-Latency Control Table

Referring to FIG. 18B in conjunction with FIG. 18A, the state 1830 of flat latency control cell 1800 is shown as derived from the state or value of items shown in the first four columns of control table 1840. The header address of a message entering control cell 1800 at line W1 1842 determines that the message is to move downward, either to an upper row set at the next lower level through line S1 or to a lower row set through line S2. The header address operates in the same way for a message entering at line W2 1844. If both messages are directed to the upper half of the row set, or if both are directed to the lower half, then the message at line W1 has priority over message at line W2 and the latter is not allowed to move downward and instead moves right. The direction of the message entering at line W1 is derived by examining its header MSB 204, as is indicated in the first column 1842 and in the second column 1844 for a message at line W2. In the cases where no message is at line W1 or line W2, the notation "none" is shown. A flat-latency control cell 1800 always is connected to an upper and to a lower row set.

Referring also to FIG. 3, a path to the downward level 316 may be blocked, as indicated by corresponding busy signal 330. In FIG. 18A the two paths to the downward levels of lines S1 and S2 1808 are controlled by two busy signals one lines BS 1812. In table 1840 the status of the two busy signals 1812 are given in the third 1846 and fourth 1848 columns, respectively. Output line S1 to an upper row set at the next lower level is indicated as busy (blocked) by "1" or not busy by "0" in the third column 1846, and similarly for line S2 in the fourth column 1848. The notation "na" for "not applicable" indicates that a message is not directed to that particular upper or lower row set.

The first row of table 1840 describes the case where messages at lines W1 and W2 both preferably move downward to an upper row 1842, 1844, and the path to the upper row is not blocked, indicated by "0" in column 1846. The message at line W1 has priority and is therefore connected to output line S1 to an upper row, indicated in column 1850. The message at line W2 is directed right through line E2, indicated in column 1852. This state of connections is shown in the fifth column of table 1840 and as state 5 1830 in FIG. 18A. The next row in table 1840 describes the same conditions as the first row except that line S1 is blocked from the downward level and therefore both messages are directed right on respective rows. This is shown as state 7 1830. In the condition of no message at lines W1 or W2, the respective input line is connected to an available output downward line S1 or S2, preventing the sending of a message downward 1832 and preventing blocking of the respective input line from the upward level 1804. Equivalently, the output downward is directly connected to signal value ZERO 1832.

Table 1842 shows that the value of the items in the first four columns of table 1840 determine the state 1830 of flat-latency control cell 1800. The state 1830 of the control cell 1800 determines the values set in latches T1 and B1 shown in columns 6 and 7 1854, and latches T1 and B2 shown in columns 9 and 10 1856.

Flat-Latency Logic Detail

Referring to FIG. 18C in conjunction with FIG. 18B, an embodiment of a portion of flat-latency control cell logic is shown. Logic that sets the latches enumerated in table 1840 is omitted. Latches T1 and B1 1854 and latches T1 and B2 1856 control the routing of any messages from input ports W1, W2, N1 and N2. In addition the output values of busy signals on lines BN1 1875 and BN2 1877 are derived from the latches. When output line E1 is occupied with the transmission of a message, the busy signal on line BN1 1875 is set to signal value ONE, indicating that row E1 is busy, and similarly for output at row E2 and busy signal BN2 1877. When a message 200 has entered flat latency control cell 1800 such that traffic bit 202 is stored in delay element D0, a latch set signal (not shown) initiates the processing defined in table 1840 that culminates with the setting of the four latches. The processing is performed within one clock period with the advantageous result that successive bits of message 200 are desirably routed downward or right. As described for FIG. 13A, the most significant bit 208 of the header is stripped from a message moving downward.

Control cell A 1800 is connected to cell B 1800 in the upward level such that line BN1 and line N1 of cell A are respectively connected to lines BS1 and S1 of cell B, and line BN2 and line N2 of cell A are respectively connected to lines BS2 and S2 of another cell C in the upward level (not shown). In another case, such as a cell D at level Q, all four connection lines BN1, N1, BN2 and N2 of cell D are respectively connected to lines BS1, S1, BS2 and S2 of cell F to the upward level. Cell A is always connected to the right to a single cell G such that lines E1 and E2 of cell A are respectively connected to lines W1 and W2 of cell G.

Flat Latency Control Cell Symbol

Figure 18D:
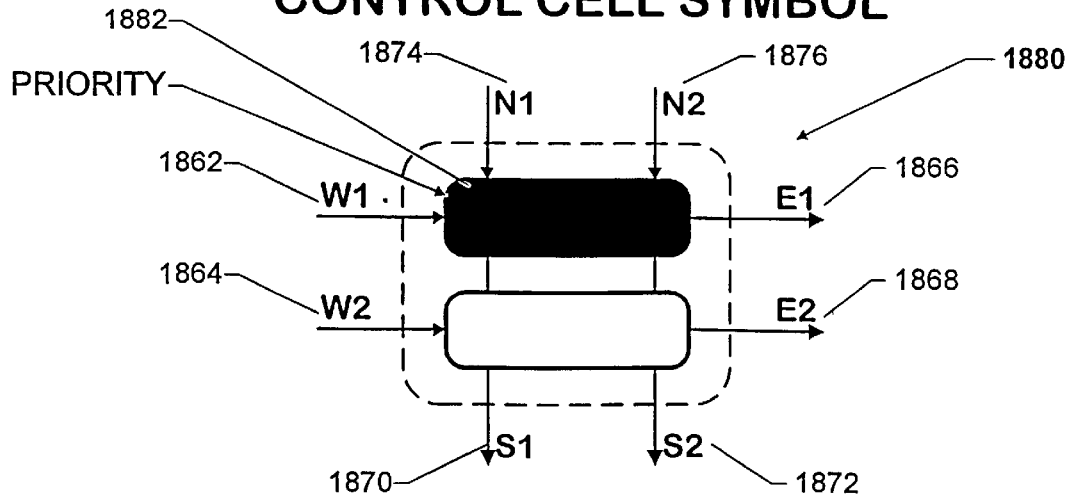
FIG. 18D is a concise symbolic representation of a flat-latency control cell that is used in subsequent figures.

Referring to FIGS. 18B and 18D, a message at line W1 has priority over a message at line W2. That is, if both messages are targeted to the same non-blocked row set downward at lines S1 or S2, then the message at line W1 has priority and is routed downward to the output of lines S1 or S2 and the message at line W2 is routed to line E2. In an alternate version of control cell 1800, a message at line W2 has priority over a message on line W1. The logic of this alternate control cell is defined by interchanging lines W1 and W2 and interchanging lines E1 and E2 in table 1840. FIG. 18D is a symbolic representation 1880 of flat-latency control cell 1800 when line W1 has priority over line W2, the priority indicated by solid black 1882. In the alternate version where line W2 has priority over line W1, the bottom block is solid black. In either version of symbol 1880 the busy-signal connections to the upward level and from the downward level are omitted for clarity. This concise symbol is used to simplify the depiction of the full layout of a flat-latency switch, given in FIG. 19. In an alternate priority scheme, not illustrated, W1 has priority for upper connections and W2 for lower connections in even-numbered columns; and the priorities are reversed for odd-numbered columns.

16 BY 4 Flat Latency Switch

Figure 19:
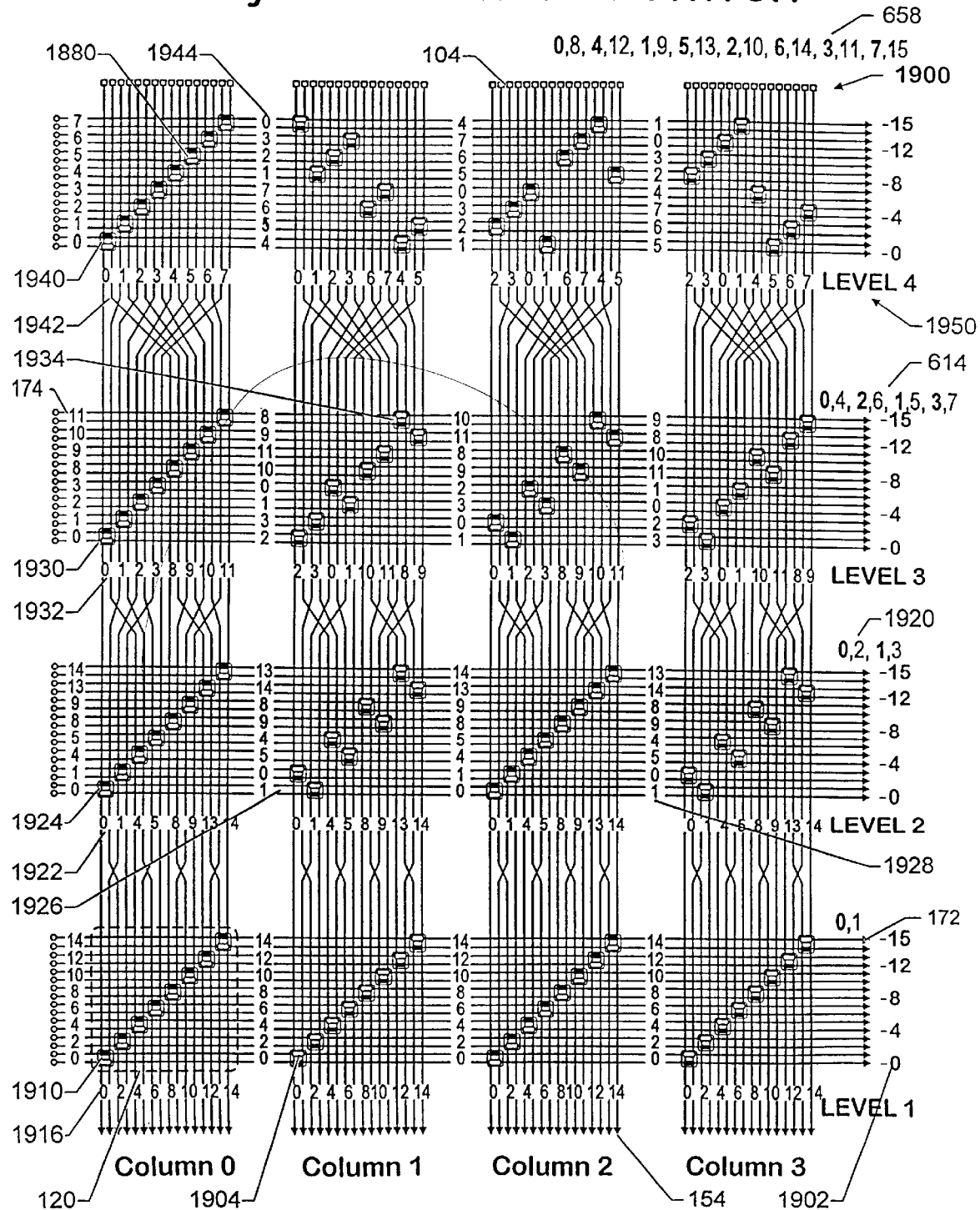
FIG. 19 is a diagram illustrating the complete interconnections and layout of a 16 row by 4 column, 64-port flat-latency switch, that form a complete embodiment of a flat-latency switch The locations and interconnections of all control cells in all switch arrays are shown, and the discussion describes how the layout is performed.

Referring to FIG. 19 in conjunction with FIGS. 1, 3, 6A, 6C, 18A, 18C and 18D, a flat-latency switch 1900 of four columns and four levels is described. Each level contains 16 rows 1902 enumerated 0 through 15. A flat latency control cell 1800 connects two rows with two pairs vertical connections, as shown in FIGS. 18A and 18C.

A method of laying out cells 1800 in control array 120 is described. Other components of a Switch 100 are omitted from this description and from the figure. The total number of input ports 104 of switch 1900 is the number of rows (16) times the number of columns (4), or 64. The number of output ports 154 is the same as the number of input ports.

Referring to FIGS. 1, 18A and 18C, a flat-latency control cell 1800 has two outputs to the downward level at lines S1 1870 and S2 1872. Because of this "dual-output" nature of the cell 1800, a level 0 control cell is not used for the operation of a flat-latency switch.

A method for placing flat-latency control cells 1800 in switch array 120 involves first placing the cells in an identity configuration at the bottom-most level, level 1 at all columns. Thus control cells are placed along the diagonal extending from the lower left to the upper right of switch array 120. Given 16 rows per level 1902 and two rows per cell 1800, a switch array thus uses 16/2, or 8, cells. A control cell 1880 with priority 1882 at the top row of the pair of rows is placed along the diagonal in the control array 120 at column 0 1910. At the next column, column 1, control cells with priority at the bottom row 1904 are used to fill the control array. This method of alternating row-priority from one column to the next is used in the remainder of the layout of switch 1900. The other control arrays at column 0 for all levels above level 1 contain the same layout as level 1, that is, the identity configuration of top-priority cells 1882. This completes the layout of the left-most column and bottom-most level of switch 1900. The remaining switch arrays are laid out in left-to-right sequence at each level starting at level 2 and moving up one level at a time until the top-most level is completed.

The numbers in box 1916 indicate the lowest output port number of the pair of ports 154 to the downward level to which the control cell 1800 is connected. Cell 1910 is shown as connected to port 0 and also connected to port 1. The numeral "1" is omitted in FIG. 19 because space is limited and the numeral is not needed in the layout process. The numbers in box 1916 are used to assist in the placement of control cells in the level above.

Referring also to FIG. 9, at level 2 a message moving right along row 0 follows the connections specified in sequence (0,2, 1,3, 0, ...) 910. The first cell 1924 is connected to rows 0 and 2 below. The next cell to the right 1926 is connected to rows 1 and 3. The vertical interconnection pattern 1922 between levels 1 and 2 form connections that satisfy sequence 910. Cell 1924 is connected to the downward level to cells on rows 0 and 2, respectively, at level 1. At the next column (at level 2) cell 1926 connects to the downward level to cells at rows 1 and 3, respectively. The numbers in the vertical boxes 1928 between switch arrays indicate placement sequence 1920 (for clarity, only the first number of the pair is shown). Examination of row 0 at level 2 shows that control cells are successively positioned over cells at 0, 1, 0 and 1 to the downward level. The sequence (0, 1, 0, 1) appears as the bottom-most digit in successive boxes 1928 at level 2, establishing the positions of the bottom row of control cells at level 2.

At level 2, the next row of cells is placed along rows 2 and 3. The cell on rows 2 and 3 at column 0 is connected to the only remaining pair of connections 1 and 3. The lowest row number to the downward level is 0, but to avoid ambiguity in the layout process, 0 is not repeated in horizontal box 1916 (between levels 1 and 2). Instead, the value 1 is used. That is, each value in box 1916 indicates the lowest row number of the pair of cells connected to the downward level. Since two cells are used with four row numbers, the lowest row is used unless already used in the sequence. In the latter case the next lowest number is used. Thus the sequence 0, 1,4,5,8,9,13,14 is used above level 1 (rather than 0,0,4,4,8, 8,13,3) to advantageously assist in the placement of cells in the level above. The boxes 1916 above level 2 are filled in using the described rule, and the illustrated values are used to lay out cells at level 3.

Placement sequence (0,4, 2,6, 1,5, 3,7, 0, ...) 614 is used at level 3 to place control cells. The vertical interconnection pattern 1932 between levels 2 and 3 satisfies the connections required by sequence 614. In FIG. 19A, the first digit of each pair in 614 is shown in bold, because only the first digit of the pair is used for placement. Cell 1930 is connected to rows 0 and 4 to the downward level. At column 0 the next cell in the diagonal is connected to rows 1 and 5, the next cell is connected to 2 and 6, and the fourth in the diagonal is connected to 3 and 7. That is, the first digit of the four pairs form the series 0, 1, 2 and 3.

Alternate digits taken from the sequence (0,4, 2,6, 1,5, 3,7, 0, ...) 614 yield the sequence (0,2, 1,3, 0, ...) that is used for the row layout. Along rows 0 and 1, cells 1800 are placed above connections 0, 2, 1 and 3 to the downward level. This sequence is shown as the bottom digit of the series of vertical boxes 1928 at level 3. Along rows 2 and 3, cells are placed over connections 1, 3, 0 and 2. Control cells at level 3 in columns to the right of column 0 are placed at the intersection of like numbers in the vertical box 1928 to the left and the inter-level box 1916 below. The inter-level boxes 1928 above level 3 are filled in using the rules described for level 2.

Placement sequence (0,8, 4,12, 1,9, 5,13, 2,10, 6,14, 3,11, 7,15, ...) 658 is used to lay out level 4 1950. Cell 1940 is connected to the downward level to rows 0 and 8. Continuing up the diagonal the next cell is connected to 1 and 9, then the next cell to 2 and 10, and so on. The interconnection pattern 1942 satisfies these connection requirements. The remainder of level 4 is laid out by first filling in the vertical boxes using the sequence derived from the first digit of the pairs of 658, that is 0, 4, 1, 5, 2, 6, 3, 7, 0, ... This series is used to fill in the vertical boxes 1944 at level 4. The control cells are placed at the intersection of like numbers from the boxes to the left and below each switch array. FIG. 19A illustrates the application of the rules described herein for laying out control cells 1800 for a flat-latency switch 1900.

If a message entering cell 1910 at line W2 is not blocked by another message at line W1 which has priority and also preferentially moves to the same row at level 0, and if the target row is not blocked from the downward level, then the message on row 0 is immediately sent downward to the message target. Thus, a non-blocked message at line W1 or line W2 always moves downward. In the illustrative implementation and usage of flat-latency switch 1900, a message entering control cell 1800 has a very small probability of being blocked and therefore generally moves downward each time the message enters a control cell from the left. Referring also to FIG. 17, the latency of switch 1700 is such that a message moves to the next column with a probability of 50% before the message moves downward. Thus, a message dropping downward generally reaches the "wrong" row set half the time. In contrast, for the switch 1900 a message dropping downward advantageously always has a connection to an upper and a lower row set. Given similar loading conditions, switch 1700 has 50% greater average latency than switch 1900. Furthermore, the time of flight and thus the latency of a single message through switch 1700 varies from 100% to 200% of the minimum value, whereas the latency of a single message through switch 1900 is approximately constant for all messages and is the same as the minimum latency of single-path switch 1700.

Input Port Connections

Referring to FIG. 8B, a message B 840 moving right at a lower level can block 842 the desired movement down of another message A 802 at the level above. As a consequence of message A having been blocked, other messages C 844 and D 846 can likewise be blocked by message A. Had message A avoided not been blocked in the first instance, messages C and D would also not have been blocked. As the number of messages in the switch increases, the likelihood of blocking of an individual message increases. Referring also to FIG. 4, a message 200 is allowed to enter Switch 100 whenever the column ready signal 404 goes high and the input port is not also blocked 406. Statistical analysis of Switch 100 shows that the likelihood of a message being blocking during passage through any embodiment of the switch is significantly reduced by lowering the rate of input of messages into the switch.

The maximum rate of input into the switch (100%) is defined as the condition when all ports 104 receive a message at each non-blocked time 406. If the rate is lowered to the range 25% to 50%, depending on the size and the particular embodiment of Switch 100, message blocking and the negative effects on latency dispersion are greatly reduced, even to the point of insignificance. One method of reducing input rate is to specify that the external device connected to port 104 meters or otherwise reduces the frequency at which messages are injected. Disadvantageously, this technique places responsibility for the rate reduction on a device external to the switch. An alternate method involves reducing the rate that the column ready signal 404 is sent. Disadvantageously, an external device may have to wait longer to inject a message. The effect of either of these rate-reducing schemes is an increase in effective latency and a decrease in total throughput of Switch 100.

Referring to FIGS. 17 and 20A, the top level 1702 of an eight-by-four switch 1700 is shown with 32 input ports 104. In an alternate embodiment of switch 1700, the same top level 2010 has less than half as many input lines. A control cell 300 at the top level may be connected to an input port, or not connected 2112. The first two columns of FIG. 20A illustrate a method of reducing the input rate to 50% without the undesirable effect of increased latency. The input rate is further reduced and adjusted by not connecting specific cells 2114 to an input 104. In one embodiment of switch 1700 output connections 154 are likewise omitted in a manner corresponding to the omitted input ports (not shown). Therefore the switch has the same number of input and output ports. In another embodiment, all 32 output ports 154 are implemented. Alternate embodiments of switch 1700 therefore can have 32 input and 32 output ports, or 16 input and 16 output ports, or 16 input and 32 output ports. Yet other connection counts could be selected for other embodiments, depending on loading factors and performance considerations. The number and arrangement of inputs 104 versus the total possible number determines the maximum message flow density within Switch 100. Message flow density is defined as the actual number of messages within a switch against the maximum possible number.

Referring to FIGS. 18D, 19, and 20B, the input rate of a flat-latency switch is reduced to 50% by using the same scheme described for the first two columns of FIG. 20A. That is, cells 1880 in alternate columns do not have input connections 2024. In FIG. 20C, another method involves connecting only one of the two upward input lines 1874 and 1876 of cell 1880 to input port 104. Input 104 is preferably connected to the row that does not have priority 2072 and 2074 because on that same row the cell to the left has given that row priority and thus the row is less likely to contain a message that would block input from 104. To further reduce and fine-tune the switch input rate, a combination of methods shown in FIGS. 20B and 20C are used. Specifically, some columns have only one input per cell 2072 and other columns none 2024, similar to the input connections in FIG. 20A.

The number of input (and output) ports of a silicon integrated circuit chip implementation of an embodiment of Switch 100 is pin limited. That is, the number of input and output connections available on the chip determines the size of the switch This situation results from the comparatively small amount of logic gates used to implement a control cell. Given this set of technologically-determined circumstances and the uniquely small amount of gates used, logic capacity is advantageously used over pin capacity to reduce latency and message flow density. One method of exploiting logic capacity is to spend the excess of available logic on the more complex flat-latency cell 1800. Another method is to reduce the input and output port connections 2112 and incorporate more columns to make up the difference. Both methods may be employed in combination, as is exemplified in FIGS. 20B and 20C. In practice the available I/0 connections or pins determine the capacity of the switch. The illustrative implementation uses a factor of 2 to 4 or more times the minimum number of necessary columns. For example, the 64-port switch 1900 is implemented with 8 to 12 internal columns (versus the 4 columns of FIG. 19) by using the input connection method of FIG. 20C or a combination of those shown in FIGS. 20B and 20C.

Right to Left Connections

In FIGS. 21A, 21B and 21C, various east to west (or right to left) connection implementations are illustrated. Referring to FIG. 21A in conjunction with FIGS. 1 and 3, a message at the right-most column 164 passes through an optional FIFO buffer 114 and reaches a row exit point 172. The exit point 172 is the right-most position of a message on a left-to-right movement along a row 360. A message at point 172 has not successfully moved downward to the level or output port below. In some embodiments of Switch 100, the message is transmitted left on path 2104 to row entry point 174 on the same row and connected to a control cell in switch array 120 at column 0 160. The message at column 0 immediately has an opportunity to move downward in continuance of a journey to the message target row.

Referring to FIGS. 7, 20A and 21B, another embodiment of Switch 100 has a message reaching row exit point 172 which is transferred 2106 to an input port 104 that is not connected externally. FIFO 2108 adjusts the timing of the message to satisfy column timing requirements. Unused row entry points 2120 may be connected externally and function as input ports 104 with a restriction that a message entering the switch at point 174 at a level below the top level cannot necessarily reach all possible rows at the bottom level. For example, a message entering the switch at a row in the upper row set 710 at level 2 cannot reach any row in the bottom row set 716 at level 1. Messages entering the switch at levels below the top level advantageously may experience lower latency than those entering at the top, but are restricted in the range of possible targets that the message can reach.

In yet another embodiment (not shown) which is a combination of connections shown in FIGS. 21A and 21B, some exit points 172 are connected 2104 to entry points 174 while other exit points are connected 2106 to unused input ports 104. Referring to FIG. 21C, another embodiment of Switch 100 includes an exit point 172 that is connected to entry point 174 on a different row 2110 with the advantageous effect that a message that has been continuously blocked on one row is given another chance to move downward on another row.

Referring to FIGS. 2A, 2B and 2C, a message 200 generally includes a header section and a payload 206, with a total length 214. The length of individual messages entering any embodiment of Switch 100 may vary. The switch can accept any message length up to a pre-specified maximum size. For a given embodiment of Switch 100 the format and size of the header or headers is fixed according to the implementation of the switch, but the length of the payload 206 can vary, thereby causing the total message length 214 to vary. According to the discussion of FIGS. 8B and 21A, a message entering a control cell from the upward level at any column may be repeatedly blocked such that the message circulates back to entry point 174 on the same row 2104. In the case where the message continues to be blocked, the message reaches the control cell at the column where the message first entered the row from the upward level. That is, a message is in a condition where the "head" or traffic bit 202 is chasing the "tail" or the last bit of the payload 206. Thus, the storage capacity of a row is to be sufficient to contain all bits 214 of the message.

Referring to FIGS. 11A, 13A, 15A, 16B, 17 and 18C and examining control cells 1300, 1500, 1620 and 1800, a control cell contains one or more delay elements 1102 in the left-to-right path through the cell. These delay elements participate in the address decoding and message routing of messages by the cell. Taking in aggregate all the delay elements 1102 in all control cells along a row, from the first column to the last column, the aggregation of delay elements also functions as a FIFO storage device. For example, control cell 1300 contains two delay elements. Switch 1700 has four columns and thus the storage capacity of the four control cells of a row 2 times 4, or 8 bits. In practice, message length 214 is considerably greater than 8, hence FIFO 114 is used to enlarge the row storage capacity to message size 214. Continuing an example where the message length is 32 bits, the length of each FIFO 114 is (32−8) or 24 bits.

Referring to FIGS. 20A, 20B, 20C, increasing the number of columns relative to the total number of inputs 104 advantageously reduces message blocking within the switch and improves latency. An additional benefit of increasing the number of columns is that the storage capacity of a row correspondingly increases. For example, a 32-bit message in another version of switch 1700 that has 16 columns does not utilize FIFO 114 at all. The 16 columns yield an aggregate of delay of 32 bits which indicates a 32 bit message can circulate on a row without the head colliding with the tail. Given the technologically-imposed condition of an excess of logic gates versus I/O connections, logic gates are advantageously utilized on as many control cells as possible because of the increase in each row message storage capacity in addition to the advantageous reduction in data flow density discussed previously. In an illustrative embodiment of Switch 100, the logic gates are used to make many paths downward as possible, that is, to make additional columns that are not connected to inputs 104. In embodiments where the message length 214 is large in relationship to the available gates, a FIFO 114 is used at each row.

Low-Latency Output

Figure 22A:
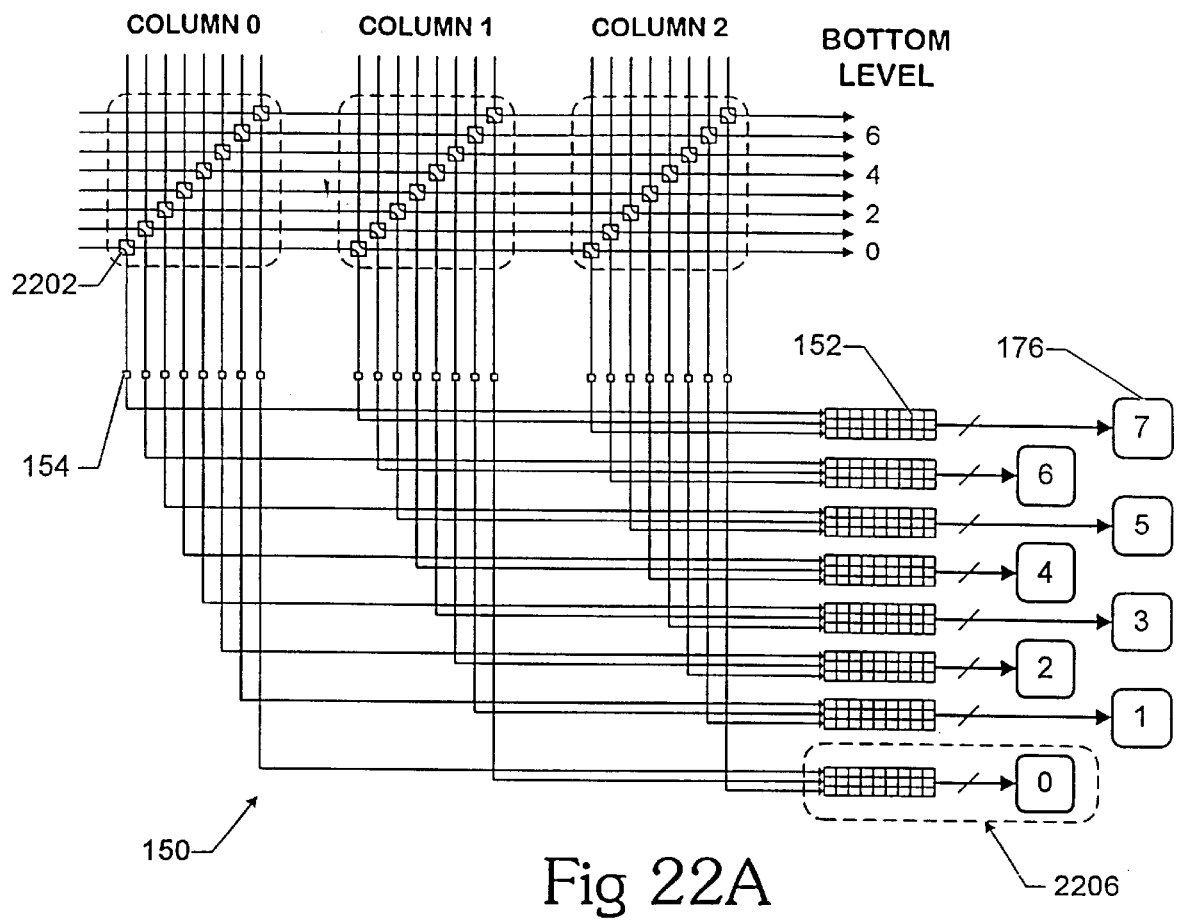
FIG. 22A is and block diagram of a low-latency output circuit that for a message described in FIG. 2A, and is intended for the lowest possible latency, such as would be used in a supercomputer.

FIG. 22A shows a low-latency output structure which reduces blocking at a bottom level. Referring to FIG. 2A, a message 200 contains a row header address 204 that specifies the target row at the bottom level of the switch. An embodiment of Switch 100 with the output structure of FIG. 22A does use a column header 212. The target row specified in header 204 is the final destination of the message and the physical column at which the message is located is immaterial when the message reaches the bottom level. Messages reaching any bottom-level row are collected in parallel from all columns and supplied to the final output device 176. Effectively, the plural number of columns is used to increase the bandwidth and reduce latency to the target 2206 and to reduce and minimize blocking at higher levels. Because a message reaching the bottom level immediately moves downward, the message therefore never moves right at level 0 to potentially block a message at levels above. The described output method advantageously drains Switch 100 of messages at the fastest possible rate, thereby decreasing latency and congestion at upper levels.

Referring to FIGS. 1 and 22A, in one embodiment of Switch 100 the output structure 180 includes a plural number of external devices or message targets 2206. The count of these devices is the same as the number of rows at the bottom level. A buffer 2210 in buffer array 152 accepts a message 200 serially from control cell 2202 at the bottom level of the switch. This embodiment is intended for low latency application, since the buffer 2210 is always ready to accept data so that cell 2202 does not have a busy signal input. The cell 2202 always immediately sends the message downward.

Figure 22B:
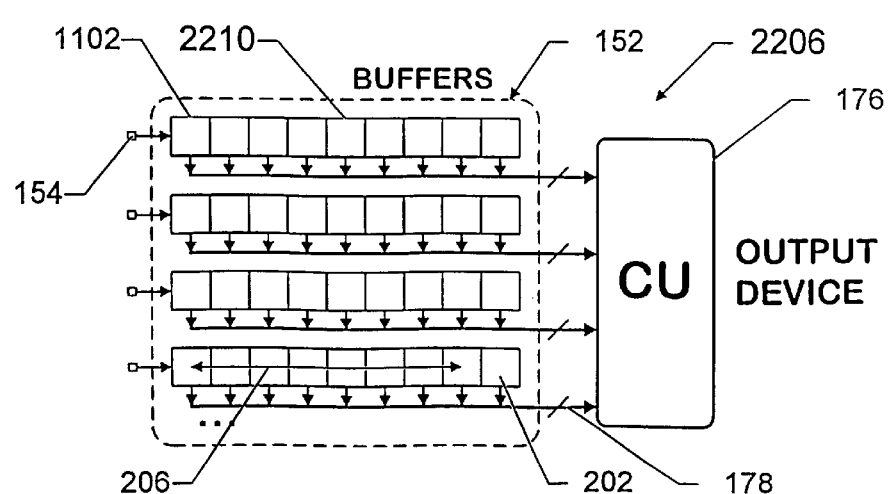
FIG. 22B is a detailed diagram of an element in diagram shown in FIG. 22A.
Figure 23A:
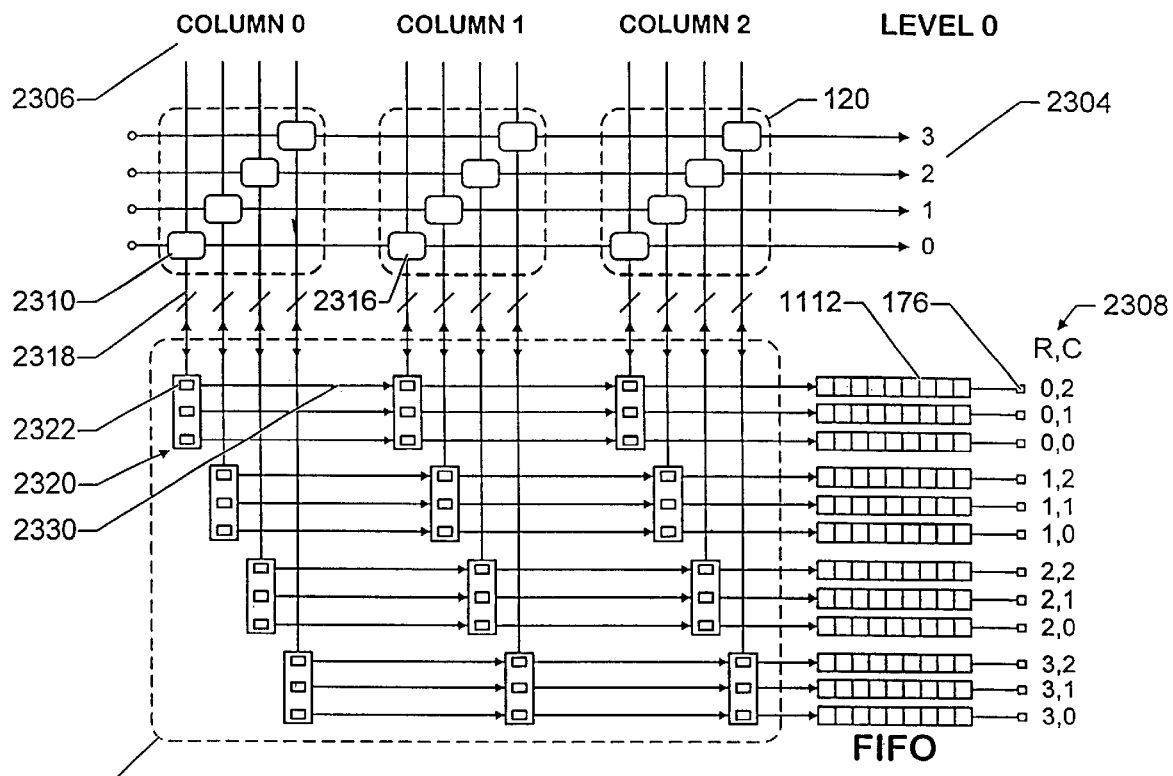
FIG. 23A is a block diagram of the output of a switch that uses the row and column addressing described in FIG. 2B, and is intended for a large capacity switch, such as an ATM or telephonic switch with very many ports.
Figure 23B:
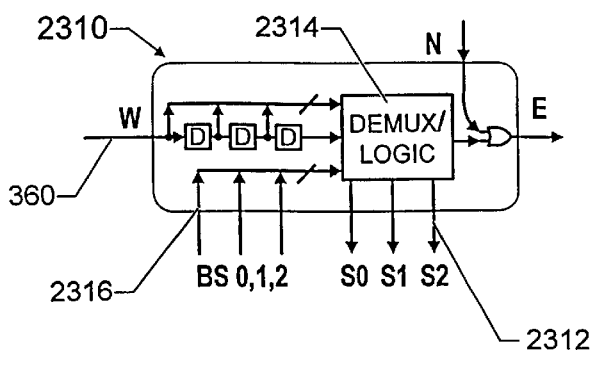
FIGS. 23B and 23C show detail of elements of FIG. 23A.
Figure 23C:
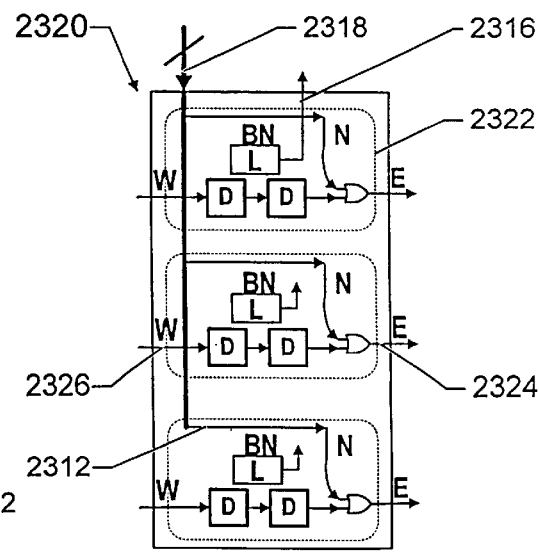

Referring to FIGS. 4, 12B, and 22B the traffic bit 202 of a message arrives at buffer 2210 at the times indicated by column ready signal 422. The minimum amount of time between messages is the inter-message time $t_m$ 1224. Buffer 2210 accepts the message traffic bit 202 and payload 206 serially. The header 204 is removed from the message as discussed in the description of FIG. 10. The content of buffer 2210 is removed by parallel bus 178 and delivered to target 176, such as a processor or control unit of a supercomputer. Buffer 2210 is then reset to zero to indicate that no message is present. The presence of a message in buffer 2210 is indicated by traffic bit 202 in the buffer. The traffic bit indicates that a payload is in the buffer and is to be removed before the next cycle 442.

Referring to FIGS. 1, 12B, 22A and 22B the input timing of buffers 2210 in a structure 2206 is different for each FIFO 1102 because the buffers are connected to control cells 2202 at different columns. The time difference derives from the delay elements in the control cells and is equal to time $t_C$ 1240. The column timing signal is externally available at timing port 168.

Row & Column Addressing

Referring to FIGS. 1, 2B and 15B, a message 200 that has a column address header 212 is targeted to output port at a specific row and column. In one embodiment of Switch 100, a level 0 control cell 1550 reads the column address 212 and sends the message downward if the address matches the column location of that control cell. In an interconnect structure with many columns, a message probabilistically moves right through a large number of cells 1550 before reaching the destination column while messages at level 1 that preferentially drop to that row at level 0 are prevented from doing so. Thus, an embodiment of Switch 100 that uses level 0 control cells 1550 does not always efficiently drain messages from the switch, hereby increasing the likelihood of message blocking at higher levels.

Referring to FIGS. 1, 23A, 23B and 23C, output structure 180 at level 0 immediately transfers the message 200, if not blocked, with row and column address 2308 to output port 176. Message A at level 0 is addressed to row 0 column 2 Message A enters control cell 2310 which reads 2314 column address 212 and sends the message downward on path 2312 to output control 2322 where the message moves right on path 2326 to FIFO buffer 1112, which is connected to target output port 176. Another message 200 at a level 1 cell above cell 2316 which preferentially is to drop to cell 2316 at the next column is desirably not blocked by a message sent right from cell 2310 at level 0. A message moving right on path 2330 from control cell 2322 blocks cell 2316 from sending down a message to the same address 2308 by sending busy signal 2316 upward to a control cell 2310 at level 0. Another message at cell 2316 addressed to the same row and different column is not blocked by a cell on path 2330. Therefore, in an embodiment of Switch 100 using cells 2310 and 2322 where concurrent messages are targeted to different columns at the same row advantageously do not cause the blocking that occurs in an embodiment that uses control cell 1550 at level 0.

Bus 2318 includes busy signals 2316 and data paths 2312 and connects control cell 2310 to structure 2320 to the downward level. Structure 2320 includes K control cells 2322, where K is the number of columns.

Multicast Control

A desirable feature of a large switch is multicast transmission capability, the sending of a single message to many or all output ports. In another embodiment, a single Switch 100 supports both one-to-all message routing.as well as one-to-one message routing simultaneously. The method of this embodiment is that a multicast message is duplicated each time the message is dropped to the next lower level. The desirable result is that one copy is produced for every row of the switch when the messages eventually reach level 0. The multicast message then moves right along each row at level 0 and a copy is dropped downward at each column, with the desirable result that all output ports 154 receive a copy of the message.

Figure 24A:
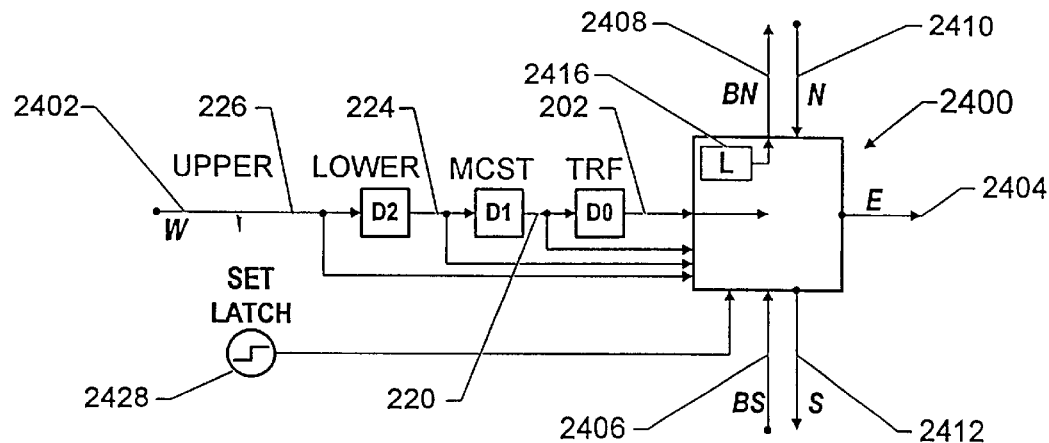
FIG. 24A is a diagram of the components of a multicast control cell that uses the message described in FIG. 2C for the purpose of sending a message from one input to one output, or for broadcasting (multicasting) a message to many outputs, or to all output ports.
Figures 24B, 24C, 24D:
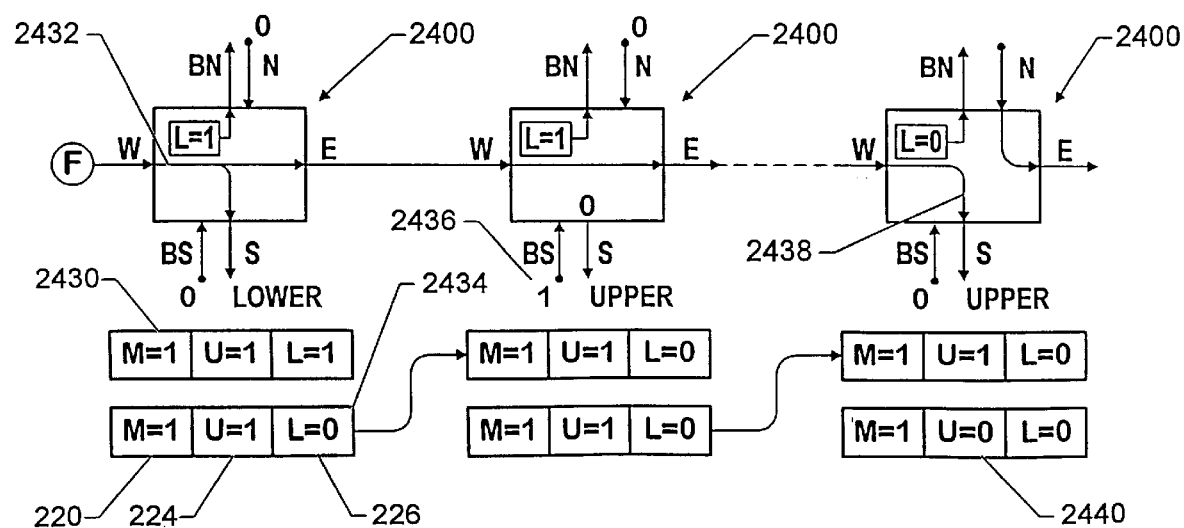
FIGS. 24B, 24C and 24D taken together form is a depiction of the states of a multicast control cell as a multicast message moves right along a row.

FIG. 24A shows a control cell 2400 for a multicast message 230, and FIGS. 24B, 24C, and 24D show different states of multicast control cell 2400. The multicast capability described here and shown in FIGS. 24A, 24B, 24C, and 24D is consistent with all other embodiments so that multicasting is optionally be built into any embodiment at the cost of additional control cell logic. Referring to FIG. 24A in conjunction with FIGS. 2, 10, 12A, 12B, 13A, and 13B, a multicast message 230 contains a second bit in the header, called the multicast bit 220 following traffic bit 202.

When the multicast bit is set to ZERO the message is sent to the single port determined by the row header 204 and the column header 212. The technique for controlling the point-to-point transmission is the same as that generally described for FIGS. 12, 13, 14 and 15. An additional delay element is included in control cell 2400 to hold the multicast bit 220. When the traffic bit 202 is ONE and the multicast bit is ZERO, indicating point-to-point transmission, control cell 2400 examines most-significant bit 208 and busy signal BS 2406 to determine if the message is to be routed downward or right. When message 230 is routed downward the traffic bit (ONE) and the multicast bit (ZERO) are successively sent down to line S 2412. After the two cycles complete, a connection is made between delay element D1 and line S with the advantageous results that the bit 1004 following the most-significant bit 208 becomes the most-significant bit at the next level. The message advances by 2 bits to maintain the inter-level timing requirement shown in FIGS. 12A and 12B.

When the multicast bit 220 is ONE, message 230 is routed right until both an upper row and a lower row on the lower level have received a copy of the message. As the message 230 moves right, the message preferentially drops to the upper 1015 and lower 1016 rows of the lower level. Referring to FIG. 24B, the "upper" bit 224 and "lower" bit 226 are initially set to ONE, indicating that the message has not yet been sent to either row at the lower level.

In FIG. 24B, a message F enters a control cell that is not blocked so that a locking signal on line BS is ZERO. Copies of the message F are sent downward and right 2432. The control cell is located over a lower row and therefore the "lower" bit 226 of the rightbound copy is set to ZERO to record that the branch has been satisfied 2434. When a copy of a multicast message is sent downward 2412, both the upper 224 and lower 226 bits of the downward copy are reset to ONE so that the message is again duplicated at the lower level.

Referring to FIGS. 24C and 24D, the message F moves right to a cell that is connected to an upper cell. This cell is blocked from below 2436 and the message continues right. Message F eventually reaches a non-blocked control cell that is connected to an upper cell. At that cell a copy of message F is finally routed downward 2438, and the "upper" bit 224 of the rightbound header is set to ZERO 2440. Both the upper and lower marker bits are now ZERO, indicating the message has been duplicated at the lower level, so the message is no longer transmitted right.

FIGS. 24B, 24C and 24D describe a message, with the multicast bit set at ONE. The message moves right until the message is twice dropped to appropriate rows at the lower level. When a message is dropped, both marker bits 224 and 226 are set to ONE. This duplication continues in the switch until level 0 is reached. Since the interconnect structure includes L levels, L duplications are made, resulting in 2 L rows containing a copy of the message. Each time a message is dropped, one of the two rows at the lower level is located in the upper half and the other in the lower half. The method assures that all branches of the binary tree described in FIG. 7 are taken. The final outcome is that all rows at level 0 receive a copy of the message.

The optional column bitmask 228 is created when the message was originated outside Switch 100. A bitmask is a series of K bits, each representing a column in the switch. When a bit in the bitmask is set to ONE the message is directed to all rows of that corresponding column. To achieve one-to-all multicasting, all bits in the column bitmask are initially set to ONE with the result that all columns and rows receive the message. Alternately, a subset of columns may optionally be selected by setting only a subset of the bitmask elements to ONE. The omitted columns are set to ZERO. The method provides for a one-to-many multicast capability, where all rows and only selected columns receive the message. Alternately, if only one of the upper 224 and lower 226 marker bits is initially set to ONE and the other set to ZERO, then only the upper rows or lower rows at level 0 receive the message. Therefore, setting the upper 224 and lower 226 marker bits and the column bitmask bits 228 independently to ZERO or ONE advantageously directs the multicast message to a subset of the targets.

At level 0 a multicast message moves right on each row, circulates left, and eventually traverses all columns. For a given row, each bit in the bitmask is used to mark whether the message has been sent downward at the respective column. If a message is not blocked from below and the bit representing the column is 1, then a copy of the message, advantageously without the bitmask, is sent downward. As described for FIG. 15B, only the traffic bit 202 and the payload 206 exit the switch. At the same time, a copy of the message is also sent right with the column position in the bitmask set to ZERO, indicating that the column destination has been satisfied. If the message is blocked from dropping, the message continues moving right and the bitmask is not changed. A blocked message circulates and eventually passes through the blocked cell again. When all bits in the bitmask are ZERO, indicating that all targeted columns have received the message, the message is no longer transmitted right at level 0.

The foregoing describes a structure and technique for multicasting a message from one input port to all rows at level 0, and from each row at level 0 to all columns, thereby satisfying the desirable requirement of one-to-all transmission. A one-to-many transmission to all rows of selected columns is also described. Furthermore, multicast messages and non-multicast message routing advantageously occur within the same switch simultaneously.

2D, 3D, and 4D Systems

The topologies and methods of message flow control scale in an unlimited fashion so that the useable throughput and efficiency of an embodiment of Switch 100 is not determined by an upper limit on the size of the switch. As the size of switch approaches infinity, the preferable ratio of input ports to total possible inputs (as discussed for FIGS. 20A, 20B and 20C) is probabilistically in the range of 1:3 to 1:6. In practice, the limit to the maximum size of any embodiment of Switch 100 is the pin count of the device. Thus, the maximum size of a single-integrated circuit chip implementation is pin limited. Switches are desirably constructed that have significantly more I/O ports than would be set by the technology limitation. Multiple chip implementations provide a structure and technique for scaling the number of ports essentially without practical limit. Three methods are given below, referred to as second dimensional (2D), third dimensional (3D), and fourth dimensional (4D) interconnection methods.

Figure 25A:
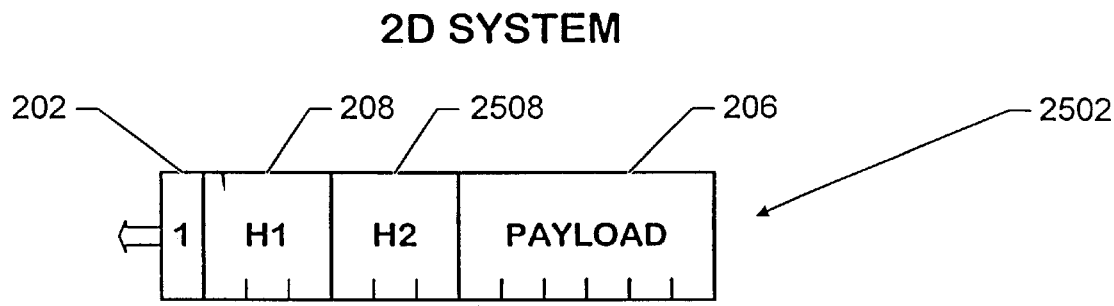
FIGS. 25A, 25B and 25C describe the message header layout for multi-chip switches formed in a multi dimensional topology.
Figure 25B:
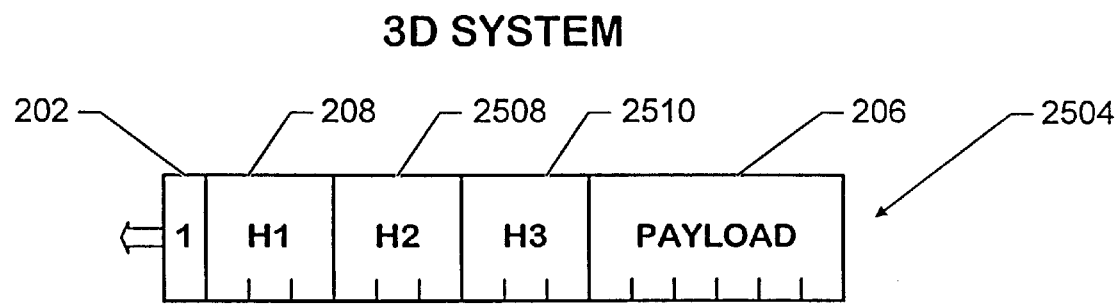
Figure 25C:
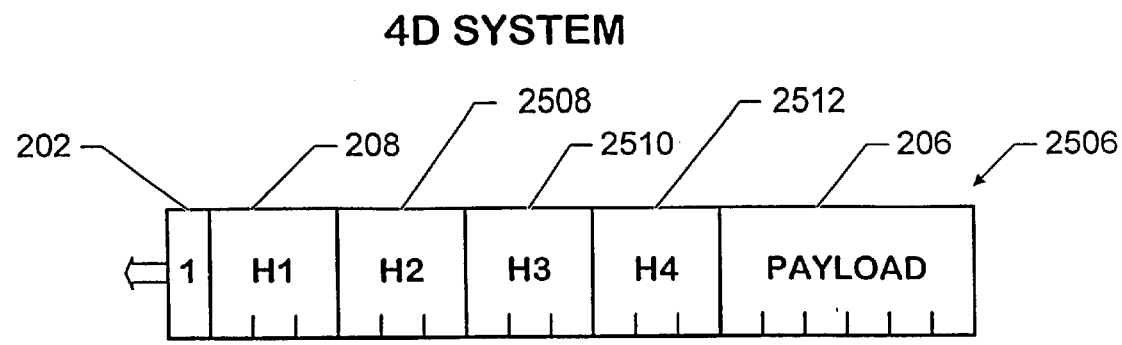

Referring to FIGS. 25A, 25B and 25C, the layout of messages for "nD" multi-chip switches is shown. A message 2502 for a 2D switch has two headers 208 and 2508. A message 2504 for a 3D switch has 3 headers 208, 2508 and 2510. A message 2506 for a 4D switch has 4 headers 208, 2508, 2510 and 2512.

Figure 26A:
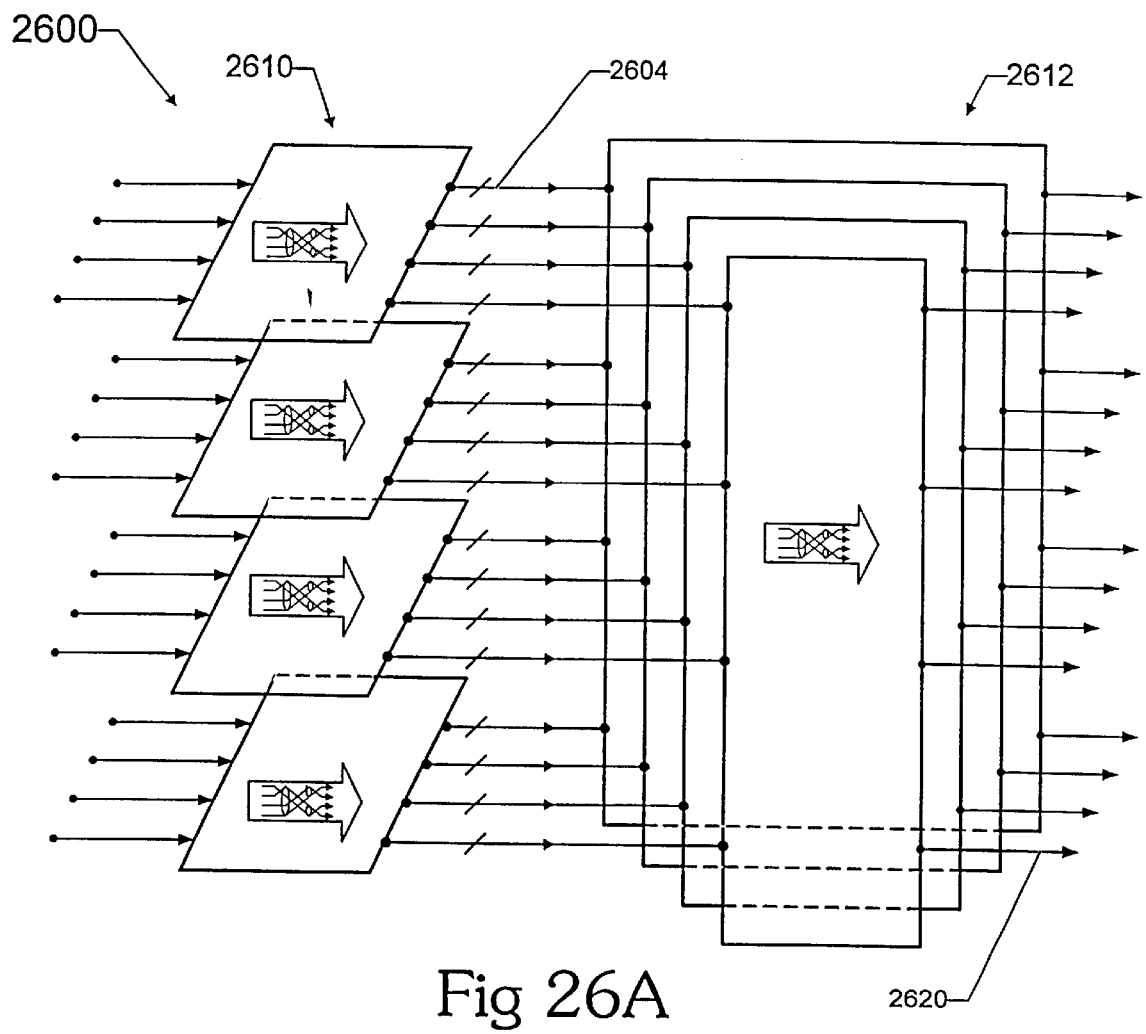
FIG. 26A is a schematic pictorial that illustrates how to interconnect multiple chips to generate a switch with a large number of input and output ports.

Referring to FIG. 26A in conjunction with FIGS. 1, 3 and 25A, a 2D switch 2600 is formed by connecting two stacks 2610 and 2612 each containing a plural number C of single-chip implementations 2602 of Switch 100. In a preferred embodiment of 2D Switch 2600, C is the number of rows at level 0. The two stacks are connected by a special arrangement of bus connection 2604. The outputs 2604 of a chip 2620 in the first stack 2610 each connect to one input of each chip 2632, 2634, 2636 and 2638 in the second stack 2612. Header 208 of message 2506 determines to which output 2604 the message is directed. A message entering at any input port 2622 is transported to the input port of any chip in the second stack 2612. As discussed for FIG. 10, header 208 is removed when message 2502 passes through a chip 2620 in the first stack 2610.

Figure 26B:
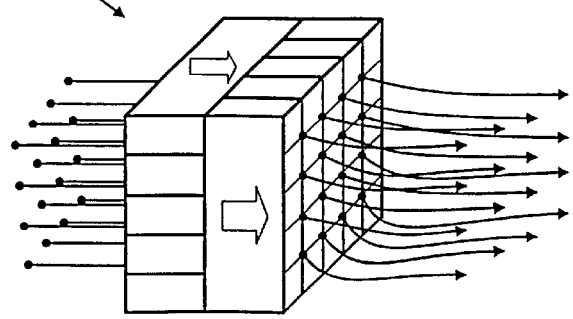
FIG. 26B is a symbolic representation of the FIG. 2D interconnected switch system referred to as a "twisted cube".

A message 2502 entering an integrated circuit chip 2630 in the second stack processes header 2508 exactly as header 208. Thus header 2508 is equivalent to header 208 discussed previously, for messages entering the second stack 2612. A message entering at any input in connection bus 2604 is desirably transported to the target output 2640. Referring also to FIG. 26B, the resulting conformation of the two stacks 2610 and 2612 (interconnected as described above) is here referred to as a "twisted cube", indicating that one stack is twisted 90 degrees with respect to the other. In a suitable 2D embodiment of Switch 100, connection bus 2604 includes the set of all output ports 154 and respective busy signal ports 376 at the same row address 2206 with FIFO buffers 152 omitted. To simplify timing considerations, a given output column port 154 at stack 2610 is connected to input port 104 at the same column in the second stack 2612, and similarly for busy signal 376 connected to same-column port busy signal 304. Given two stacks containing a plural number C of integrated circuit chips, the total number of output addresses 2620 is $C^2$.

Figure 27:
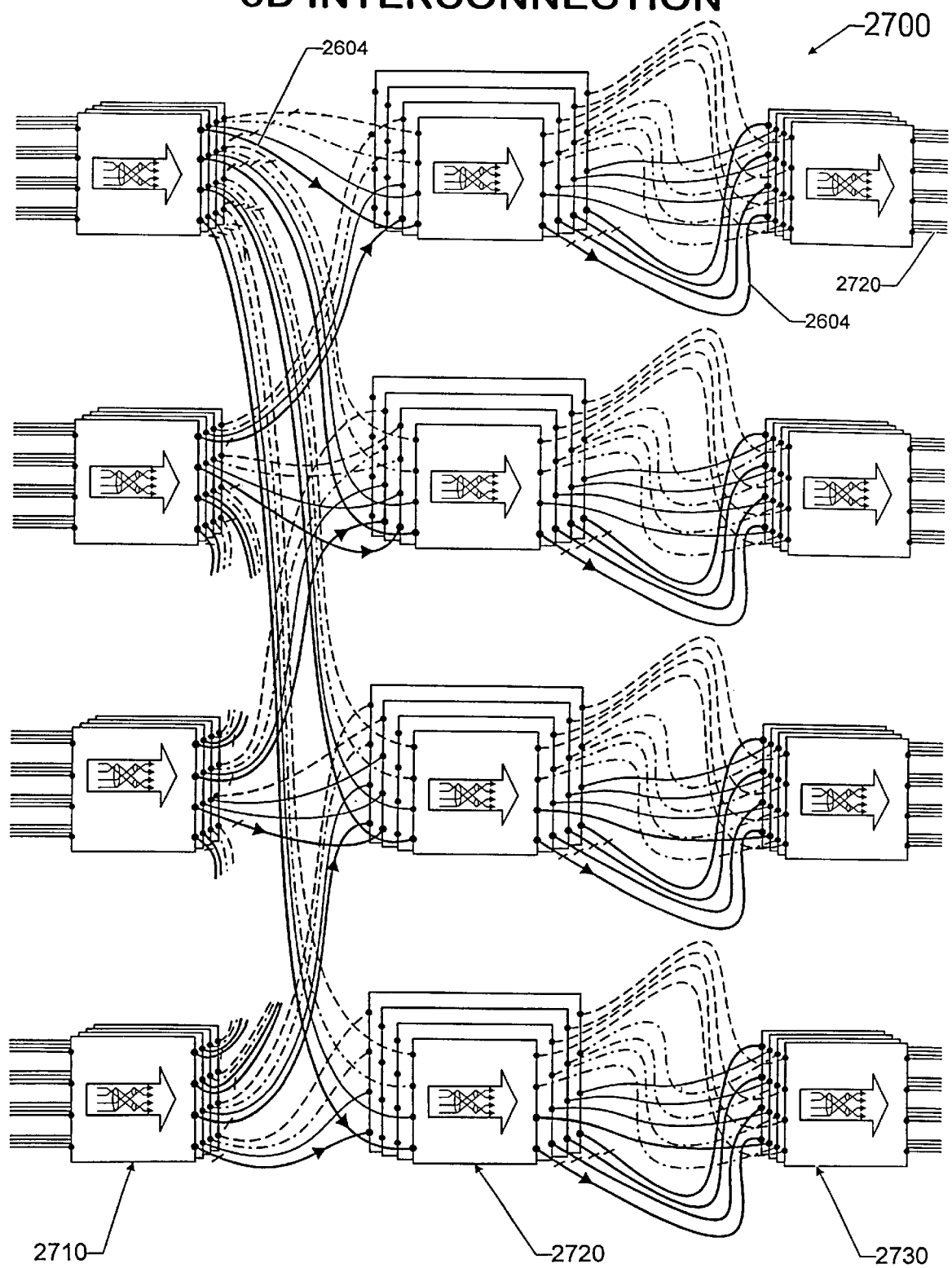
FIG. 27 is a schematic pictorial that illustrates how to interconnect multiple chips in a three-dimensional configuration to generate a switch with an even larger number of input and output ports.

Regarding FIG. 27 in conjunction with FIG. 25B, a 3D interconnection switch is shown. Applying the same interconnection method described for connection bus 2604 to the layout illustrated in FIG. 27, one of skill in the art is enabled to assemble the higher-dimensioned switch. The 3D switch includes three tiers 2710, 2720 and 2730, each tier containing C stacks of C integrated circuit chips. In a preferred embodiment of 3D Switch 2700, C is a number of rows at level 0 of a chip. The 3 row headers 208, 2508 and 2510 of message 2504 determine the output address 2720 of the message. The total number of output addresses is $C^3$.

Figure 28:
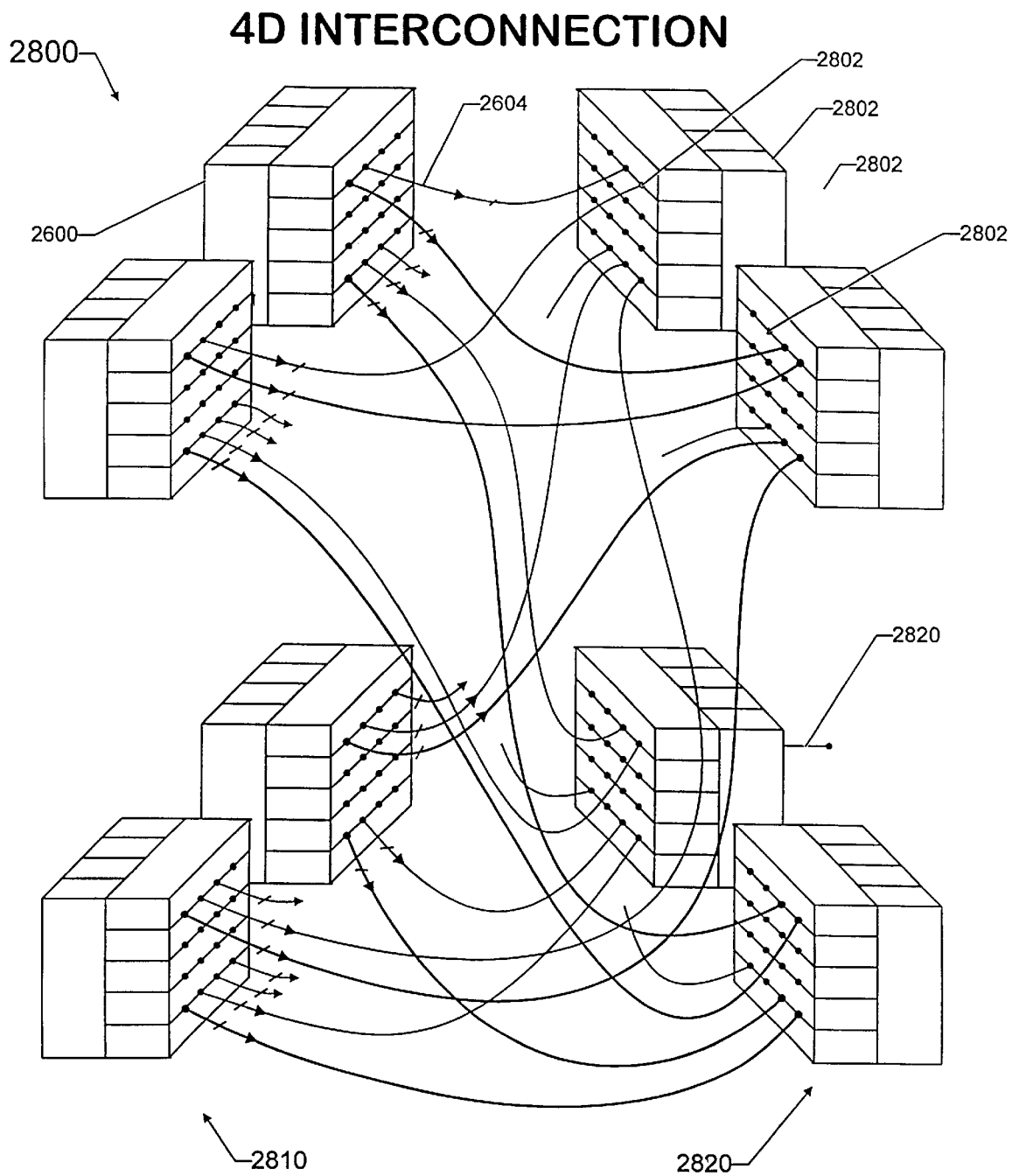
FIG. 28 is a schematic pictorial that illustrates how to interconnect multiple chips in a four-dimensional configuration generate a switch with a very large number of input and output ports ("4D switch").

Regarding FIG. 28 in conjunction with FIG. 25C, a 4D interconnection switch is shown. Applying the same interconnection method described for connection bus 2604 to the layout illustrated in FIGS. 28, one of skill in the art is enabled to assemble the higher-dimensioned switch. The 4D switch includes two square matrixes 2810 and 2820, each matrix containing $C^2$ twisted cubes 2600. In one embodiment of 4D Switch 2800, C is the number of rows at level 0 of a chip. The four row headers 208, 2508, 2510 and 2512 of message 2506 determine the output address 2220 of the message. The total number of output addresses is $C^4$.

Split-Header Switch

Figure 29A:
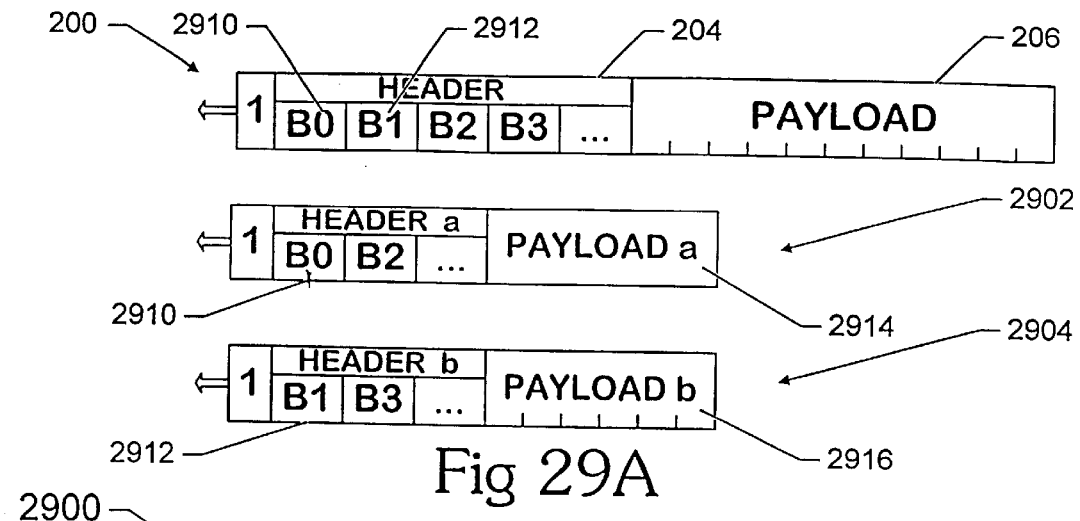
FIG. 29A illustrates how a message is divided into two messages of half the initial size, for entry into a low-latency switch.
Figure 29B:
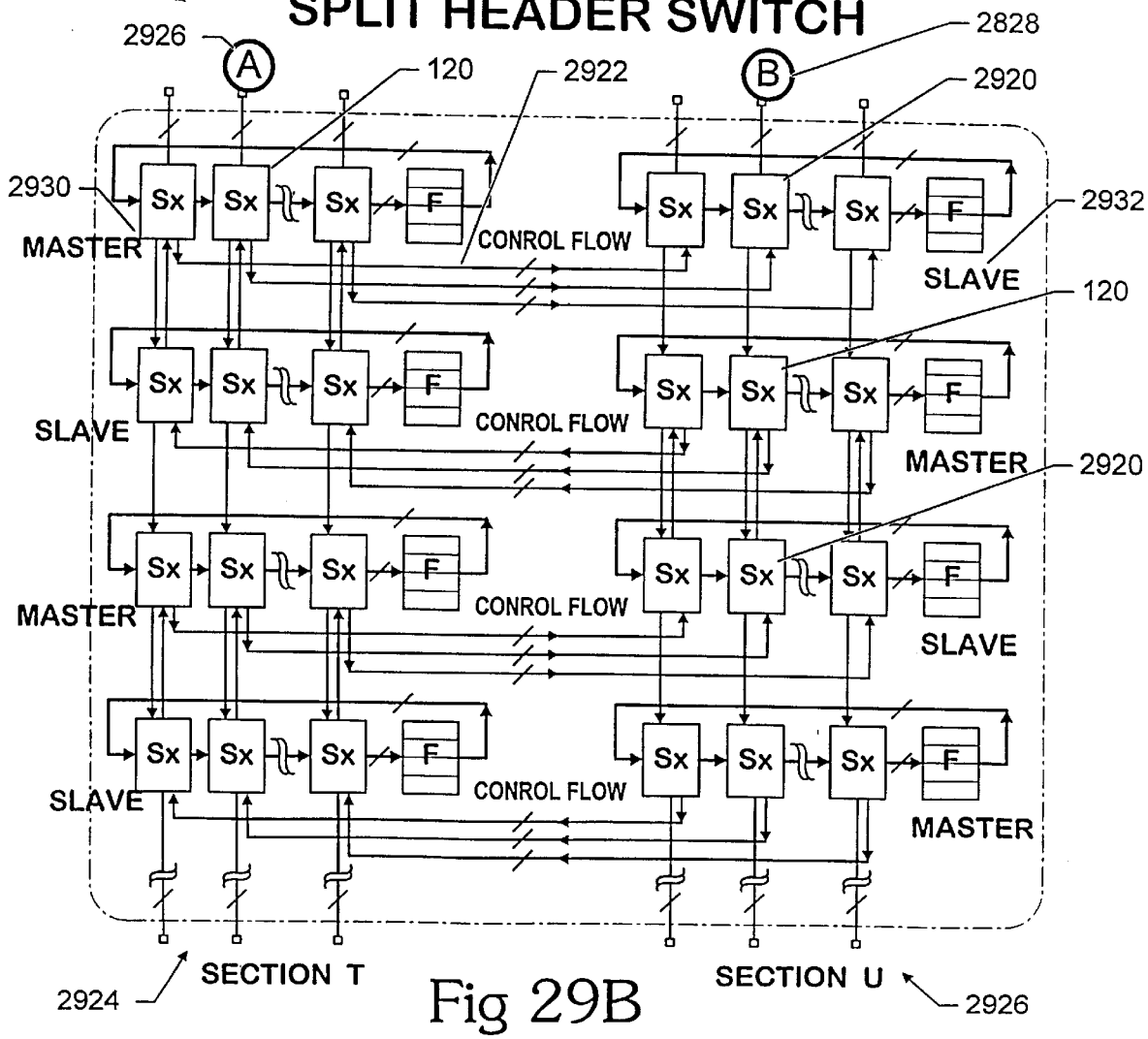
FIG. 29B is a block diagram of a split-header switch that uses the split message of FIG. 29A in a switch with a master-slave relationship that reduces latency approximately by a factor of 2.

A primary design objective for a switch used in a high-speed system, such as a supercomputer network, is low latency. The flat-latency system of control and topology discussed in FIGS. 18A, 18B, 18C and 19, and the high-speed timing control discussed in FIGS. 16A and 16B, as well as combinations thereof, serve to reduce latency or time-of-flight of a message through an embodiment of Switch 100. In cases discussed so far, all header bits of a message enter an embodiment of Switch 100 before the first payload bit can enter, which indicates that the length of the header (for a given I/O speed) determines the absolute minimum latency. FIGS. 29A and 29B describe a split-header embodiment that reduces this time by a factor of two and also reduces the time for the payload to transit the switch by a factor of two.

Referring to FIG. 29A, a message 200 is externally "split" into two messages 2902 and 2904, each message having half the original length. Alternate header bits 204 are formed into the respective headers of the split messages respectively. The header bits in even numbered positions 2910 become the header of message A 2902, and similarly the odd-numbered bits 2912 become the header of message B 2904. The payload 204 is divided into two halves, which respectively form the payloads 2914 and 2916 of the two messages.

Referring to FIG. 29B in conjunction with FIGS. 1 and 20A, a split-header switch is shown including sections T 2924 and U 2926. Each section is made at alternate levels of master 2930 and slave 2032 control arrays. With the exception of the internal details of the control cells, a section is identical to Switch 100 shown in FIG. 1. Master control-array level 2930 contains control arrays 120 as previously described, with the addition of control flow bus 2922. Control bus 2922 contains R paths where R is the number of rows at that level. The input line of each control path is connected to the latch output of each master control cell and transfers or copies the latch setting to an identically situated slave control cell at the same level. Control flow buses 2922 transfer the settings of all latches in all master control cells at one level. The output line of a control path is connected to the latch in the slave control cell. The logic gates in a master control cell process the header and set the latch in that cell. The slave control cell omits the logical gates that process the header and the logical elements that remove the first header bit.

Message A 2902 enters the top level of section T 2924 of switch 2900 at 2926 at the same time that message B 2904 enters section U 2926 at input port 2928. The first header bit 2910 is removed from message A when the message moves downward to the next lower level. Message B moves synchronously with message A. Thus message B moves downward or right at the same time that message A moves. At the next lower level, message B enters a master control cell and the movement is copied by message A by copying latch settings from master to slave. When message B moves downward, the first header bit 2912 is removed. Referring also to FIG. 12A, the timing of switch 2900 is allows movement of both bits in a single clock period 1110. Thus, bits move downward at the rate of two levels per clock period. At the next lower level, message A again enters a master control cell. As the messages move downward to the bottom level messages A and B alternately pass through master control cells and lose header bits. Each of the messages of the pair lose one bit for every two levels and one clock period.

The concept of copying the state of all latches in all control cells at a level may be extended to more than the two sections. For example, if message 200 is split into 3 or 4 or more messages in the manner described for FIG. 29A, then the time of flight for the set of split messages is divided by the resulting number of messages. Each level has only one master control section. Other sections are slaves. The master station is rotated among all sections at descending levels.

Optical Message Layout

Figure 30A:
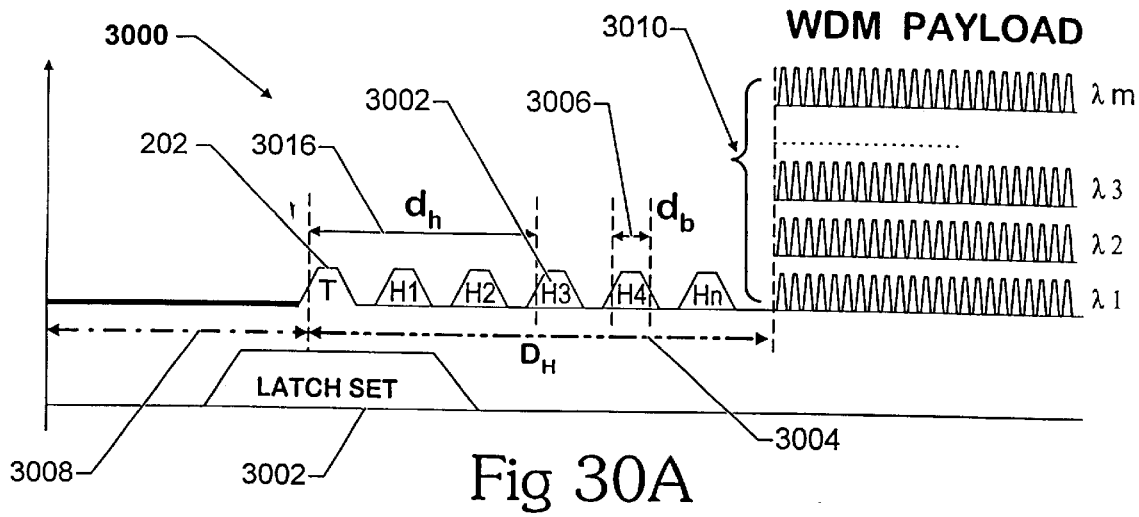
FIG. 30A shows the layout of a optical message that is processed by an electro-optical switch.

FIG. 30A shows the layout of an optical message. The first bit 202 announces the presence of a message and is used as a timing bit. Header bits (H1, H2, ... , $H_n$) 3002 serve the same function in the optical message as in the electronic message 202. In one embodiment, the header bits 3002 are spaced one after another in the optical header in a fashion similar to the spacing in the electronic header 204. In another embodiment the header bits all occupy the same physical space in the fiber and thus occur at the same time but use n different colors, a technique called wavelength division multiplexing (WDM). In this scheme, n different available wavelengths ($l_1, l_2, \ldots , l_n$) are employed. The presence of light in the wavelength slot $l_k$, conveys the same information as the presence of light in the time slot $H_k$. In another embodiment a mixed scheme is applied. For example, n/2 wavelengths may be used to occupy two time slots. The optical payload 3010 carries the data and serves the same purpose in the optical message as electronic payload 206 does in the electronic message 200. FIG. 30A illustrates the information in the payload being carried in multiple time slots and wavelengths. Dead time 3008 is provided to allow the electronics to catch up with the optics and to account for jitter in the optical signal propagating in the optical fiber.

Optical Control Cell

Figure 30B:
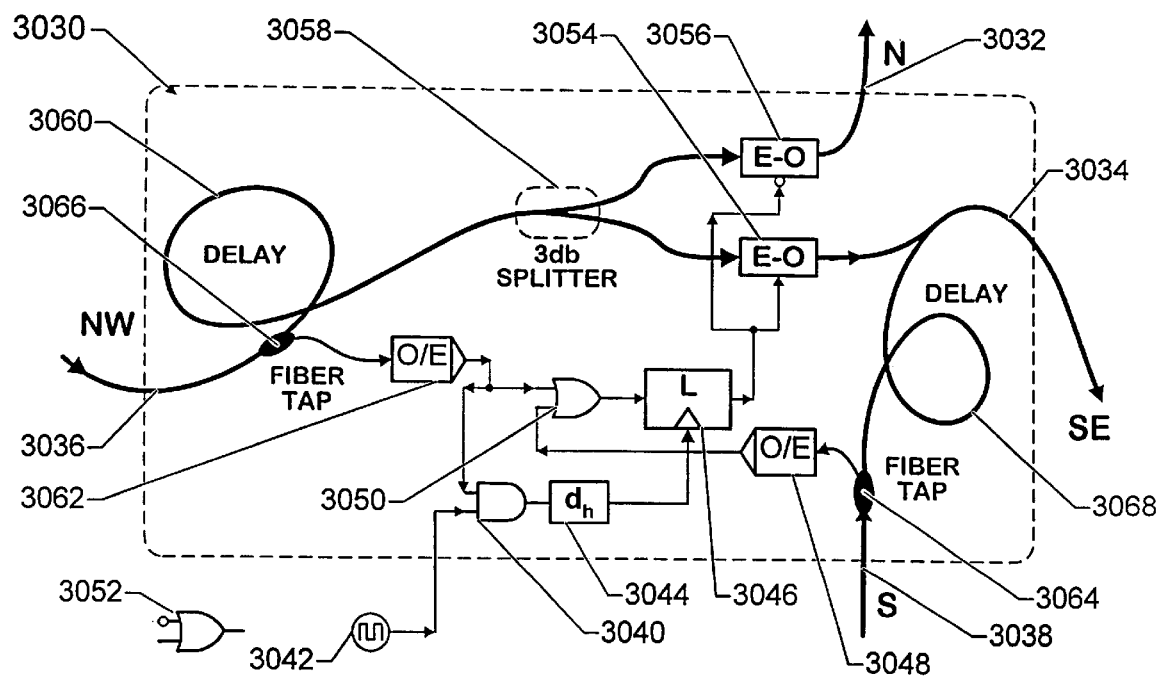
FIG. 30B is a diagram of an electro-optical control cell that processes the message described in FIG. 30A.

Referring to FIG. 30B in conjunction with FIG. 30A an embodiment of an electro-optical control cell 3030 is shown. Data in the form of an optical message 3000 enters cell 3030 through input lines NW 3036 and S 3038. Data leaves the cell through output lines SE 3034 and N 3032. If the cell is not on the uppermost level, then a message M leaving the cell through output port N 3032 will enter input port S 3038 of the cell directly above. If the cell 3030 is on the lowest level, data leaving output port 3034 will exit the switch. If the cell 3030 is not on the lowest level, the data leaving the cell though output line SE 3034 will enter another cell through input port NE 3036.

The operation of cell 3030 is similar to the operation of cell 1300. Cell 3030 is a cell at level J of the switch. AND gate 3040 has output of ONE only where timing bit 202 arrives at the AND gate 3040 during the time window in which latch set 3002 is high. Timing bit 202 is the first bit of the header of the message that enters the cell through input port 3036. Timing bit 202 comes through the fiber tap 3066 and is converted to electronics by O/E element 3062. Latch set pulse 3002 arrives at gate 3040 from timing source 3042. When AND gate 3040 transitions from ZERO to ONE, delay element 3044 sets latch L 3046 to ONE after a time delay $d_h$ 3016, which is the time period between timing bit 202 and header bit 3002. Latch 3046 is a positive-edge, sample-and-hold circuit, that in conjunction with gates 3040 and 3050, captures and holds the value of header bit 3002. Latch 3046 serves therefore as a static one-bit register.

Concurrently, a small portion of the optical signal entering cell 3030 at input line S 3038 is directed to O/E conversion element 3048 by passive fiber tap 3064. Element 3048 has two functions. One function is detection of the optical first header bit 202 from a message entering the switch through input 3038. If no bit is detected, element 3048 has output value ZERO. If a header bit 202 is detected, element 3048 generates a high electrical signal (ONE) for the time duration $d_h$ 3008 which is the time used for the entire optical header to pass a given point. Latch 3046 generates a high pulse (ONE) only in the case where either the timing bit of the message entering through input 3038 is ONE or the header bit for level J is ONE. Cell 3030 is a cell connected to an upper row set 716 of a cell at the next lower level. A cell connected to a lower row set 718 at the next lower level has gate 3050 replaced with gate 3052.

During the time that the header bits are converted to electronics and the electronic devices set electro-absorption modulators 3054 and 3056, message M is stored in delay loop 3060. Message M progresses from delay loop 3060 to 3dD splitter 3058. Splitter 3058 delivers identical copies of message M to the electro-absorption modulators 3054 and 3056. Only one of the electro-absorption modulators 3054 and 3056 is transparent at a given time. Therefore light is allowed to leave cell 3030 through only one of the output ports 3032 and 3034. The elements 3054 and 3056 remain in a fixed state set by latch L 3046 until latch 3046 changes state, at least until the next latch set signal 3002 arrives.

Cell 3030 is constructed using electro absorption modulators. One skilled in the art would be able to modify the cell to replace the electro absorption modulators with semiconductor optical amplifiers or lithium niobate gates.

Optical Input Cell

Figure 30C:
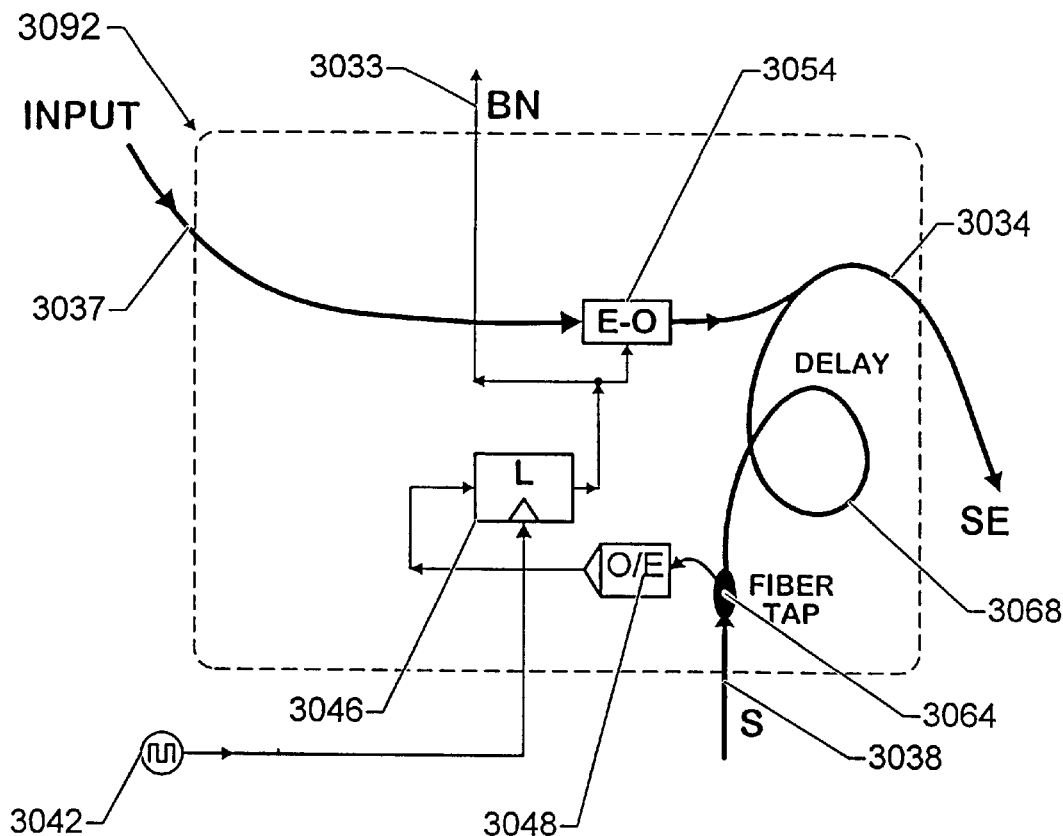
FIG. 30C is a diagram of the top-most or input control cell for optical message described in FIG. 30A.
Figure 30D:
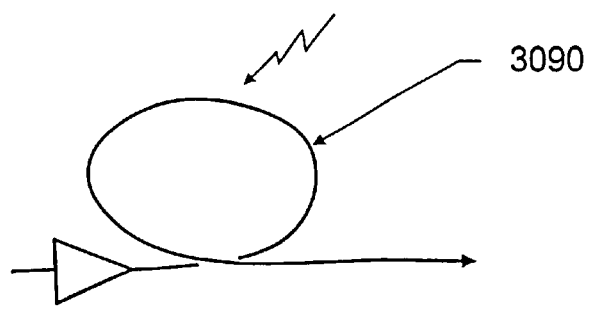
FIG. 30D is a symbolic representation of an optical amplifier/regenerator that is used in the processing of an optical message.
Figure 30E:
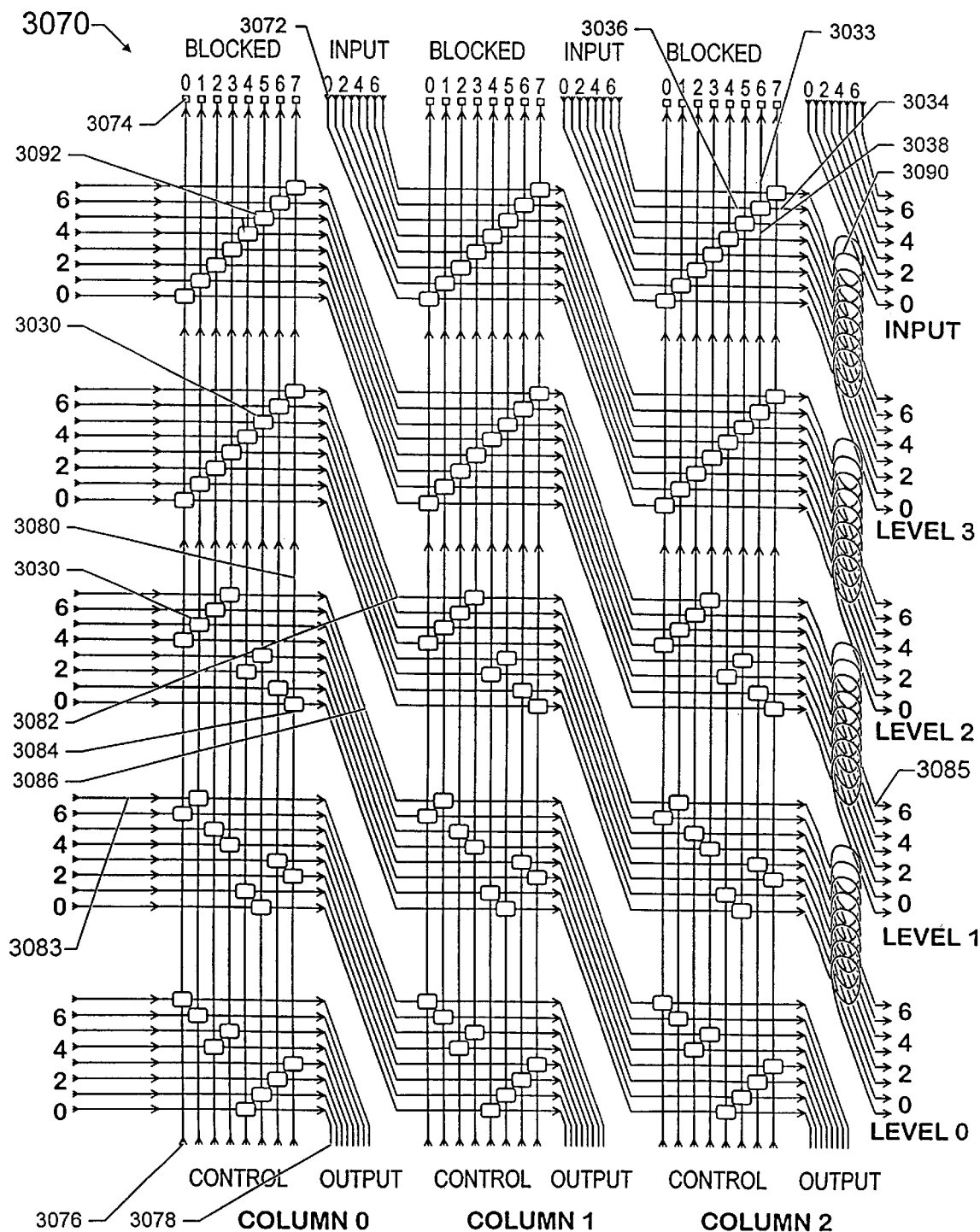
FIG. 30E is a diagram of a complete electro-optical switch showing the arrangements an interconnections of control cells described in FIGS. 30B and 30C, and fiber interconnections of the cells.

Referring also to FIG. 30E, control cells 3030 are located at all levels of switch 3070 except for the top, or input level. FIG. 30C depicts an electro-optical input cell 3092 that is located only at the input level of switch 3070. Optical message E 3000 is assembled externally at a time that the traffic bit 202 enters the switch at input cell 3092 in synchronization with other messages. In particular, the timing is such that if external message E enters cell 3092 at input 3037 concurrent with another message B entering the cell at line S 3038, and electro-optic switch 3054 is set transparent, the traffic bits of each message reach fiber 3034 at the same time. In distinction to an electronic message in a clocked shift register 1100, the nature of a data stream or message 3000 in an optical fiber is that data is not held static until a later time when the data is released. An optical message 3000 is always in motion. Therefore, input cell 3092 always accepts a properly timed message 3000 at input 3037.

In the case of a message B 3000 from the downward direction at 3038, message B is detected by elements previously discussed and latch 3046 is set to ONE prior to the arrival of external message E at modulator 3054. As a consequence of message B entering cell 3092 the modulator 3054 is set not transparent, external message E is absorbed, and an electronic busy signal on line BN 3033 is sent upward to the external device which indicates to that the message was not accepted by switch 3070. The external device may subsequently construct another message E for injection at the next latch-set 3002 cycle.

Alternatively, when external message E 3000 enters cell 3092 at input 3037 and no message arrives at line S 3038, message E passes through electro-optic switch 3054 to exit cell 3092 at the top level and enters a control cell 3030 at level 3. Busy signal on line BN 3033 indicates to the external device that the message was accepted by the switch.

In one embodiment the level 0 cells of switch 3070 receive optical control signals indicating that room exists in the output device for a message. In this embodiment the cells at level 0 are identical to the cells 3030 at other levels. In another embodiment the level 0 control cells of the switch receive electronic control signal to indicate that the output device cannot accept an message 200. In this embodiment, level 0 cells are slightly different from cells at level 1, in that fiber input 3038 and the associated O/E converter 4048 are replaced with an electronic-only connection.

Optical Switch

FIG. 30E shows the interconnection of fibers, control cells and other components of an optical switch 3070. This figure is similar to FIG. 17. Additionally, switch 3070 may have additional columns not shown and not all of the columns need to be equally spaced so that the length of fibers 3086 between a pair of adjacent columns is not the same for all columns. Messages enter at the top 3072 and exit at the bottom 3076.

Referring also to FIG. 17, a message moving right on a row may preferentially drop downward or to continue right until the message reaches a control cell allowing the message to eventually move downward. Optical message M 3000 exiting control cell A 3030 and preferentially moving right will exit cell A at line N 3080 where line N connects to the cell B to the upward level at line S 3038. Optical message M always will exit cell B at line SE 3034 along diagonal path 3082. Cell B is connected at line SE to cell C at the next column at next lower row so that cell C is directly to the right of cell A The purpose of the apparent roundabout journey is that the message M can provide timely information to block another message N at cell B which might preferentially move from cell B to cell C. Message M, at the lower level, has priority over a message at a higher level, as discussed in the description of FIGS. 8A and 8B. In effect the message flow, sequence of movement, and blocking that occur in optical switch 3070 is the same as for electronic messages 200 moving through an identically configured switch 1700.

A 3dD splitter 3058 at each control cell in combination with the relatively smaller loss of light energy at fiber taps 3066 and 3064 cause an attenuation of the optical signal amplitude. To compensate for the signal loss, an amplifier and regenerator 3090 is inserted between certain columns. The regenerator 3090 performs two functions: amplifying the optical signal 3000 to adequate strength for further processing, and shaping or regenerating the binary information carried in the fiber, improving signal to noise quality. In another embodiment employing semiconductor optical amplifiers or lithium niobate gates, the signal degrades through the system and regeneration is needed.

A message M may span more than one column at a given time. In fact, the first bits of a message may be exiting the switch before the last bits of the message have entered the switch. In one embodiment of the switch 3070, output lines from the right are directly connected to input lines at the same level on the left. In this embodiment, the entire message advantageously fits on a level, ensuring that the first bit of a message does not loop around a row and collide with another portion of the message. This characteristic applies to both the electrical and optical implementations. Note that all messages are typically not the same length.

The timing control of switch 3070 is such that messages arrive at all cells of a given level and column at the same time. As an illustrative example consider an embodiment of FIG. 30E with three columns and four levels with control cells and an additional level with input cells. The distance between column 0 and column 1 is equal to the distance between column 1 and column 2 but less than the distance from column 2 to column 0. The switch is designed to carry messages of two lengths, short messages S, and long messages M. The right-hand output ports 3085 are connected directly to the input ports 3083 on the same row. In addition, short message S fits between two nodes on the same row. Thus for a cell A on row R, level W, and column C, and a cell B on row U, level W, and column C+1, if message S travels from cell A to cell B, then at the time t when the first header bit of message S arrives at cell B, the last message bit of message S has already left the node at cell A.

In another example, a message stays on a given level long enough to pass through four nodes. A clock X that ticks irregularly and visits states 0, 1, and 2. At a reference time t(0), the clock X starts and reads 0. Short messages are inserted into column one input cells 3030 at time 0. A sort message S is inserted into the switch at column 0 at time 0. The message is not deflected and has a first header bit that arrives at a level 3 cell in column 1 at time $t_1$. The message S remains on level 3 and has a first header bit that arrives at a level 3 cell in column 2 at time $t_2$. The message S remains on level 3 and has a first header bit that arrives at a level 3 cell in column 0 at time $t_3$. A delay time D1 is defined to be $t_2-t_1$. A delay time D2 is defined to be $t_3-t_2$. The clock X transitions from state ZERO to state ONE at time D1 and from state ONE to state TWO at time 2*D1 and from state TWO to state ZERO at time 2* D1+D2. The time durations extend in this fashion so that the clock will transition from state ZERO to state ONE at time 2* D1+D2.

A simple rule is applied for inserting messages into the switch. When the clock transitions to state t, short messages are inserted the input control cells in column t. If short messages can be inserted into an input control cell in column C at time t, then a long message can be inserted into a column C input control cell at time t+D1. Thus the short messages are aligned and the long messages are aligned. The remainder of the switch timing depends on the length of the fibers between the cells and the length of the delay loops. The fiber and delay loop lengths can be adjusted so that messages arrive at a given cell 3030 to input ports NW 3036 and S 3038 in such a way that the electronics operate the switches correctly. The delay loops 3060 are made a suitable size so that a message passing though this loop arrives at the electro-optic switches 3054 and 3056 after the switches have switched. Finally, delay loop 3068 is adjusted so that messages arriving from either port exit the cell at the same time.

Hybrid Electronic/Optical Control

Referring to FIG. 29B, a master/slave relationship efficiently moves data through a switch. A switch 2900 performs a control function in which master and slave implementations incorporate the same topology and message flow system so that the master can drive the slave. The slave acts passively in regard to the messages passing through. Where the master and slave are functionally identical with respect to message flow but timing differences exist, the timing differences are adjusted to provide a successful master/slave embodiment of Switch 100. In particular, for the objective of the lowest possible latency for messages that have a relatively long payload 206, advantages are gained by controlling a fast, very-high bandwidth optical switch with an electronic switch that processes only the message header.

The hybrid electronic/optical combination advantageously exploits the best features of both technologies to synergistically produce an ultra-low latency, very-high bandwidth switch. Referring to FIGS. 30A and 30B, an optical message 3000 has a relatively long dark time 3008 and long header 3004, containing "fat" (longer duration) optical bits 3002 that are processed by the optical/electronic devices within the control cell 3030. In other words, the payload 3010 portion of optical message 3000 is a small fraction of the full message length. The wide header bits and dark time 3008 are essential to account for jitter in the optical timing. Costs per control cell 3030 are reduced by avoiding usage of expensive higher speed detectors and electro-optic switches. The time for header and control processing is adjusted by delay loops 3060 and 3068, on the order of a meter in length. Furthermore, the unproductive delay of the delay loops is repeated at every control cell. On the other hand, when all latches 3046 in switch 3070 are preset before the optical payload 3010 enters, no delay loops are used and the control cells are arranged in close proximity, yielding much more than an order of magnitude decrease in time-of-flight or latency of the optical payload through the switch.

Figure 31:
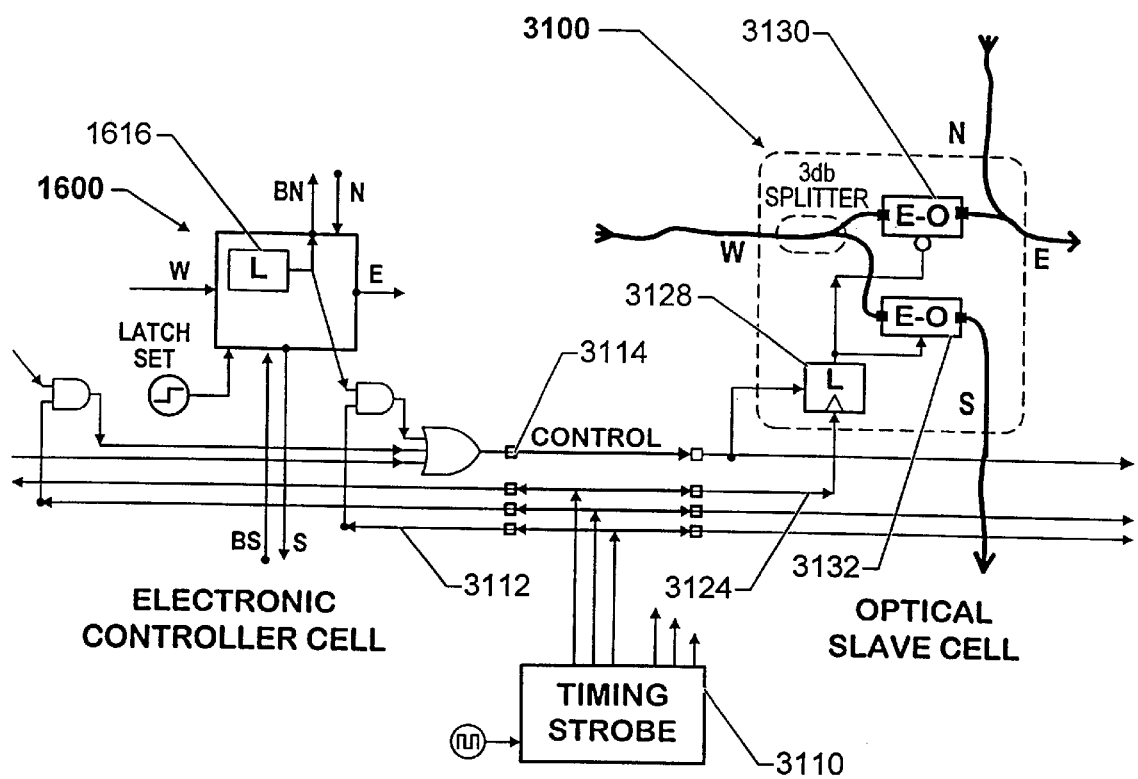
FIG. 31 is a diagram of an hybrid control consisting of an electronic control cell connected to a simplified optical control cell in a master-slave relationship for the purpose of greatly reducing latency and achieving very high bandwidth.

Referring to FIGS. 30B and 31, the high-speed electro-to-optical converters 3048 and 3062 of control cell 303 are expensive and suitable fast-switching electro-absorption modulators are also costly. An optical slave cell 3100 eliminates both E/O converters and uses lower speed electro-optic switches 3124. Cell 3100 is about an order of magnitude lower in cost that cell 3030 an order of magnitude higher in speed. An electronic switch of the same topology and message flow processes only the message header including the traffic bit 202 and row header 204. Since no payload is handled, no data output ports 154 are used on the electronic switch.

Using fast logic as described in the discussion of FIG. 16B, all the latches of the electronic switch 1620 in a given column are set one clock period after the last header bit has entered the switch. For example, a 10 level switch with 11 header bits running, at 500 Hz takes about 20 nanoseconds to set the latches 3116. Referring to the split-header switch of FIG. 29B and using high-speed technology, the setting time drops to 10 ns. Concurrent with the header bits moving down through the electronic switch, the state of each latch 1616 is copied externally to optical slave cells 3100. Note that because the latches at one row and level are set in sequential, left-to-right fashion, the settings of one or more rows are transmitted by a single output pin 3114. A timing strobe signal 3110 for each control array 3112, including each row and column intersection, is used both to generate the latch state signal and to copy the signal 3124 to the optical slave cell latch 3128. Latch 3128 sets one electro-optic switch 3130 or 3132 transparent and the other not transparent. Electro-optic switches 3130 and 2132 have ample time to change state before the optical payload arrives, so that less costly devices are used.

Figure 32:
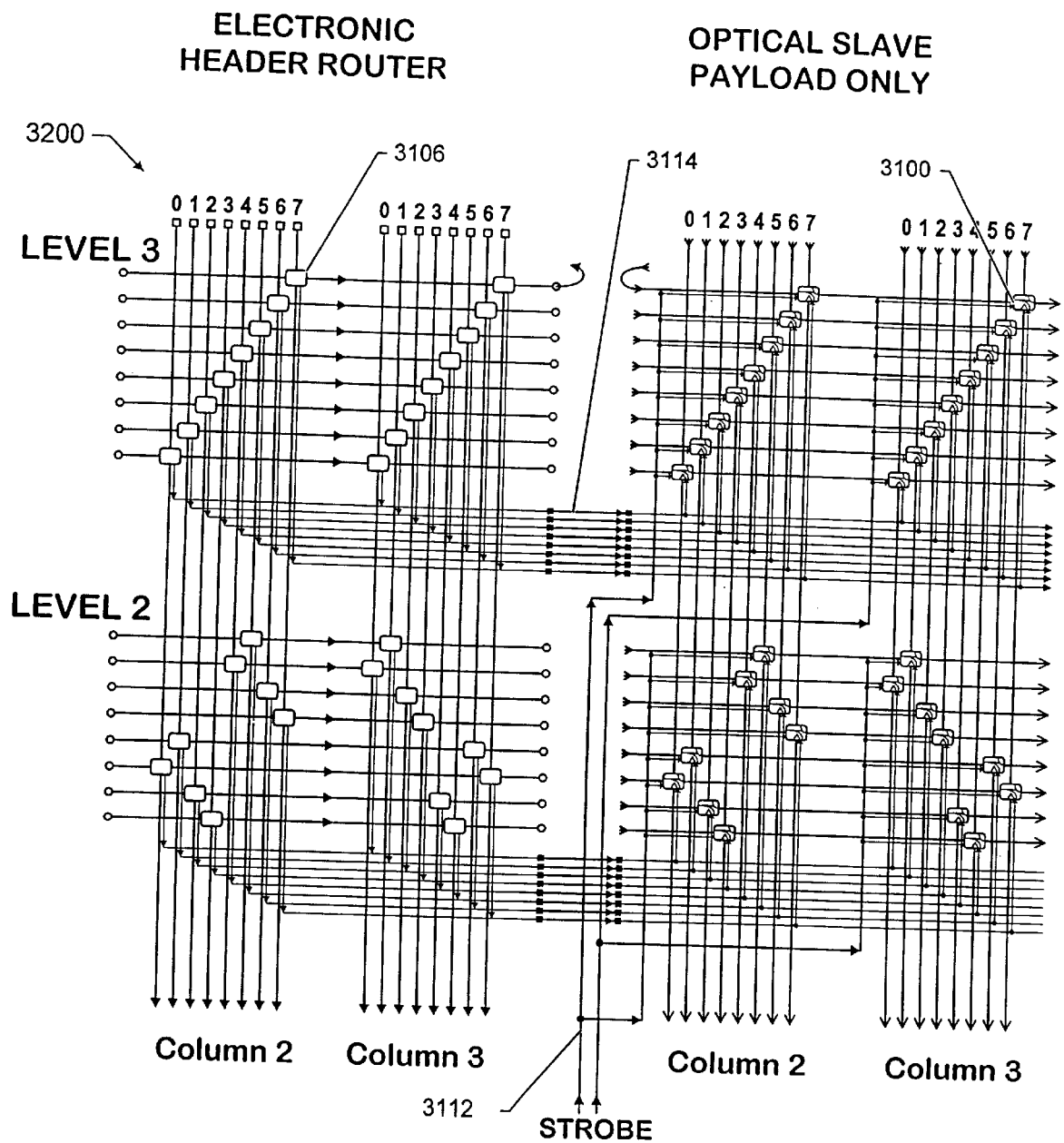
FIG. 32 is a diagram of a portion of a hybrid electro-optical switch that uses the two types of control cells described in FIG. 31, and their interconnections.

Referring to FIG. 32, in one embodiment of a hybrid electronic/optical switch 3200, the same layout rules used for FIG. 17 are used for both the electronic and optical sections. To account for differences in timing, the electronic headers first enter the electronic switch and the latch states are transmitted 3114 to the optical section 3100. When all latches are set, the optical payload is sent through, and because the fibers, excluding the delay loops 3060 and 3068, are very short, the payload exits after moving through a very short total path length. If regeneration is used, the extra path length is added. As soon as the tail of the optical payload has entered the top level of the optical section, new electronic headers are sent into the electronic section. Depending on the relative latency of each section, some overlap of electronic and optical processing is desirable, thereby decreasing the dead time between messages entering the faster section.

Referring to FIGS. 31 and 32, the interconnection of control flow is shown for two levels and two columns of a hybrid electronic/optical switch 3200 derived from switch 1700 of FIG. 17. Latch settings d 3106 along each row of the electronic section are transferred via control line 3114 to like-located latches 3100 in the optical section. Timing strobe 3112 is used to multiplex the latch settings out of one output pin.

When timing synchronization of the electrical master is very different from the timing of the optical slave, buffers can be utilized to store the switch settings provided by the electronics until the optical slave needs the settings. Associated with each optical cell are two long shift registers with compartments A and B. The optical master sends data to compartment A. If compartment B is empty, the bit flows from compartment A to compartment B. When the optical cell is ready for data, the optical cell extracts the data from compartment B.

Three different applications are discussed.

A first application discusses the case in which only a single message fits in the shortest row of the optical switch. When an input device to the switch sends data to a target, the device injects the header into the electronic master switch.

The device may have to wait to inject data because of a blocked condition. As soon as the first bit of header is accepted by the electronic master, the construction of the optical message begins along with the setting of the gates. When the optical message enters the switch array, all switches are set. While the message is traveling through the switch array, other messages are converted from electronic form to optical form prior to injection. Additional other messages are also regenerated. Additional other messages have exited from the switch and are also converted from optical form to electronic form. Therefore, the total time traveling through the optical switch is completely hidden by the concurrent processes.

A second application exploits parallel electronic copying and is employed when several messages occupy a single row of a level of the optical switch. Additional buffering of latch settings may be used. In the second version of the switch each row of the optical switch contains up to K messages. The optical switch does not perform wormholing. The optical switch contains K columns. The electronic portion of the circuit includes K electronic copies of the optical switch. Each of the copies runs in a wormhole fashion. The columns in the optical switch are labeled $C_0, C_1, \ldots C_{K-1}$. The electronic switches are labeled $N_0, N_1, \ldots N_{K-1}$. At time 0, electronic switch n sends data to optical column n of the one optical switch. At time t, electronic switch n sends data to optical switch t+n mod K. The latch settings may use buffering.

A third application supports several messages on each level of the optical switch. Wormhole routing is used, and buffering is used in the switch to satisfy timing requirements. The switch includes K copies, $N_0, N_1, \ldots N_{K-1}$, of the electronic switch and one optical switch with K columns $C_0, C_1, \ldots C_{K-1}$. Electronic switch $N_J$ has a set of two-long buffers associated with each cell in the optical switch. In each of the electronic switches, wormhole routing of headers occurs. At time 0, switch $N_0$ begins to process headers and sends its switch settings to the optical cells. At time D, switch $N_1$ begins to process data and send switch settings to optical cells. In general, at time $J_D$, switch $N_J$ begins to process data and send the settings to the optical switch. Each time an electronic switch begins to process headers, optical messages are beginning the construction process. At time K·(D+1) optical messages associated with electronic switch N1 are launched and this process continues as waves of data are sent through the optical switch.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Furthermore, the switches are described in directional terms of "left", "right", "upward" and "downward". This terminology is included only to assist in the understanding of the illustrative embodiments. No actual directionality is implied. Furthermore, many different types of devices may be connected using the interconnect structure including, but not limited to, workstations, computers, terminals, ATM switches, telephonic central office equipment, Ethernet and IP switches, and the like.

The description and claims occasionally make reference to an interconnect structure which is arranged in multiple dimensions. This reference to dimensions is useful for understanding the interconnect structure topology. However, these dimensions are not limited to spatial dimensions but generally refer to groups of nodes which are interconnected in a particular manner. Variations and modifications of the embodiments disclosed herein may be made based on the description set forth herein, without depart from the scope and spirit of the invention as set forth in the following claims.

What is claimed is:

1. An interconnect apparatus, comprising:
   a plurality of nodes; and
   a plurality of interconnect lines in an interconnect structure selectively coupling the nodes in a hierarchical multiple level structure arranged to include:
   a plurality of J+1 levels with J an integer greater than 0 in an hierarchy of levels arranged from a lowest destination level $L_0$ to a highest level $L_J$, the interconnect structure receiving a plurality of multiple bit messages unsorted through a plurality of input ports and transmitting the multiple bit messages, an individual message M of the plurality of messages being self-routing and moving through nodes using wormhole routing in which only a portion of the multiple-bits of a message are in transit between two nodes, the multiple-bit message extending among multiple nodes, the individual message M moving in a plurality of ways including four ways which are sufficient for the message M to exit the interconnect structure through an output port designated by the message M, the four ways being:
   (1) the message M enters a node in the interconnect structure from a device external to the interconnect structure, the message M designating one or more designated output ports;
   (2) the message M moves through a node in the interconnect structure without buffering to a designated output port;
   (3) the message M moves through a node on a level $L_k$ of the interconnect structure without buffering to a different node on the same level $L_k$; and
   (4) the message M moves through a node on a level $L_k$ of the interconnect structure without buffering to a node on a level $L_i$ nearer in the hierarchy to the destination level $L_0$ than the level $L_k$.

2. An interconnect apparatus as claimed in claim 1, wherein a node $N_{Ak}$ on the level $L_k$ has a plurality of interconnections including:
   a direct data input interconnection from a node $N_{Bk}$ on the level $L_k$;
   a direct data output interconnection to a node $N_{Dk}$ on the level $L_k$;
   a direct data input interconnection from a node $N_{Cm}$ on a level $L_m$ where m is greater than k, or from a device $D_C$ external to the interconnect structure; and
   a direct data output interconnection to a device $D_E$ external to the interconnect structure, or a direct data output interconnection to a node $N_{Ei}$ on the level $L_i$ where k is greater than i so that the level $L_i$ is closer in the hierarchy to the destination level $L_0$.

3. An interconnect apparatus as claimed in claim 2, wherein:
   among devices having a direct interconnection to the node $N_{Ak}$, a precedence relationship exists for sending data to the node $N_{Ak}$ so that:

a node $N_{Bk}$ on the level $L_k$ having a direct interconnection to the node $N_{Ak}$ has precedence over a device $D_C$ where the device $D_C$ is a node $N_{Ci}$ on the level $L_i$ or a device $D_C$ external to the interconnect structure;

the precedence relationship for a message $M_B$ to be sent from the node $N_{Bk}$ to the node $N_{Ak}$ and a message $M_C$ to be sent from the device $D_C$ to the node $N_{Ak}$ in a same time interval results in the message $M_B$ being sent and the message $M_C$ prevented from being sent.

4. An interconnect apparatus as claimed in claim 2, wherein the interconnect structure:

carries messages and control signals;
includes a node $N_E$ including:
a direct message input interconnection for receiving a message $M_A$ from a node $N_A$; and
a direct message input interconnection for receiving a message $M_F$ from a node $N_F$; and
the node $N_A$ has a control logic and a control input interconnection for receiving a control signal $C_A$ from the node $N_F$, the control signal $C_A$ enforcing a precedence of the direct message input interconnection from the node $N_F$ to the node $N_E$ over the message input interconnection from the node $N_A$ to the node $N_E$ so that
the node $N_F$ sends a message $M_F$ to the node $N_E$ and sends a control signal $C_A$ designating a blocking condition to the node $N_A$,
the node $N_A$ control logic receives the control signal $C_A$ and responds to the control signal $C_A$ by blocking transmission of the message $M_A$ destined to arrive at the node $N_E$ at the same time as the message $M_F$, causing the blocked message $M_A$ to be alternatively sent to a node $N_D$ where the node $N_D$ is distinct from the node $N_E$ and the node $N_D$ is distinct from the node $N_A$.

5. An interconnect apparatus as claimed in claim 2, wherein the interconnect structure:

carries messages and control signals;
includes a node $N_E$ including:
a direct message input interconnection for receiving a message $M_A$ from a node $N_A$, the message $M_A$ having a header; and
a direct message input interconnection for receiving a message $M_F$ from a node $N_F$; and
the node $N_A$ has a control logic and a control input interconnection for receiving a control signal $C_A$ from the node $N_F$, the control signal $C_A$ enforcing a precedence of the direct message input interconnection from the node $N_F$ to the node $N_E$ over the direct message input interconnection from the node $N_A$ to the node $N_E$ so that a message $M_A$ arriving at the node $N_A$ in the absence of a blocking control signal $C_A$ in a same time interval causes the node $N_A$ control logic to use a header of the message $M_A$ to determine a selected device for transmitting the message $M_A$, in case the selected device is the node $N_E$ then the message $M_A$ being sent to the node $N_E$.

6. An interconnect apparatus as claimed in claim 5, wherein:

the control logic of node $N_{Ak}$ determines:
whether, in a first condition, the node $N_{Ak}$ has a direct output interconnection to a node $N_{Ei}$ on the level i nearer in the hierarchy to the destination level $L_0$ than the level $L_k$ in which the node $N_{Ei}$ has a pathway to a designated output port designated by the message $M_A$; and whether, in a second condition, the node $N_{Ei}$ is unblocked by another message; and the control logic of node $N_{Ak}$, when the first and second conditions are satisfied, sends the message $M_A$ to the node $N_{Ei}$; and the control logic of node $N_{Ak}$, when the first and second conditions are not both satisfied, sends the message $M_A$ to a node $N_D$ where node $N_{Ak}$ and node $N_{Dk}$ are distinct and the node $N_{Ei}$ and the node $N_D$ are distinct.

7. An interconnect apparatus as claimed in claim 1, further comprising:

a plurality of output ports including a plurality of accessible output ports that are accessible to a node $N_{Ak}$ on the level $L_k$, the accessible output ports being accessible via a pathway through the interconnect nodes; and each of the accessible output ports accessible to the node $N_{Ak}$ also being accessible to a node $N_{Ei}$ on a level $L_i$ nearer in the hierarchy to the destination level $L_0$ than the level $L_k$, the node $N_{Ak}$ having a direct output interconnection to the node $N_{Ei}$.

8. An interconnect apparatus as claimed in claim 1, wherein:

a node $N_E$ has a first data input interconnection from a node $N_A$ and a second data input interconnection from a node $N_F$; and a control interconnection between the node $N_A$ and node $N_F$ resolves contention for sending messages to the node $N_E$.

9. An interconnect apparatus as claimed in claim 1, further comprising:

a node $N_{Ck}$ on the level $L_k$ having a direct data output interconnection to a node $N_{Ai}$ on a level $L_i$ nearer in the hierarchy to the destination level $L_0$ than the level $L_k$, and having a precedence relationship with respect to a message $M_C$ which, at a time T, moves through the node $N_C$ and is preferentially sent to the node $N_A$, but is blocked from node $N_A$ by a message $M_B$ so that the message $M_C$ is deflected to a node on the level $L_k$ distinct from node $N_{Ck}$;

a node $N_{Gk}$ on the level $L_k$ having a direct data output interconnection to a node $N_{Di}$ on the level $L_i$, the node $N_{Di}$ having a pathway through the interconnect nodes to an accessible output port accessible to the message $M_C$, the message $M_C$ being deflected to pass through the node $N_{Gk}$ at a time T', a first time step following the time T that a node directs message $M_C$ to a lower level;

wherein the interconnect structure disallows the message $M_B$ from being in a position to block the message $M_C$ at the time T'.

10. An interconnect structure comprising:

a plurality of nodes; and a plurality of interconnect lines in an interconnect structure selectively coupling the nodes in a structure, the interconnect structure receiving a plurality of multiple bit messages unsorted through a plurality of input ports and transmitting the multiple bit messages, an individual message M of the plurality of messages being self-routing and moving through nodes using wormhole routing in which only a portion of the multiple bits of a message are in transit between two nodes, the multiple-bit message extending among multiple nodes, the interconnect structure including:

a node $N_E$ has a first data input interconnection from a node $N_A$ and a second data input interconnection from a node $N_F$; and a control interconnection between the node $N_A$ and node $N_F$ resolves contention for sending messages to the node $N_E$.

11. An interconnect apparatus as claimed in claim 10, wherein the interconnect structure:
   carries messages and control signals;
   includes a node $N_E$ including:
      a direct message input interconnection for receiving a message $M_A$ from a node $N_A$; and
      a direct message input interconnection for receiving a message $M_F$ from a node $N_F$; and
   the node $N_A$ has a control logic and a control input interconnection for receiving a control signal $C_A$ from the node $N_F$, the control signal $C_A$ enforcing a precedence of the direct message input interconnection from the node $N_F$ to the node $N_E$ over the message input interconnection from the node $N_A$ to the node $N_E$ so that
      the node $N_F$ sends a message $M_F$ to the node $N_E$ and sends a control signal $C_A$ designating a blocking condition to the node $N_A$,
      the node $N_A$ control logic receives the control signal $C_A$ designating the blocking condition and responds to the control signal $C_A$ by blocking transmission of the message $M_A$ destined to arrive at the node $N_E$ at the same time as the message $M_F$, causing the blocked message $M_A$ to be alternatively sent to a node $N_D$ where the node $N_D$ is distinct from the node $N_E$ and the node $N_D$ is distinct from the node $N_A$.

12. An interconnect apparatus as claimed in claim 11, wherein the interconnect structure:
   carries messages and control signals;
   includes a node $N_E$ including:
      a direct message input interconnection for receiving a message $M_A$ from a node $N_A$, the message $M_A$ having a header; and
      a direct message input interconnection for receiving a message $M_F$ from a node $N_F$; and
      the node $N_A$ has a control logic and a control input interconnection for receiving a control signal $C_A$ from the node $N_F$, the control signal $C_A$ enforcing a precedence of the direct message input interconnection from the node $N_F$ to the node $N_E$ over the direct message input interconnection from the node $N_A$ to the node $N_E$ so that a message $M_A$ arriving at the node $N_A$ in the absence of a blocking control signal $C_A$ in a same time interval causes the node $N_A$ control logic to use a header of the message $M_A$ to determine a selected device for transmitting the message $M_A$, in case the selected device is the node $N_E$ then the message $M_A$ being sent to the node $N_E$.

13. A method of moving messages through an interconnect structure comprising:
   interconnecting a plurality of devices in a structure, the devices having a plurality of message input terminals and a plurality of message output terminals, a plurality of interconnect lines interconnecting the device with connections from a message output terminal of a sending device to a message input terminal of a receiving device;
   assigning a priority among a plurality of sending devices having output message terminals coupled to the input message terminal of a single receiving device;
   entering a message into the interconnect structure for transferring to one or more designated output ports;
   wormhole routing a message through the devices so that only a portion of multiple bits of the message are in transit between two devices, the multiple-bit message extending among multiple devices;
   sending a message, without buffering, from a sending device to a receiving device en route to the one or more output ports using self-routing, with the sending device neither requesting of the receiving device nor receiving from the receiving device, permission to send the message to the receiving device;
   communicating among a plurality of sending devices that send messages to a single receiving device, a sending device with priority for sending messages to the single receiving device having a control signal output terminal connected by an interconnect line to a control signal input terminal of a sending device without priority, the sending device with priority sending a control signal to the sending device without priority;
   for a message intended to be sent from a sending device without priority to an intended receiving device, deflecting the message to an alternative receiving device, the alternative receiving device also being en route to the one or more output ports.

14. A method of moving messages through an interconnect structure comprising:
   interconnecting a plurality of devices D to a node $N_E$ using a plurality of direct node $N_E$ input interconnections;
   enforcing a precedence relationship among the devices D having a direct input interconnection to the node $N_E$ for sending a message to the node $N_E$;
   wormhole routing a message $M_A$ through the devices D so that only a portion of multiple bits of the message $M_A$ are in transit between two devices, the multiple-bit message $M_A$ extending among multiple devices;
   sending a message $M_A$ from a node $N_A$ to the node $N_E$ in a time period T when:
      in the time period T a message $M_A$ moves through a node $N_A$ having a direct input interconnection to the node $N_E$, the message $M_A$ is directed to be sent to the node $N_E$ in the time period T, and
      no message $M_F$ directed to be sent to the node $N_E$ or deflected to the node $N_E$ moves through a node $N_F$ having a direct input interconnection to the node $N_E$ in the time period T in which the node $N_F$ has precedence over the node $N_A$ for sending messages to node $N_E$.

15. A method as claimed in claim 14 further comprising:
   aborting the sending of message $M_A$ to the node $N_A$ in the time period T if, in the time period T, the node $N_F$ sends a message $M_F$ to the node $N_E$.

16. A method as claimed in claim 15, further comprising:
   sending the message $M_A$, aborted with respect to node $N_A$, to a node $N_D$, the node $N_D$ being distinct from the node $N_A$ and the node $N_E$.

17. A method as claimed in claim 16, further comprising:
   sending a control signal, by the node $N_F$ to the node $N_A$ causing the message $M_A$ to be aborted with respect to the node $N_A$ and enforcing the precedence relationship.

18. A method of moving messages M through an interconnect structure including a plurality of nodes N and a plurality of interconnect lines L to a plurality of output buffers B, the method comprising:
   selectively coupling the plurality of nodes N via the plurality of interconnect lines L so that an interconnect line L(p,q) carries data directly from a node p to a node q;

determining for a message M a set of nodes O(M) so that the output buffers B that are targets of the message M are connected to the set of nodes O(M);

wormhole routing the message M through the nodes N so that only a portion of multiple bits of the message M are in transit between two nodes, the multiple-bit message M extending among multiple nodes;

if a first portion of the message M is located at the node p at a time t then at the time t, moving the message M on an interconnect line L(p,s) so that at time t+1, the message M is located at a node s, where the node s and the node p are different nodes;

if the first portion of the message M is located at the node p at the time t and the shortest path from the node p to a node of the set of nodes O(M) includes traversal of H interconnect lines L, determining an interconnect line L(p,q) so that the shortest path from the node q to a node of the set of nodes O(M) includes traversal of H-1 interconnect lines L;

if at time t, the message M is not blocked from using the interconnect line L(p,q) by another message, then at time t, sending the message M on the interconnect line L(p,q) so that at time t+1, the first portion of the message M is located at the node q; and if at time t, the message M is blocked from using the interconnect line L(p,q) by another message, then at time t, sending the message M on an interconnect line L(p,r), where the node r and the node p are different nodes and the node r and the node q are different nodes, and the shortest path from the node r to a node of the plurality of nodes O(M) includes traversal of no more than H interconnect lines L.

19. A method of moving messages M through an interconnect structure including a plurality of nodes N and a plurality of interconnect lines L to a plurality of output buffers B, the method comprising:

selectively coupling the plurality of nodes N via the plurality of interconnect lines L so that an interconnect line L(p,q) carries data directly from a node p to a node q;

determining for a message M a set of nodes O(M) so that the output buffers B that are targets of the message M are connected to the set of nodes O(M);

wormhole routing the message M through the nodes N so that only a portion of multiple bits of the message M are in transit between two nodes, the multiple-bit message M extending among multiple nodes;

if a beginning portion of the message M is located at the node p at a time t then at the time t, moving the message M on an interconnect line L(p,s) so that at time t+1, the message M is located at a node s, where the node s and the node p are different nodes;

if the beginning of the message M is located at the node p at the time t and the shortest path from the node p to a node of the set of nodes O(M) includes traversal of H interconnect lines L, determining an interconnect line L(p,q) so that the shortest path from the node q to a node of the set of nodes O(M) includes traversal of H-1 interconnect lines L;

if at time t, the message M is not blocked from using the interconnect line L(p,q) by another message, then at time t, sending the message M on the interconnect line L(p,q) so that at time t+1, the beginning portion of the message M is located at the node q; and if at time t, the message M is blocked from using the interconnect line L(p,q) by another message, then at time t, sending the message M on an interconnect line L(p,r), where the node r and the node p are different nodes and the node r and the node q are different nodes, then at time t+1, sending the message M on an interconnect line L(r,s) that carries data directly from the node r to the node s, where the node s and the node p are different nodes, the node s and the node q are different nodes, the node s and the node r are different nodes, and the shortest path from the node s to the node of the plurality of nodes O(M) includes traversal of no more than H interconnect lines L.

20. A method of sending data comprising:

providing an interconnect apparatus including a plurality of nodes N and a plurality of interconnect lines L connecting the plurality of nodes N in a predetermined pattern;

connecting the plurality of nodes N using the plurality of interconnect lines L to include:

a node $N_A$ having a direct message input interconnection for receiving a message $M_A$ and having a plurality of direct message output interconnections for transmitting the message $M_A$ to a plurality of nodes including a priority node $N_P$ having a top priority for receiving the message $M_A$, the priority node $N_P$ being determined by routing information in a header of the message $M_A$ and a position of the node $N_A$ within the plurality of interconnect lines L;

the priority node $N_P$ having a plurality of direct message input interconnections for receiving a message $M_P$ from a plurality of nodes including a preferred node $N_B$ which is preferred for sending a message to the priority node $N_P$, the preferred node $N_B$ being determined by position of the node $N_B$ within the plurality of interconnect lines L;

wormhole routing the message $M_A$ through the nodes N so that only a portion of multiple bits of the message $M_A$ are in transit between two nodes, the multiple-bit message $M_A$ extending among multiple nodes;

if the node $N_A$ is the same as the node $N_B$, sending the message $M_A$ as the message $M_P$ from the node $N_A$ to the node $N_P$; and if the node $N_A$ is not the same as the node $N_B$ and the node $N_B$ directs a message $M_B$ to the node $N_P$, then sending the message $M_B$ from the node $N_B$ to the node $N_P$.

21. A method of sending message comprising:

providing a network for carrying a plurality of messages M concurrently including:

a plurality of output ports P; and a plurality of nodes N coupled by a plurality of direct message input interconnections and a plurality of direct message output interconnections, the individual nodes N for passing messages M to predetermined output ports of the plurality of output ports P, the predetermined output ports P being designated by the messages M; and a plurality of interconnect lines in an interconnect structure;

selectively coupling the nodes in a hierarchical multiple level structure to include a plurality of J+1 levels with J an integer greater than 0 in an hierarchy of levels arranged from a lowest destination level $L_0$ to a highest level $L_J$ which is farthest in the hierarchy from the lowest destination level $L_0$, the output ports P being connected to nodes at the lowest destination level $L_0$, including in the network a node $N_A$ of the plurality of nodes N;

wormhole routing a message M through the nodes N so that only a portion of multiple bits of the message M are in transit between two nodes, the multiple-bit message M extending among multiple nodes;

limiting the number of messages M that are allowed to enter the plurality of direct message input interconnections of node $N_A$ to eliminate contention for the predetermined output ports of the node $N_A$ so that the messages M are sent through the direct message output connections of the node $N_A$ to nodes $N_H$ that are a level L no higher than the level of the node $N_A$, the nodes $N_H$ forming a path to the designated predetermined output ports P of the messages M.

22. A method of transmitting a message through an hierarchical interconnect structure including a plurality of nodes and a plurality of interconnect lines, the method comprising:

selectively coupling the nodes in an hierarchical multiple level structure arranged to include a plurality of J+1 levels with J an integer greater than 0 in an hierarchy of levels arranged from a lowest destination level $L_0$ to a highest level $L_J$;

entering a plurality of messages into the interconnect structure unsorted through a plurality of input ports;

moving, using self-routing, an individual message M of the plurality of messages through nodes using wormhole routing in which only a portion of the multiple bits of a message are in transit between two nodes, the multiple-bit message extending among multiple nodes, the message M moving in a plurality of ways including four ways which are sufficient for the message M to exit the interconnect structure through an output port designated by the message M, the four ways including:

(1) entering the message M to a node in the interconnect structure from a device external to the interconnect structure, the message M designating one or more designated output ports;

(2) moving the message M through a node in the interconnect structure without buffering to a designated output port;

(3) moving the message M through a node on a level $L_k$ of the interconnect structure without buffering to a different node on the same level $L_k$, the different node also having a pathway to a designated output port; and (4) moving the message M through a node on a level $L_k$ of the interconnect structure without buffering to a node on a level $L_i$ nearer in the hierarchy to the destination level $L_0$ than the level $L_k$.

23. A method of communicating messages in an interconnect structure comprising:

arranging a plurality of nodes in a structure including a plurality of hierarchical levels from a highest hierarchical level to a lowest hierarchical destination level, a plurality of nodes spanning a cross-section of a level and a plurality of nodes in a cross-section span, the nodes having an input message connection on the same level, an input message connection on a higher hierarchical level, an output message connection on the same level and an output message connection on a lower level;

specifying at least one destination node for receiving a message;

originating a first message at a node in the interconnect structure;

wormhole routing a message through the plurality of nodes so that only a portion of multiple bits of the message are in transit between two nodes, the multiple-bit message extending among multiple nodes;

communicating the first message from node to node in the interconnect structure including the steps of:
determining at a first node whether a second node on a lower level is en route to a destination node;
determining at the first node whether the second node is blocked by a second message; advancing the first message, without buffering, to the second node when the second node is en route to a destination node and the second node is unblocked; and
otherwise traversing the message, without buffering, to a third node on the same level as the first node, the third node being en route to a destination node.

* * * * *